US007194347B2

(12) United States Patent
Harumoto et al.

(10) Patent No.: US 7,194,347 B2
(45) Date of Patent: Mar. 20, 2007

(54) VEHICLE CONTROL APPARATUS, VEHICLE CONTROL METHOD, AND COMPUTER PROGRAM

(75) Inventors: Satoshi Harumoto, Hyogo (JP); Toshitaka Yamato, Hyogo (JP); Hiroshi Takeuchi, Hyogo (JP); Yoshihiko Maeno, Hyogo (JP); Naotoshi Miyamoto, Hyogo (JP); Kazuhiro Sakiyama, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 361 days.

(21) Appl. No.: 10/805,423

(22) Filed: Mar. 22, 2004

(65) Prior Publication Data

US 2004/0193347 A1 Sep. 30, 2004

(30) Foreign Application Priority Data

Mar. 26, 2003 (JP) ............................ 2003-085812
Apr. 30, 2003 (JP) ............................ 2003-125210
Jul. 18, 2003 (JP) ............................ 2003-199342
Oct. 21, 2003 (JP) ............................ 2003-360701

(51) Int. Cl.
*G08G 1/16* (2006.01)
*G01S 17/93* (2006.01)
*G06F 17/00* (2006.01)

(52) U.S. Cl. .......................... 701/45; 701/96; 701/301; 340/436; 340/903

(58) Field of Classification Search .................. 701/45, 701/93, 96, 36, 41, 207, 301; 340/903, 435, 340/43; 367/89, 95, 99
See application file for complete search history.

(56) References Cited

U.S. PATENT DOCUMENTS 5,270,708 A * 12/1993 Kamishima ............ 340/995.24
5,521,580 A * 5/1996 Kaneko et al. ............ 340/439
5,585,798 A * 12/1996 Yoshioka et al. ............ 342/70
5,667,033 A * 9/1997 Shimizu et al. ............ 180/272
6,405,132 B1 * 6/2002 Breed et al. ................ 701/301
6,734,799 B2 * 5/2004 Munch ....................... 340/576
6,917,305 B2 * 7/2005 King .......................... 340/903
6,961,661 B2 * 11/2005 Sekiguchi .................. 701/301

FOREIGN PATENT DOCUMENTS

JP A 7-57198 3/1995
JP A 2000-269886 9/2000

* cited by examiner

*Primary Examiner*—Tan Q. Nguyen
(74) *Attorney, Agent, or Firm*—Oliff & Berridge, PLC

(57) ABSTRACT

A vehicle control apparatus includes an information acquiring/managing unit that acquires information for controlling various units in a vehicle instead of a driver of the vehicle, and manages the information acquired, a situation determining unit that determines a situation under which the vehicle is placed, based on the information, a danger determining unit that selects predetermined information corresponding to the situation from among the information, and determines degree of danger of the situation based on the predetermined information, and a vehicle controller that controls predetermined units in the vehicle in such a manner that the degree of danger is reduced.

35 Claims, 74 Drawing Sheets

FIG.3

| SERVICE FIELD | | TARGET | SITUATION |
|---|---|---|---|
| PREVENTION AND SAFETY | HEAD-TO-HEAD | REDUCE NUMBER OF CASUALTIES | APPROACHING INTERSECTION WITHOUT TRAFFIC LIGHT<br>APPROACHING INTERSECTION WITH TRAFFIC LIGHT |
| | | | TURNING RIGHT AT INTERSECTION WITHOUT TRAFFIC LIGHT<br>TURNING RIGHT AT INTERSECTION WITH TRAFFIC LIGHT |

| MAIN CAUSE | SIGNIFICANT CASE |
|---|---|
| DELAY IN DETECTION | OVERSIGHT |
| JUDGMENT ERROR | ASSUME DECELERATION OF OTHER PARTY |
| DELAY IN DETECTION<br>JUDGMENT ERROR | PASSING ON A STOP SIGN |
| | IGNORE TRAFFIC LIGHT |
| DELAY IN DETECTION | LOW VISIBILITY DURING NIGHTTIME OR DUE TO BAD WEATHER |
| DELAY IN DETECTION | OVERSIGHT |
| JUDGMENT ERROR | ASSUME DECELERATION OF OTHER PARTY |

FIG.4

[PREVENTION AND SAFETY]
PREVENTION OF HEAD-TO-HEAD COLLISION/APPROACHING INTERSECTION WITH OR WITHOUT TRAFFIC LIGHT

[AVAILABILITY BY HUMAN]
O: CAN DO BY ONESELF WITHOUT FAIL
Δ: ESTABLISHED BY APPROACH FROM OTHER PARTY
(EXAMPLE: ESTABLISHED BY APPROACH FROM VEHICLES OR ROADSIDE)
×: NOT ESTABLISHED WITHOUT INFORMATION OF VEHICLE TO VEHICLE

[AVAILABILITY BY AUTOMATIC PROCESSING]
O: CAN DO BY ITSELF WITHOUT FAIL
Δ: ESTABLISHED BY APPROACH FROM OTHER PARTY
(EXAMPLE: ESTABLISHED BY APPROACH FROM VEHICLES OR ROADSIDE)
×: NOT ESTABLISHED WITHOUT INFORMATION OF VEHICLE TO VEHICLE

[AVAILABILITY BY HUMAN]
O: CAN DO BY ONESELF WITHOUT FAIL
×: CANNOT DO BY ONESELF

[AVAILABILITY BY AUTOMATIC PROCESSING]
O: CAN DO BY ITSELF WITHOUT FAIL
×: ESTABLISHED BY ACCUMULATED INFORMATION (1)

| SERVICE FIELD | | TARGET | SITUATION | MAIN CAUSE | SIGNIFICANT CASE | PERCEPTION/ RECOGNITION OF INFORMATION(1) | PERCEPTION/ RECOGNITION OF INFORMATION(2) | | | ELEMENTAL TECHNOLOGY | DETERMINATION/ ACTION (1) | DETERMINATION/ ACTION (2) | | | ELEMENTAL TECHNOLOGY | MERIT | SUPPLEMENT |
|---|---|---|---|---|---|---|---|---|---|---|---|---|---|---|---|---|---|
| PREVENTION AND SAFETY | HEAD-TO-HEAD | REDUCE NUMBER OF CASUALTIES | APPROACHING INTERSECTION WITHOUT TRAFFIC LIGHT | DELAY IN DETECTION | OVERSIGHT | RECOGNIZE STOP SIGN. | | O | O | · SPOT CAMERA THAT CAN PERCEIVE AND FOLLOW SIGNS OF INTERSECTION DURING DRIVING<br>· IMAGE PROCESSING THAT CAN RECOGNIZE TYPE OF SIGNS AND STATE OF TRAFFIC LIGHT<br>· RADIO COMMUNICATIONS THAT CAN NOTIFY TYPE OF SIGNS AND STATE OF TRAFFIC LIGHT | | | | | | | ANALYZE COLLISION TENDENCY (ACCIDENT HISTORY DATABASE) , AND WHEN IT IS SUPPOSED THAT CAR APPROACHES AND GOES INTO ACCIDENT PRONE INTERSECTION, INFORM THE DRIVER. |
| | | | APPROACHING INTERSECTION WITH TRAFFIC LIGHT | | | RECOGNIZE TRAFFIC LIGHT. | RECOGNIZE TRAFFIC LIGHT (RED OR GREEN). | O | O | ↑ | | | | | | | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | RECOGNIZE INTERSECTION | | O | O | ↑ | DETERMINE THAT IT IS ACCIDENT PRONE INTERSECTION. | | × | (DATABASE)△ | COLLISION TENDENCY ANALYSIS (ACCIDENT HISTORY DATABASE) | PREVENT ACCIDENT DUE TO VISUAL FALSE IMPRESSION (EXAMPLE: PREVENT COLLISION AT OPEN INTERSECTION). | |
| | | | | | RECOGNIZE OTHER VEHICLE | OBSERVE OTHER VEHICLE BY EYES. | O | O | IMAGE PROCESSING THAT CAN RECOGNIZE VEHICLES AND TYPE OF VEHICLE | DETERMINE THAT VEHICLE (OTHER PARTY) ENTERS INTO INTERSECTION. | | O | O | | BECOME MORE CAREFUL TO VEHICLES ENTERING INTO INTERSECTION FROM RIGHT AND LEFT, IN FRONT OF INTERSECTION. | 1) INFORM THAT OWN VEHICLE IS ENTERING INTO INTERSECTION BETWEEN VEHICLES, VIA ELECTRONIC MIRROR (TWO-WAY COMMUNICATION TERMINAL) INSTALLED AT OBSTRUCTED INTERSECTION. 2) ELECTRONIC MIRROR (TRANSMISSION UNIT) MONITORS VEHICLE ENTERING INTO INTERSECTION BY, FOR EXAMPLE, CAMERA AND IMAGE RECOGNITION, AND TRANSMITS THIS AS INTERSECTION INFORMATION. VEHICLE HAVING RECEIVER MOUNTED THEREON EXTRACTS EFFECTIVE INFORMATION FOR OWN TRAVELING DIRECTION, AND INFORMS THE INFORMATION TO THE DRIVER. |
| | | | | | | RECOGNIZE OTHER VEHICLE BY CORNER MIRROR. | O | O | · ELECTRONIC MIRROR THAT RECEIVES DATA FROM VEHICLE ENTERING INTO INTERSECTION AND TRANSMITS DATA<br>· ELECTRONIC MIRROR THAT CAN RECOGNIZE SITUATION OF INTERSECTION AND TRANSMIT DATA | | | | | | | |
| | | | | | | ☆RECOGNIZE OTHER VEHICLE BY HORN SOUNDED BY OTHER PARTY. | △ | △ | MULTI-MICROPHONE/SOUND PROCESSING RADIO COMMUNICATIONS THAT CAN RECOGNIZE INCOMING DIRECTION OF PERIPHERAL NOISE AROUND OWN VEHICLE AND TYPE OF NOISE | | | | | | | INFORM PRESENCE OF OWN VEHICLE TO OTHER PARTY BY DRIVER'S OPERATION OF HORN, SIGNAL, OR COMMUNICATION UNIT. |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | | ☆RECOGNIZE APPROACHING VEHICLE BY SIGNAL FROM OTHER PARTY. | △ | △ | RADIO COMMUNICATIONS | | | | | | | |
| | | | | | | RECOGNIZE WHETHER OTHER PARTY IS EMERGENCY VEHICLE. | ○ | ○ | · SPOT CAMERA THAT CAN CATCH AND FOLLOW VEHICLES ENTERING INTO INTERSECTION<br>· IMAGE PROCESSING THAT CAN RECOGNIZE EMERGENCY VEHICLE<br>· RADIO SYSTEM BY WHICH EMERGENCY VEHICLE TRANSMIT OWN PRESENCE TO SURROUNDING VEHICLES AND SURROUNDING VEHICLES CAN RECEIVE DATA | DETERMINE THAT OTHER PARTY IS GIVEN PRIORITY. | | ○ | ○ | | BECOME MORE CAREFUL TO PRIORITIZED VEHICLES ENTERING INTO INTERSECTION FROM RIGHT AND LEFT, IN FRONT OF INTERSECTION. | RECOGNIZE EMERGENCY VEHICLE AUTONOMOUSLY BY CAMERA + IMAGE PROCESSING, AND DETERMINE TRAFFIC ORDER AT INTERSECTION. |
| | | | | | | RECOGNIZE OTHER PARTY'S DRIVING HISTORY. | × | × | · DRIVING HISTORY DATABASE OF INDIVIDUALS<br>· RADIO COMMUNICATIONS ENABLING COMMUNICATION BETWEEN VEHICLES EVEN AT THE TIME OF DRIVING<br>· RADIO SYSTEM ENABLING COMMUNICATION BETWEEN TRANSMITTER INSTALLED AT INTERSECTION AND CAR UNIT EVEN AT THE TIME OF DRIVING | DETERMINE THAT STOPPING IS ADVISABLE (ADVISE TO STOP). | | × | × | | DO NOT APPROACH DANGEROUS CAR (DRIVER) ⇒ AVOID INVOLVEMENT IN ACCIDENT | RECEIVE DRIVING HISTORY ANALYSIS DATA, PERFORM DETERMINATION BASED ON OTHER PARTY'S DRIVING HISTORY, AND GIVE WAY TO DRIVER WHOSE DRIVING MANNER IS BAD, TO ENSURE SAFETY. |
| | | | | | | RECOGNIZE OTHER PARTY'S DRIVING STATE (EXAMPLE: TALKING WITH MOBILE PHONE IN HAND). | ○ | ○ | · SPOT CAMERA (WITH FOLLOWING FUNCTION) THAT CAN TAKE PHOTOGRAPHS OF CAR DRIVERS IN FRONT OF AND BEHIND OWN VEHICLE EVEN AT THE TIME OF DRIVING<br>· IMAGE PROCESSING THAT CAN RECOGNIZE DRIVER'S BEHAVIOR (IN CONVERSATION, SPEAKING ON MOBILE PHONE)<br>· RADIO SYSTEM ENABLING COMMUNICATION BETWEEN VEHICLES ABOUT DRIVER'S BEHAVIOR OF OWN VEHICLE | DETERMINE THAT STOPPING IS ADVISABLE (ADVISE TO STOP). | | ○ | ○ | | AVOID DANGEROUS CAR (DRIVER) ⇒ AVOID INVOLVEMENT IN ACCIDENT | RECOGNIZE DRIVING STATE OF OTHER VEHICLES IN FRONT OF AND BEHIND OWN VEHICLE BY CAMERA + IMAGE PROCESSING, AND FOR EXAMPLE, WHEN DRIVER USES MOBILE PHONE, GIVE WAY TO DRIVER, TO ENSURE SAFETY. |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | CONFIRM POSITION OF OWN VEHICLE TO INTERSECTION. | | O | O | DERIVATION OF RELATIVE DISTANCE BETWEEN LOCATIONS (MAP DATA) | DETERMINE (PREDICT) WHETHER COLLISION WILL OCCUR. | | O | O | | RECOGNIZE DANGER OF COLLISION AT INTERSECTION | 1) PREDICT DISTANCE AND TIME TO INTERSECTION BASED ON LOCATION INFORMATION AND POSITION/SPEED INFORMATION OF OWN VEHICLE. 2) USE THE INFORMATION FOR SETTING NOTIFICATION TIMING TO DRIVER. |
| | | | | | RECOGNIZE FOLLOWING VEHICLE. | OBSERVE FOLLOWING VEHICLE BY ROOM MIRROR. | O | O | · PERIPHERAL MONITORING CAMERA THAT CAN TAKE PHOTOGRAPHS OF VEHICLES AT BACK AND ON SIDE · IMAGE PROCESSING FOR RECOGNIZING TYPE AND DISTANCE OF VEHICLES AT BACK AND ON SIDE | AVOID OTHER PARTY'S VEHICLE. | PUT ON BRAKES. | O | O | | COLLISION CAN BE AVOIDED. | 1) MONITOR VEHICLES BACK AND FORTH BEFORE ENTERING INTO INTERSECTION, BASED ON IMAGE INFORMATION FROM PERIPHERAL MONITORING CAMERA, TO RECOGNIZE RELATIVE DISTANCE WITH OWN VEHICLE, SPEED, AND TYPE OF OTHER PARTY'S VEHICLE. 2) BASED ON THE INFORMATION, WHEN VEHICLE HAVING COLLISION PROBABILITY IS FOUND IN INTERSECTION, NOTIFY DECELERATION TO FOLLOWING VEHICLES TO URGE PREVENTION OF BUMPING FROM BEHIND. |
| | | | | | RECOGNIZE VEHICLE TRAVELING ON BOTH SIDES. | OBSERVE VEHICLE ON BOTH SIDES BY DOOR MIRROR. | O | O | ↑ | | TURN STEERING WHEEL. | O | O | | COLLISION CAN BE AVOIDED. | |
| | | | | | | OBSERVE BOTH SIDES BY EYES WITH MOVING HEAD. | O | O | ↑ | | PREPARE BEFOREHAND SO AS TO BE BRAKED QUICKLY. | × | O | | EVEN DRIVER HAVING WEAK STRENGTH OF LEGS CAN PUT ON BRAKES POWERFULLY, TO SHORTEN BRAKING DISTANCE. | ASSIST PREPARATION PROCESSING FOR BRAKES AND STEERING RELATING TO SURROUNDINGS MONITORING BEHAVIOR (PROCESSING) BEFORE AVOIDING COLLISION. |
| | | | | | RECOGNIZE ONCOMING VEHICLE (OPPOSITE LANE FOR ESCAPE). | OBSERVE ONCOMING VEHICLE BY EYES. | O | O | ↑ | | PREPARE BEFOREHAND SO AS TO TURN STEERING WHEEL LIGHTLY. | × | O | | STEERING WHEEL CAN BE TURNED QUICKLY. | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | JUDGMENT ERROR | ASSUME DECELERATION OF OTHER PARTY | RECOGNIZE STOP SIGN. | | O | O | · SPOT CAMERA THAT CAN PERCEIVE AND FOLLOW SIGNS OF INTERSECTION DURING DRIVING<br>· IMAGE PROCESSING THAT CAN RECOGNIZE TYPE OF SIGNS AND STATE OF TRAFFIC LIGHT<br>· RADIO COMMUNICATIONS THAT CAN NOTIFY TYPE OF SIGNS AND STATE OF TRAFFIC LIGHT | | | | | | | |
| | | | | | RECOGNIZE TRAFFIC LIGHT. | RECOGNIZE TRAFFIC LIGHT (RED OR GREEN). | O | O | ↑ | | | | | | | |
| | | | | | RECOGNIZE INTERSECTION. | | O | O | ↑ | DETERMINE THAT IT IS ACCIDENT PRONE INTERSECTION. | | × | △ (DATABASE) | COLLISION TENDENCY ANALYSIS (ACCIDENT HISTORY DATABASE) | PREVENT ACCIDENT OCCURRING DUE TO VISUAL FALSE IMPRESSION (EXAMPLE: PREVENT COLLISION AT OPEN INTERSECTION). | |
| | | | | | RECOGNIZE OTHER PARTY'S VEHICLE. | OBSERVE OTHER PARTY'S VEHICLE BY EYES. | O | O | IMAGE PROCESSING THAT CAN RECOGNIZE VEHICLES AND TYPE OF VEHICLE | DETERMINE THAT VEHICLE (OTHER PARTY) ENTERS INTO INTERSECTION. | | O | O | | BECOME MORE CAREFUL TO VEHICLES ENTERING INTO INTERSECTION FROM RIGHT AND LEFT, IN FRONT OF INTERSECTION. | |
| | | | | | | RECOGNIZE OTHER PARTY'S VEHICLE BY CORNER MIRROR. | O | O | · ELECTRONIC MIRROR THAT RECEIVES DATA FROM VEHICLE ENTERING INTO INTERSECTION AND TRANSMITS DATA<br>· ELECTRONIC MIRROR THAT CAN RECOGNIZE SITUATION OF INTERSECTION AND TRANSMIT DATA | | | | | | | |
| | | | | | | ☆RECOGNIZE OTHER PARTY'S VEHICLE BY HORN SOUNDED BY OTHER PARTY. | △ | △ | MULTI-MICROPHONE/SOUND PROCESSING RADIO COMMUNICATIONS THAT CAN RECOGNIZE INCOMING DIRECTION OF PERIPHERAL NOISE AROUND OWN VEHICLE AND TYPE OF NOISE | | | | | | | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | | ☆RECOGNIZE APPROACHING VEHICLE BY SIGNAL FROM OTHER PARTY. | △ | △ | RADIO COMMUNICATIONS | | | | | | | |
| | | | | | | RECOGNIZE WHETHER OTHER PARTY IS EMERGENCY VEHICLE. | ○ | ○ | · SPOT CAMERA THAT CAN CATCH AND FOLLOW VEHICLES ENTERING INTO INTERSECTION<br>· IMAGE PROCESSING THAT CAN RECOGNIZE EMERGENCY VEHICLE<br>· RADIO SYSTEM BY WHICH EMERGENCY VEHICLE TRANSMIT OWN PRESENCE TO SURROUNDING VEHICLES AND SURROUNDING VEHICLES CAN RECEIVE DATA | DETERMINE THAT OTHER PARTY IS GIVEN PRIORITY. | | ○ | ○ | | BECOME MORE CAREFUL TO PRIORITIZED VEHICLES ENTERING INTO INTERSECTION FROM RIGHT AND LEFT, IN FRONT OF INTERSECTION. | |
| | | | | | | RECOGNIZE OTHER PARTY'S DRIVING HISTORY. | × | × | · DRIVING HISTORY DATABASE OF INDIVIDUALS<br>· RADIO COMMUNICATIONS ENABLING COMMUNICATION BETWEEN VEHICLES EVEN AT THE TIME OF DRIVING<br>· RADIO SYSTEM ENABLING COMMUNICATION BETWEEN TRANSMITTER INSTALLED AT INTERSECTION AND CAR UNIT EVEN AT THE TIME OF DRIVING | DETERMINE THAT STOPPING IS ADVISABLE (ADVISE TO STOP). | | × | × | | DO NOT APPROACH DANGEROUS CAR (DRIVER) ⇒ AVOID INVOLVEMENT IN ACCIDENT | |
| | | | | | | RECOGNIZE OTHER PARTY'S DRIVING STATE (EXAMPLE: TALKING WITH MOBILE PHONE IN HAND). | ○ | ○ | · SPOT CAMERA (WITH FOLLOWING FUNCTION) THAT CAN TAKE PHOTOGRAPHS OF CAR DRIVERS IN FRONT OF AND BEHIND OWN VEHICLE EVEN AT THE TIME OF DRIVING<br>· IMAGE PROCESSING THAT CAN RECOGNIZE DRIVER'S BEHAVIOR (IN CONVERSATION, SPEAKING ON MOBILE PHONE)<br>· RADIO SYSTEM ENABLING COMMUNICATION BETWEEN VEHICLES ABOUT DRIVER'S BEHAVIOR OF OWN VEHICLE | DETERMINE THAT STOPPING IS ADVISABLE (ADVISE TO STOP). | | ○ | ○ | | AVOID DANGEROUS CAR (DRIVER) ⇒ AVOID INVOLVEMENT IN ACCIDENT | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | CONFIRM POSITION OF OWN VEHICLE TO INTERSECTION. | | O | O | DERIVATION OF RELATIVE DISTANCE BETWEEN LOCATIONS (MAP DATA) | DETERMINE (PREDICT) WHETHER COLLISION WILL OCCUR. | | O | O | | RECOGNIZE DANGER OF COLLISION AT INTERSECTION. | |
| | | | | | RECOGNIZE THAT OTHER PARTY DOES NOT DECELERATE. | MEASURE DISTANCE BETWEEN OTHER PARTY'S VEHICLE AND OWN VEHICLE BY EYES. | O | O | | DETERMINE (PREDICT) WHETHER COLLISION WILL OCCUR. | | O | O | | RECOGNIZE DANGER OF COLLISION AT INTERSECTION. | RECEIVE TRANSMISSION DATA FROM OTHER PARTY'S VEHICLE CORRESPONDING TO HORN AND SIGNAL, AND DETERMINE THAT OTHER PARTY DOES NOT DECELERATE. |
| | | | | | | RECOGNIZE VEHICLE BY HORN SOUNDED FROM OTHER PARTY. | △ | △ | | | | | | | | |
| | | | | | | RECOGNIZE VEHICLE BY SIGNAL FROM OTHER PARTY. | △ | △ | | | | | | | | |
| | | | | | RECOGNIZE FOLLOWING VEHICLE. | OBSERVE FOLLOWING VEHICLES BY ROOM MIRROR | O | O | · PERIPHERAL MONITORING CAMERA THAT CAN TAKE PHOTOGRAPHS OF VEHICLES AT BACK AND ON SIDE<br>· IMAGE PROCESSING FOR RECOGNIZING TYPE AND DISTANCE OF VEHICLES AT BACK AND ON SIDE | AVOID OTHER PARTY'S VEHICLE. | PUT ON BRAKES. | O | O | | COLLISION CAN BE AVOIDED. | |
| | | | | | RECOGNIZE VEHICLE TRAVELING ON BOTH SIDES. | OBSERVE VEHICLE ON BOTH SIDES BY DOOR MIRROR. | O | O | ↑ | | TURN STEERING WHEEL. | | | | COLLISION CAN BE AVOIDED. | |
| | | | | | | OBSERVE BOTH SIDES BY EYES WITH MOVING HEAD. | O | O | ↑ | | PREPARE BEFOREHAND SO AS TO BE BRAKED QUICKLY. | | | | EVEN DRIVER HAVING WEAK STRENGTH OF LEGS CAN PUT ON BRAKES POWERFULLY, TO SHORTEN BRAKING DISTANCE. | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | RECOGNIZE ONCOMING VEHICLE (OPPOSITE LANE FOR ESCAPE). | OBSERVE ONCOMING VEHICLE BY EYES. | O | O | | | PREPARE BEFOREHAND SO AS TO TURN STEERING WHEEL LIGHTLY | × | O | | STEERING WHEEL CAN BE TURNED QUICKLY. | |
| | | | DETECTION DELAY, JUDGMENT ERROR | VIOLATE TRAFFIC RULE TO STOP | RECOGNIZE STOP SIGN. | | O | O | · SPOT CAMERA THAT CAN PERCEIVE AND FOLLOW SIGNS OF INTERSECTION DURING DRIVING<br>· IMAGE PROCESSING THAT CAN RECOGNIZE TYPE OF SIGNS AND STATE OF TRAFFIC LIGHT<br>· RADIO COMMUNICATIONS THAT CAN NOTIFY TYPE OF SIGNS AND STATE OF TRAFFIC LIGHT | DETERMINE DANGER BASED ON INFORMATION FOR SUPPRESSING VIOLATION | DETERMINE DANGER BASED ON TRAFFIC VIOLATION HISTORY INFORMATION. | × | × | DRIVING TENDENCY ANALYSIS (DRIVING HISTORY DATABASE) AUTHENTICATION OF INDIVIDUALS | POSITIVELY WARN DRIVER WHOSE DRIVING MANNER IS BAD.<br>ADD POINTS TO DRIVER WHOSE DRIVING MANNER IS GOOD, AND FOR EXAMPLE, GIVE DISCOUNT FOR INSURANCE PREMIUM. | WARN DRIVER WHOSE DRIVING MANNER IS BAD BASED ON DRIVING TENDENCY ANALYSIS DATA, NEAR INTERSECTION. |
| | | | | IGNORE TRAFFIC LIGHT | RECOGNIZE TRAFFIC LIGHT. | RECOGNIZE TRAFFIC LIGHT STATE (COLOR, LIGHTING POSITION). | O | O | ↑ | | | | | | CAN RELIABLY RECOGNIZE TRAFFIC LIGHT EVEN WHEN THEY CANNOT BE SEEN CLEARLY DUE TO BACKLIGHT OR REFLECTION. | CATCH TRAFFIC LIGHT BY CAMERA, AND FOR EXAMPLE, BY APPLYING IMAGE PROCESSING SUCH AS CHANGING CONTRAST LIGHTING STATE OF TRAFFIC LIGHT IS RECOGNIZED AND DETERMINED, TO INFORM DRIVER OF TRAFFIC LIGHT. |
| | | | | | RECOGNIZE INTERSECTION. | | O | O | ↑ | DETERMINE THAT IT IS ACCIDENT PRONE INTERSECTION. | DETERMINE DANGER BASED ON ACCIDENT CONDITION DATA. | × | (DATABASE)△ | COLLISION TENDENCY ANALYSIS (ACCIDENT HISTORY DATABASE) | PREVENT ACCIDENT OCCURRING DUE TO VISUAL FALSE IMPRESSION (EXAMPLE: PREVENT COLLISION AT OPEN INTERSECTION). | |
| | | | | | RECOGNIZE OTHER PARTY'S VEHICLE. | OBSERVE OTHER PARTY'S VEHICLE BY EYES. | O | O | IMAGE PROCESSING THAT CAN RECOGNIZE VEHICLE AND TYPE OF VEHICLE | DETERMINE THAT VEHICLE (OTHER PARTY) ENTERS INTO INTERSECTION. | | O | O | | BECOME MORE CAREFUL TO VEHICLES ENTERING INTO INTERSECTION FROM RIGHT AND LEFT, IN FRONT OF INTERSECTION. | |

| SERVICE FIELD | TARGET | SITUATION | MAIN CAUSE | SIGNIFICANT CASE | PERCEPTION/ RECOGNITION OF INFORMATION (1) | PERCEPTION/ RECOGNITION OF INFORMATION (2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | | RECOGNIZE OTHER PARTY'S VEHICLE BY CORNER MIRROR. | ○ | ○ | · ELECTRONIC MIRROR THAT RECEIVES DATA FROM VEHICLE ENTERING INTO INTERSECTION AND TRANSMITS DATA<br>· ELECTRONIC MIRROR THAT CAN RECOGNIZE SITUATION OF INTERSECTION AND TRANSMIT DATA | | | | | | | |
| | | | | | | ☆RECOGNIZE OTHER PARTY'S VEHICLE BY HORN SOUNDED BY OTHER PARTY. | △ | △ | MULTI-MICROPHONE/SOUND PROCESSING RADIO COMMUNICATIONS THAT CAN RECOGNIZE INCOMING DIRECTION OF PERIPHERAL NOISE AROUND OWN VEHICLE AND TYPE OF NOISE | | | | | | | |
| | | | | | | ☆RECOGNIZE OTHER PARTY'S VEHICLE BY SIGNAL FROM OTHER PARTY. | △ | △ | RADIO COMMUNICATIONS | | | | | | | |
| | | | | | | RECOGNIZE WHETHER OTHER PARTY'S VEHICLE IS EMERGENCY VEHICLE. | ○ | ○ | · SPOT CAMERA THAT CAN CATCH AND FOLLOW VEHICLES ENTERING INTO INTERSECTION<br>· IMAGE PROCESSING THAT CAN RECOGNIZE EMERGENCY VEHICLE<br>· RADIO SYSTEM BY WHICH EMERGENCY VEHICLE TRANSMIT OWN PRESENCE TO SURROUNDING VEHICLES AND SURROUNDING VEHICLES CAN RECEIVE DATA | DETERMINE THAT OTHER PARTY IS GIVEN PRIORITY. | | ○ | ○ | | BECOME MORE CAREFUL TO PRIORITIZED VEHICLES ENTERING INTO INTERSECTION FROM RIGHT AND LEFT, IN FRONT OF INTERSECTION. | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | | RECOGNIZE OTHER PARTY'S DRIVING HISTORY. | × | × | · DRIVING HISTORY DATABASE OF INDIVIDUALS<br>· RADIO COMMUNICATIONS ENABLING COMMUNICATION BETWEEN VEHICLES EVEN AT THE TIME OF DRIVING<br>· RADIO SYSTEM ENABLING COMMUNICATION BETWEEN TRANSMITTER INSTALLED AT INTERSECTION AND CAR UNIT EVEN AT THE TIME OF DRIVING | DETERMINE THAT STOPPING IS ADVISABLE (ADVISE TO STOP). | | × | × | | AVOID DANGEROUS CAR (DRIVER) ⇒ AVOID INVOLVEMENT IN ACCIDENT | |
| | | | | | | RECOGNIZE OTHER PARTY'S DRIVING SITUATION (EXAMPLE: TALKING WITH MOBILE PHONE IN HAND). | ○ | ○ | · SPOT CAMERA (WITH FOLLOWING FUNCTION) THAT CAN TAKE PHOTOGRAPHS OF CAR DRIVERS IN FRONT OF AND BEHIND OWN VEHICLE EVEN AT THE TIME OF DRIVING<br>· IMAGE PROCESSING THAT CAN RECOGNIZE DRIVER'S BEHAVIOR (IN CONVERSATION, SPEAKING ON MOBILE PHONE)<br>· RADIO SYSTEM ENABLING COMMUNICATION BETWEEN VEHICLES ABOUT DRIVER'S BEHAVIOR OF OWN VEHICLE | DETERMINE THAT STOPPING IS ADVISABLE (ADVISE TO STOP). | | ○ | ○ | | AVOID DANGEROUS CAR (DRIVER) ⇒ AVOID INVOLVEMENT IN ACCIDENT | |
| | | | | | CONFIRM POSITION OF OWN VEHICLE TO INTER-SECTION. | | ○ | ○ | DERIVATION OF RELATIVE DISTANCE BETWEEN LOCATIONS (MAP DATA) | DETER-MINE (PREDICT) WHETHER COLLISION WILL OCCUR. | | ○ | ○ | | RECOGNIZE DANGER OF COLLISION AT INTER-SECTION. | |
| | | | | | RECOGNIZE FOLLOWING VEHICLE. | OBSERVE FOLLOWING VEHICLE BY ROOM MIRROR. | ○ | ○ | · PERIPHERAL MONITORING CAMERA THAT CAN TAKE PHOTOGRAPHS OF VEHICLES AT BACK AND ON SIDE<br>· IMAGE PROCESSING FOR RECOGNIZING TYPE AND DISTANCE OF VEHICLES AT BACK AND ON SIDE | AVOID OTHER PARTY'S VEHICLE. | PUT ON BRAKES. | ○ | ○ | | COLLISION CAN BE AVOIDED. | |
| | | | | | RECOGNIZE VEHICLE ON SIDE. | OBSERVE VEHICLE ON BOTH SIDES BY DOOR MIRROR. | ○ | ○ | ↑ | | TURN STEERING WHEEL. | ○ | ○ | | COLLISION CAN BE AVOIDED. | |

| SERVICE FIELD | TARGET | SITUATION | MAIN CAUSE | SIGNIFICANT CASE | PERCEPTION/ RECOGNITION OF INFORMATION(1) | PERCEPTION/ RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | | OBSERVE VEHICLES BY EYES BY MOVING HEAD. | O | O | ↑ | | PREPARE TO PUT ON BRAKES QUICKLY. | × | O | | EVEN DRIVER HAVING WEAK STRENGTH OF LEGS CAN PUT ON BRAKES POWERFULLY, TO SHORTEN BRAKING DISTANCE. | |
| | | | | | RECOGNIZE ONCOMING VEHICLE (OPPOSITE LANE FOR ESCAPE). | OBSERVE ONCOMING VEHICLE BY EYES. | O | O | ↑ | | PREPARE TO TURN STEERING WHEEL QUICKLY. | × | O | | STEERING WHEEL CAN BE TURNED QUICKLY. | |
| | | | DETECTION DELAY | LOW VISIBILITY DURING NIGHTTIME OR DUE TO BAD WEATHER | RECOGNIZE OTHER PARTY'S VEHICLE. | ☆RECOGNIZE OTHER PARTY'S VEHICLE WITH LIGHT. | O | O | DETECTION PROCESSING OF INVISIBLE LIGHT DURING DAYTIME, FOR CONFIRMING PRESENCE OF VEHICLES, AS LIGHTING EFFECT AT NIGHT | DETERMINE THAT VEHICLE (OTHER PARTY) ENTERS INTO INTERSECTION. | | × | O | | BECOME MORE CAREFUL TO VEHICLES ENTERING INTO INTERSECTION FROM RIGHT AND LEFT, IN FRONT OF INTERSECTION (EVEN IN DAYTIME, SAME POSITION DETECTION EFFECT CAN BE OBTAINED AS IN NIGHTTIME). | RECOGNIZE LEVEL OF BRIGHTNESS OF LIGHT, AND WHEN BRIGHTNESS INCREASES, IT IS DETERMINED THAT VEHICLE IS APPROACHING INTERSECTION, AND WARN DRIVER BEFORE GOING INTO INTERSECTION. |
| | | | | | | | × | × | · ELECTRONIC MIRROR THAT RECEIVES DATA FROM VEHICLE ENTERING INTO INTERSECTION AND TRANSMITS DATA<br>· ELECTRONIC MIRROR THAT CAN RECOGNIZE SITUATION OF INTERSECTION AND TRANSMIT DATA | | | | | | | |
| | | | | | HAVING SAME FUNCTION AS CASE OF VIOLATION OF TRAFFIC RULE TO STOP, IGNORING TRAFFIC LIGHTS, AND OVERSIGHT, AND ADD THIS TO FUNCTION OF FINDING OTHER VEHICLES. | | | | | | | | | | | |
| | | | DETECTION DELAY | CARELESS DRIVING | SAME AS CASE OF VIOLATION OF TRAFFIC RULE TO STOP, IGNORING TRAFFIC LIGHTS, AND OVERSIGHT | | | | | | | | | | | |
| | | | JUDGMENT ERROR | OPERATION ERROR | HAVING SAME FUNCTION AS CASE OF VIOLATION OF TRAFFIC RULE TO STOP, IGNORING TRAFFIC LIGHTS, AND OVERSIGHT, AND PARTICULARLY, PREVENT THESE BY PROVIDING INFORMATION BEFOREHAND. | | | | | | | | | | | |

FIG.15

[PREVENTION AND SAFETY]
PREVENTION OF HEAD-TO-HEAD COLLISION/APPROACHING INTERSECTION WITH OR WITHOUT TRAFFIC LIGHT

[AVAILABILITY BY HUMAN]
○: CAN DO BY ONESELF WITHOUT FAIL
△: ESTABLISHED BY APPROACH FROM OTHER PARTY
(EXAMPLE: ESTABLISHED BY APPROACH FROM VEHICLES OR ROADSIDE)
×: NOT ESTABLISHED WITHOUT INFORMATION OF VEHICLE TO VEHICLE

[AVAILABILITY BY AUTOMATIC PROCESSING]
○: CAN DO BY ITSELF WITHOUT FAIL
△: ESTABLISHED BY APPROACH FROM OTHER PARTY
(EXAMPLE: ESTABLISHED BY APPROACH FROM VEHICLES OR ROADSIDE)
×: NOT ESTABLISHED WITHOUT INFORMATION OF VEHICLE TO VEHICLE

[AVAILABILITY BY HUMAN]
○: CAN DO BY ONESELF WITHOUT FAIL
×: CANNOT DO BY ONESELF

[AVAILABILITY BY AUTOMATIC PROCESSING]
○: CAN DO BY ITSELF WITHOUT FAIL
×: ESTABLISHED BY ACCUMULATED INFORMATION (1)

| SERVICE FIELD | | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|---|
| PREVENTION AND SAFETY | HEAD-TO-HEAD | REDUCE NUMBER OF CASUALTIES BY HALF | TURNING RIGHT AT INTERSECTION WITHOUT TRAFFIC LIGHT | | | | | | | | | | | | | | |
| | | | TURNING RIGHT AT INTERSECTION WITH TRAFFIC LIGHT | | | | | | | | | | | | | | |
| | | | TURNING RIGHT AT INTERSECTION WITHOUT TRAFFIC LIGHT | DETECTION DELAY | OVERSIGHT | RECOGNIZE STOP SIGN. | | ○ | ○ | · SPOT CAMERA THAT CAN PERCEIVE AND FOLLOW SIGNS OF INTERSECTION DURING DRIVING<br>· IMAGE PROCESSING THAT CAN RECOGNIZE TYPE OF SIGNS AND STATE OF TRAFFIC LIGHT<br>· RADIO COMMUNICATIONS THAT CAN NOTIFY TYPE OF SIGNS AND STATE OF TRAFFIC LIGHT | | | | | | | |

| SERVICE FIELD | TARGET | SITUATION | MAIN CAUSE | SIGNIFICANT CASE | PERCEPTION/ RECOGNITION OF INFORMATION(1) | PERCEPTION/ RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | TURNING RIGHT AT INTERSECTION WITH TRAFFIC LIGHT | | | RECOGNIZE TRAFFIC LIGHT. | RECOGNIZE WHETHER TRAFFIC LIGHT IS RED OR GREEN. | O | O | ↑ | | | | | | | |
| | | | | | RECOGNIZE INTERSECTION. | | O | O | ↑ | DETERMINE THAT IT IS ACCIDENT PRONE INTERSECTION. | | × | (DATABASE)△ | COLLISION TENDENCY ANALYSIS (ACCIDENT HISTORY DATABASE) | PREVENT ACCIDENT DUE TO VISUAL FALSE IMPRESSION (EXAMPLE: PREVENT COLLISION AT OPEN INTERSECTION). | |
| | | | | | RECOGNIZE OTHER VEHICLE. | OBSERVE OTHER PARTY'S VEHICLE BY EYES. | O | O | IMAGE PROCESSING THAT CAN RECOGNIZE VEHICLES AND TYPE OF VEHICLE | DETERMINE THAT VEHICLE (OTHER PARTY) ENTERS INTO INTERSECTION. | | O | O | | BECOME MORE CAREFUL TO VEHICLES ENTERING INTO INTERSECTION FROM RIGHT AND LEFT, IN FRONT OF INTERSECTION. | |
| | | | | | | RECOGNIZE OTHER PARTY'S VEHICLE BY CORNER MIRROR. | O | O | · ELECTRONIC MIRROR THAT RECEIVES DATA FROM VEHICLE ENTERING INTO INTERSECTION AND TRANSMITS DATA<br>· ELECTRONIC MIRROR THAT CAN RECOGNIZE SITUATION OF INTERSECTION AND TRANSMIT DATA | | | | | | | |
| | | | | | | ☆RECOGNIZE VEHICLE BY HORN SOUNDED FROM OTHER PARTY. | △ | △ | MULTI-MICROPHONE/SOUND PROCESSING RADIO COMMUNICATIONS THAT CAN RECOGNIZE INCOMING DIRECTION OF PERIPHERAL NOISE AROUND OWN VEHICLE AND TYPE OF NOISE | | | | | | | |

| SERVICE FIELD | TARGET | SITUATION | MAIN CAUSE | SIGNIFICANT CASE | PERCEPTION/RECOGNITION OF INFORMATION (1) | PERCEPTION/RECOGNITION OF INFORMATION (2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | | ☆RECOGNIZE OTHER VEHICLE BY SIGNAL FROM OTHER PARTY. | △ | △ | RADIO COMMUNICATIONS | | | | | | | |
| | | | | | | RECOGNIZE WHETHER OTHER PARTY IS EMERGENCY VEHICLE. | ○ | ○ | · SPOT CAMERA THAT CAN CATCH AND FOLLOW VEHICLES ENTERING INTO INTERSECTION<br>· IMAGE PROCESSING THAT CAN RECOGNIZE EMERGENCY VEHICLE<br>· RADIO SYSTEM BY WHICH EMERGENCY VEHICLE TRANSMIT OWN PRESENCE TO SURROUNDING VEHICLES AND SURROUNDING VEHICLES CAN RECEIVE DATA | DETERMINE THAT OTHER PARTY IS GIVEN PRIORITY. | | ○ | ○ | | BECOME MORE CAREFUL TO PRIORITIZED VEHICLES ENTERING INTO INTERSECTION FROM RIGHT AND LEFT, IN FRONT OF INTERSECTION. | |
| | | | | | | RECOGNIZE OTHER PARTY'S DRIVING HISTORY. | × | × | · DRIVING HISTORY DATABASE OF INDIVIDUALS<br>· RADIO COMMUNICATIONS ENABLING COMMUNICATION BETWEEN VEHICLES EVEN AT THE TIME OF DRIVING<br>· RADIO SYSTEM ENABLING COMMUNICATION BETWEEN TRANSMITTER INSTALLED AT INTERSECTION AND CAR UNIT EVEN AT THE TIME OF DRIVING | DETERMINE THAT STOPPING IS ADVISABLE (ADVISE TO STOP). | | × | × | | DO NOT APPROACH DANGEROUS CAR (DRIVER) ⇒ AVOID INVOLVEMENT IN ACCIDENT | |
| | | | | | | ☆RECOGNIZE OTHER PARTY'S DRIVING STATE (EXAMPLE: TALKING WITH MOBILE PHONE IN HAND). | ○ | ○ | · SPOT CAMERA (WITH FOLLOWING FUNCTION) THAT CAN TAKE PHOTOGRAPHS OF CAR DRIVERS IN FRONT OF AND BEHIND OWN VEHICLE EVEN AT THE TIME OF DRIVING<br>· IMAGE PROCESSING THAT CAN RECOGNIZE DRIVER'S BEHAVIOR (IN CONVERSATION, SPEAKING ON MOBILE PHONE)<br>· RADIO SYSTEM ENABLING COMMUNICATION BETWEEN VEHICLES ABOUT DRIVER'S BEHAVIOR OF OWN VEHICLE | DETERMINE THAT STOPPING IS ADVISABLE (ADVISE TO STOP). | | ○ | ○ | | AVOID DANGEROUS CAR (DRIVER) ⇒ AVOID INVOLVEMENT IN ACCIDENT | |
| | | | | | CONFIRM POSITION OF OWN VEHICLE TO INTERSECTION. | | ○ | ○ | DERIVATION OF RELATIVE DISTANCE BETWEEN LOCATIONS (MAP DATA) | DETERMINE (PREDICT) WHETHER COLLISION WILL OCCUR. | | ○ | ○ | | RECOGNIZE DANGER OF COLLISION AT INTERSECTION. | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | RECOGNIZE PEDESTRIANS AND PERSONS ON BICYCLE WHEN TURNING TO RIGHT. | OBSERVE PEDESTRIANS AND PERSONS ON BICYCLE BY EYES. | O | O | · PERIPHERAL MONITORING CAMERA THAT CAN TAKE PHOTOGRAPHS OF PEDESTRIANS AND PERSONS ON BICYCLE WHEN TURNING TO RIGHT<br>· IMAGE PROCESSING THAT CAN RECOGNIZE DIRECTION, DISTANCE, AND MOVING SPEED OF PEDESTRIANS AND PERSONS ON BICYCLE | AVOID OTHER PARTY'S VEHICLE. | PUT ON BRAKES. | O | O | | COLLISION CAN BE AVOIDED.<br>SAFETY OF PEDESTRIANS AND PERSONS ON BICYCLE CAN BE ENSURED AT THE TIME OF TURNING TO RIGHT. | 1) PEDESTRIANS AND PERSONS ON BICYCLE CAN BE ENSURED WHEN TURNING TO RIGHT ARE MONITORED BEFORE TURNING TO RIGHT, BASED ON IMAGE INFORMATION FROM PERIPHERAL MONITORING CAMERA, AND WHEN THERE IS DANGER WHEN TURNING TO RIGHT, THIS MATTER IS INFORMED TO DRIVER.<br>2) WHEN THERE IS DANGER WHEN TURNING TO RIGHT, INSTRUCT DRIVER TO TURN TO RIGHT AT SLOW SPEED (OR NOT TO TURN RIGHT). |
| | | | | | | OBSERVE SURROUNDINGS UNTIL REACHING INTERSECTION. | O | O | ↑ | | TURN STEERING WHEEL. | O | O | | COLLISION CAN BE AVOIDED.<br>SAFETY OF PEDESTRIANS AND PERSONS ON BICYCLE CAN BE ENSURED AT THE TIME OF TURNING TO RIGHT. | |
| | | | | | | | | | ↑ | | PREPARE BEFOREHAND SO AS TO BE BRAKED QUICKLY. | × | O | | EVEN DRIVER HAVING WEAK STRENGTH OF LEGS CAN PUT ON BRAKES POWERFULLY, TO SHORTEN BRAKING DISTANCE. | WHEN TURNING TO RIGHT, PERFORM ASSIST PREPARATION PROCESSING FOR ONLY BRAKES RELATING TO SURROUNDINGS MONITORING BEHAVIOR (PROCESSING) BEFORE AVOIDING COLLISION. |
| | | | | | | | | | ↑ | | PREPARE BEFOREHAND SO AS TO TURN STEERING WHEEL LIGHTLY. | × | O | | STEERING WHEEL CAN BE TURNED QUICKLY. | |
| | | | JUDGMENT ERROR | ASSUME DECELERATION OF OTHER PARTY | RECOGNIZE STOP SIGN. | | O | O | · SPOT CAMERA THAT CAN PERCEIVE AND FOLLOW SIGNS OF INTERSECTION DURING DRIVING<br>· IMAGE PROCESSING THAT CAN RECOGNIZE TYPE OF SIGNS AND STATE OF TRAFFIC LIGHT<br>· RADIO COMMUNICATIONS THAT CAN NOTIFY TYPE OF SIGNS AND STATE OF TRAFFIC LIGHT | | | | | | | |
| | | | | | RECOGNIZE TRAFFIC LIGHT. | RECOGNIZE TRAFFIC LIGHT (RED OR GREEN). | O | O | | | | | | | | |

| SERVICE FIELD | TARGET | SITUATION | MAIN CAUSE | SIGNIFICANT CASE | PERCEPTION/ RECOGNITION OF INFORMATION(1) | PERCEPTION/ RECOGNITION OF INFORMATION(2) | | | ELEMENTAL TECHNOLOGY | DETERMINATION /ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | RECOGNIZE INTERSECTION | | O | O | ↑ | DETERMINE THAT IT IS ACCIDENT PRONE INTERSECTION. | | × | △ (DATABASE) | COLLISION TENDENCY ANALYSIS (ACCIDENT HISTORY DATABASE) | PREVENT ACCIDENT DUE TO VISUAL FALSE IMPRESSION (EXAMPLE: PREVENT COLLISION AT OPEN INTERSECTION). | |
| | | | | | RECOGNIZE OTHER PARTY'S VEHICLE | OBSERVE OTHER PARTY'S VEHICLE BY EYES. | O | O | IMAGE PROCESSING THAT CAN RECOGNIZE VEHICLES AND TYPE OF VEHICLE | DETERMINE THAT VEHICLE (OTHER PARTY) ENTERS INTO INTERSECTION. | | O | O | | BECOME MORE CAREFUL TO VEHICLES ENTERING INTO INTERSECTION FROM RIGHT AND LEFT, IN FRONT OF INTERSECTION. | |
| | | | | | | RECOGNIZE OTHER PARTY'S VEHICLE BY CORNER MIRROR. | O | O | · ELECTRONIC MIRROR THAT RECEIVES DATA FROM VEHICLE ENTERING INTO INTERSECTION AND TRANSMITS DATA<br>· ELECTRONIC MIRROR THAT CAN RECOGNIZE SITUATION OF INTERSECTION AND TRANSMIT DATA | | | | | | | |
| | | | | | | ☆RECOGNIZE APPROACHING VEHICLE BY HORN SOUNDED BY OTHER PARTY. | △ | △ | MULTI-MICROPHONE/SOUND PROCESSING RADIO COMMUNICATIONS THAT CAN RECOGNIZE INCOMING DIRECTION OF PERIPHERAL NOISE AROUND OWN VEHICLE AND TYPE OF NOISE | | | | | | | |
| | | | | | | ☆RECOGNIZE APPROACHING VEHICLE BY SIGNAL FROM OTHER PARTY. | △ | △ | RADIO COMMUNICATIONS | | | | | | | |
| | | | | | | RECOGNIZE WHETHER OTHER PARTY'S VEHICLE IS EMERGENCY VEHICLE. | O | O | · SPOT CAMERA THAT CAN CATCH AND FOLLOW VEHICLES ENTERING INTO INTERSECTION<br>· IMAGE PROCESSING THAT CAN RECOGNIZE EMERGENCY VEHICLE<br>· RADIO SYSTEM BY WHICH EMERGENCY VEHICLE TRANSMIT OWN PRESENCE TO SURROUNDING VEHICLES AND SURROUNDING VEHICLES CAN RECEIVE DATA | DETERMINE THAT OTHER PARTY IS GIVEN PRIORITY. | | O | O | | BECOME MORE CAREFUL TO PRIORITIZED VEHICLES ENTERING INTO INTERSECTION FROM RIGHT AND LEFT, IN FRONT OF INTERSECTION. | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | | RECOGNIZE OTHER PARTY'S DRIVING HISTORY. | × | × | · DRIVING HISTORY DATABASE OF INDIVIDUALS<br>· RADIO COMMUNICATIONS ENABLING COMMUNICATION BETWEEN VEHICLES EVEN AT THE TIME OF DRIVING<br>· RADIO SYSTEM ENABLING COMMUNICATION BETWEEN TRANSMITTER INSTALLED AT INTERSECTION AND CAR UNIT EVEN AT THE TIME OF DRIVING | DETERMINE THAT STOPPING IS ADVISABLE (ADVISE TO STOP). | | × | × | | DO NOT APPROACH DANGEROUS CAR (DRIVER) ⇒ AVOID INVOLVEMENT IN ACCIDENT | |
| | | | | | | ☆RECOGNIZE OTHER PARTY'S DRIVING STATE(EXAMPLE: TALKING WITH MOBILE PHONE IN HAND). | O | O | · SPOT CAMERA (WITH FOLLOWING FUNCTION) THAT CAN TAKE PHOTOGRAPHS OF CAR DRIVERS IN FRONT OF AND BEHIND OWN VEHICLE EVEN AT THE TIME OF DRIVING<br>· IMAGE PROCESSING THAT CAN RECOGNIZE DRIVER'S BEHAVIOR (IN CONVERSATION, SPEAKING ON MOBILE PHONE)<br>· RADIO SYSTEM ENABLING COMMUNICATION BETWEEN VEHICLES ABOUT DRIVER'S BEHAVIOR OF OWN VEHICLE | DETERMINE THAT STOPPING IS ADVISABLE (ADVISE TO STOP). | | O | O | | AVOID DANGEROUS CAR (DRIVER) ⇒ AVOID INVOLVEMENT IN ACCIDENT | |
| | | | | | RECOGNIZE POSITION OF OWN VEHICLE TO INTERSECTION. | | O | O | DERIVATION OF RELATIVE DISTANCE BETWEEN LOCATIONS (MAP DATA) | DETERMINE (PREDICT) WHETHER COLLISION WILL OCCUR. | | O | O | | RECOGNIZE DANGER OF COLLISION AT INTERSECTION. | |
| | | | | | RECOGNIZE THAT OTHER PARTY DOES NOT DECELERATE. | MEASURE DISTANCE BETWEEN OTHER PARTY AND OWN VEHICLE BY EYES. | O | O | | DETERMINE (PREDICT) WHETHER COLLISION WILL OCCUR. | | O | O | | RECOGNIZE DANGER OF COLLISION AT INTERSECTION. | |
| | | | | | | RECOGNIZE VEHICLE BY HORN SOUNDED FROM OTHER PARTY. | △ | △ | | | | O | O | | | |
| | | | | | | RECOGNIZE VEHICLE BY SIGNAL FROM OTHER PARTY. | △ | △ | | | | O | O | | | |

| SERVICE FIELD | TARGET | SITUATION | MAIN CAUSE | SIGNIFICANT CASE | PERCEPTION/RECOGNITION OF INFORMATION(1) | PERCEPTION/RECOGNITION OF INFORMATION(2) | | | ELEMENTAL TECHNOLOGY | DETERMINATION/ACTION (1) | DETERMINATION/ACTION (2) | | | ELEMENTAL TECHNOLOGY | MERIT | SUPPLEMENT |
|---|---|---|---|---|---|---|---|---|---|---|---|---|---|---|---|---|
| | | | | | RECOGNIZE PEDESTRIANS AND PERSONS ON BICYCLE WHEN TURNING TO RIGHT. | OBSERVE PEDESTRIANS AND PERSONS ON BICYCLE BY EYES. | ○ | ○ | · PERIPHERAL MONITORING CAMERA THAT CAN TAKE PHOTOGRAPHS OF PEDESTRIANS AND PERSONS ON BICYCLE WHEN TURNING TO RIGHT · IMAGE PROCESSING THAT CAN RECOGNIZE DIRECTION, DISTANCE, AND MOVING SPEED OF PEDESTRIANS AND PERSONS ON BICYCLE | AVOID OTHER PARTY'S VEHICLE. | PUT ON BRAKES. | ○ | ○ | | COLLISION CAN BE AVOIDED. SAFETY OF PEDESTRIANS AND PERSONS ON BICYCLE CAN BE ENSURED AT THE TIME OF TURNING TO RIGHT. | |
| | | | | | | OBSERVE SURROUNDINGS UNTIL REACHING INTERSECTION. | ○ | ○ | ↑ | | TURN STEERING WHEEL | ○ | ○ | | COLLISION CAN BE AVOIDED. SAFETY OF PEDESTRIANS AND PERSONS ON BICYCLE CAN BE ENSURED AT THE TIME OF TURNING TO RIGHT. | |
| | | | | | | PEDESTRIANS AND PERSONS ON BICYCLE ISSUE SIGNAL. | △ | △ | ↑ | | PREPARE BEFOREHAND SO AS TO BE BRAKED QUICKLY. | × | ○ | | EVEN DRIVER HAVING WEAK STRENGTH OF LEGS CAN PUT ON BRAKES POWERFULLY, TO SHORTEN BRAKING DISTANCE. | |
| | | | | | | | | | ↑ | | PREPARE BEFOREHAND SO AS TO TURN STEERING WHEEL LIGHTLY. | × | ○ | | STEERING WHEEL CAN BE TURNED QUICKLY. | |
| | | | JUDGMENT ERROR | LOW VISIBILITY DURING NIGHTTIME OR DUE TO BAD WEATHER | RECOGNIZE OTHER PARTY'S VEHICLE. | ☆RECOGNIZE APPROACHING VEHICLE BY LIGHT. | ○ | ○ | DETECTION PROCESSING OF INVISIBLE LIGHT DURING DAYTIME, FOR CONFIRMING PRESENCE OF VEHICLES, AS LIGHTING EFFECT AT NIGHT | DETERMINE THAT VEHICLE (OTHER PARTY) ENTERS INTO INTERSECTION. | PREPARE BEFOREHAND SO AS TO TURN STEERING WHEEL LIGHTLY. | ○ | ○ | | BECOME MORE CAREFUL TO VEHICLES ENTERING INTO INTERSECTION FROM RIGHT AND LEFT, IN FRONT OF INTERSECTION. (EVEN DURING DAYTIME, POSITION DETECTION EFFECT CAN BE OBTAINED WITH SAME LIGHT AS IN NIGHTTIME.) | |
| | | | | | | | × | × | · ELECTRONIC MIRROR THAT RECEIVES DATA FROM VEHICLE ENTERING INTO INTERSECTION AND TRANSMITS DATA · ELECTRONIC MIRROR THAT CAN RECOGNIZE SITUATION OF INTERSECTION AND TRANSMIT DATA | | | | | | | |

| SERVICE FIELD | TARGET | SITUATION | MAIN CAUSE | SIGNIFICANT CASE | PERCEPTION/RECOGNITION OF INFORMATION (1) | PERCEPTION/RECOGNITION OF INFORMATION (2) | ELEMENTARY TECHNOLOGY | DETERMINATION/ACTION (1) | DETERMINATION/ACTION (2) | ELEMENTARY TECHNOLOGY | MERIT | SUPPLEMENT |
|---|---|---|---|---|---|---|---|---|---|---|---|---|
| | | | | | HAVING SAME FUNCTION AS THAT OF FOR OVERSIGHT, AND ADD THIS TO FUNCTION OF FINDING OTHER VEHICLES. | | | | | | | |
| | | | DETECTION DELAY | CARELESS DRIVING | SAME AS THAT OF FOR OVERSIGHT | | | | | | | |
| | | | JUDGMENT ERROR | OPERATION ERROR | HAVING SAME FUNCTION AS THAT OF FOR OVERSIGHT, AND PARTICULARLY, PREVENT THIS BY PROVIDING INFORMATION BEFOREHAND. | | | | | | | |

FIG.25A

[PREVENTION AND SAFETY] PREVENTION OF DEVIATION FROM A LANE

Legend (AVAILABILITY BY HUMAN):
O: CAN DO BY ONESELF WITHOUT FAIL
Δ: ESTABLISHED BY APPROACH FROM OTHER PARTY (EXAMPLE: ESTABLISHED BY APPROACH FROM VEHICLES OR ROADSIDE)
×: NOT ESTABLISHED WITHOUT INFORMATION OF VEHICLE TO VEHICLE Legend (AVAILABILITY BY AUTOMATIC PROCESSING):
O: CAN DO BY ITSELF WITHOUT FAIL
Δ: ESTABLISHED BY APPROACH FROM OTHER PARTY (EXAMPLE: ESTABLISHED BY APPROACH FROM VEHICLES OR ROADSIDE)
×: NOT ESTABLISHED WITHOUT INFORMATION OF VEHICLE TO VEHICLE

| SERVICE FIELD | | TARGET | SITUATION | MAIN CAUSE | SIGNIFICANT CASE | PERCEPTION/ RECOGNITION OF INFORMATION (1) | PERCEPTION/ RECOGNITION OF INFORMATION (2) | AVAILABILITY BY HUMAN | AVAILABILITY BY AUTOMATIC PROCESSING | ELEMENTAL TECHNOLOGY |
|---|---|---|---|---|---|---|---|---|---|---|
| PREVENTION AND SAFETY | DEVIATION OF LINE | REDUCE NUMBER OF CASUALTIES | STRAIGHT LINE, CURVE | DETECTION DELAY | LOOK ASIDE | RECOGNIZE THAT DRIVER DOES NOT LOOK AHEAD. | OBSERVE DRIVER'S CONDITION (SIGHT LINE, BEHAVIOR (HEAD)) | × | O | SPOT CAMERA (MONITORING VEHICLE INTERIOR AND DRIVER)<br>IMAGE PROCESSING |
| | | | | | DOZE | RECOGNIZE THAT DRIVER IS DOZING. | OBSERVE DRIVER'S CONDITION (SIGHT LINE, BEHAVIOR (HEAD), PULSE, BREATHING) | × | O | SPOT CAMERA (MONITORING VEHICLE INTERIOR AND DRIVER)<br>IMAGE PROCESSING (RECOGNIZE SIGHT LINE AND BEHAVIOR, AND RECOGNIZE PULSE AND BREATHING)<br>DATABASE |
| | | | | | AVOID PEDESTRIANS, PERSONS ON BICYCLE, PARKED VEHICLE, AND FALLEN OBJECT. | RECOGNIZE PEDESTRIANS, PERSONS ON BICYCLE, PARKED VEHICLE, AND FALLEN OBJECT. | OBSERVE PEDESTRIANS, PERSONS ON BICYCLE, PARKED VEHICLE, AND FALLEN OBJECT BY EYES. | O | O | SPOT CAMERA(MONITORING FORWARD AND OBSTACLES)<br>IMAGE PROCESSING |
| | | | | | ROAD CONDITION CHANGES (FURROW, UNDULATION ON ROAD SURFACE, RAIN, SNOW, ETC.). | RECOGNIZE ROAD CONDITION. | OBSERVE ROAD CONDITION.<br>OBSERVE OBSTACLES.<br>PREDICT MICRO $\mu$.<br>CANNOT TAKE WHEEL, SLIP | O | O | SPOT CAMERA(MONITORING FORWARD AND OBSTACLES)<br>IMAGE PROCESSING (THREE-DIMENSIONAL IMAGE ANALYSIS)<br>PROBE<br>HOT SPOT |
| | | | | | | CONFIRM POSITION OF OWN VEHICLE. | POSITION WITH RESPECT TO FOLLOWING VEHICLE, AT THE TIME OF DECELERATION<br>POSITION WITH ONCOMING VEHICLE AT THE TIME OF AVOIDANCE | O | O | LOCATION<br>DETECTIONOF RELATIVE DISTANCE (MAP DATA) |

FIG.25B

| | | | | | | | | | | |
|---|---|---|---|---|---|---|---|---|---|---|
| | | | | | | RECOGNIZE FOLLOWING VEHICLE. | OBSERVE FOLLOWING VEHICLE BY ROOM MIRROR. | O | O | PERIPHERAL MONITORING CAMERA<br>IMAGE RECOGNITION (RECOGNITION OF REAR SIDE AND VEHICLE) |
| | | | | | | RECOGNIZE VEHICLE ON SIDE (PASSING VEHICLE). | OBSERVE VEHICLES ON SIDE BY ROOM MIRROR.<br>OBSERVE BY EYES WITH MOVING HEAD. | O | O | PERIPHERAL MONITORING CAMERA<br>IMAGE RECOGNITION (RECOGNITION OF SIDE AND VEHICLE) |
| | | | | | | RECOGNIZE ONCOMING VEHICLE. | OBSERVE ONCOMING VEHICLE BY EYES. | O | O | SPOT CAMERA (MONITORING FORWARD AND OBSTACLES)<br>IMAGE PROCESSING (FORWARD) |
| | | | | JUDGMENT ERROR | OVER-SPEED, STEERING ANGLE ERROR | CONFIRM SPEED OF OWN VEHICLE. | OBSERVE SPEEDOMETER BY EYES. | O | O | DETECTION OF RELATIVE SPEED |
| | | | | | | RECOGNIZE STEERING ANGLE. | OBSERVE STEERING WHEEL BY EYES. | O | O | DETECTION OF STEERING ANGLE |
| | | | | | | | FEEL LATERAL G BY BODY. | O | O | YAW RATE SENSOR<br>G SENSOR |
| | | | | | | RECOGNIZE CURVE CONDITION. | OBSERVE CURVE MIRROR.<br>OBSERVE SIGN. | O | O | SPOT CAMERA (WITH FOLLOWING FUNCTION) |
| | | | | | FOLLOW VEHICLE IN FRONT | RECOGNIZE POSITION OF VEHICLE IN FRONT. | OBSERVE WHETHER VEHICLE IN FRONT IS WITHIN LANE BY EYES. | O | O | SPOT CAMERA (WITH FOLLOWING FUNCTION)<br>IMAGE RECOGNITION<br>RADIO COMMUNICATIONS<br>↑ |
| | | | | | | RECOGNIZE LANE. | RECOGNIZE WHETHER VEHICLE IN FRONT IS EMERGENCY VEHICLE. | O | O | |

FIG.26A

O: CAN DO BY ONESELF WITHOUT FAIL
×: CANNOT DO BY ONESELF

O: CAN DO BY ITSELF WITHOUT FAIL
×: ESTABLISHED BY ACCUMULATED INFORMATION

| DETERMINATION/ ACTION (1) | DETERMINATION/ ACTION (2) | AVAILABILITY BY HUMAN | AVAILABILITY BY AUTOMATIC PROCESSING | ELEMENTARY TECHNOLOGY | MERIT |
|---|---|---|---|---|---|
| WARN DRIVER TO LOOK AHEAD. PREDICT AND AVOID COLLISION. | BUZZER<br>SCREEN DISPLAY<br>PUT ON BRAKES.<br>TURN STEERING WHEEL. | × | O | BY WIRE | INFORM DANGER BEFOREHAND. DETERMINE IF AVOIDANCE (DEVIATION FROM LANE) IS POSSIBLE, OR TO BRAKE (DEVIATION FROM LANE IS NOT POSSIBLE), TO AVOID COLLISION FORCIBLY. |
| WARN DRIVER TO WAKE UP. PREDICT AND AVOID COLLISION. | BUZZER<br>SCREEN DISPLAY<br>PUT ON BRAKES.<br>TURN STEERING WHEEL. | × | O | ↑ | INFORM DANGER BEFOREHAND. DETERMINE IF AVOIDANCE (DEVIATION FROM LANE) IS POSSIBLE, OR TO BRAKE (DEVIATION FROM LANE IS NOT POSSIBLE), TO AVOID COLLISION FORCIBLY. |
| WARN DRIVER. PREDICT AND AVOID COLLISION WITH PEDESTRIANS, PERSONS ON BICYCLE, PARKED VEHICLE, AND FALLEN OBJECT. | BUZZER<br>SCREEN DISPLAY | × | O | | DETERMINE IF AVOIDANCE (DEVIATION FROM LANE) IS POSSIBLE, OR TO BRAKE (DEVIATION FROM LANE IS NOT POSSIBLE), TO WARN DRIVER. |
| | TURN STEERING WHEEL.<br>PUT ON BRAKES. | O | O | BY WIRE | DETERMINE IF AVOIDANCE (DEVIATION FROM LANE) IS POSSIBLE, OR TO BRAKE (DEVIATION FROM LANE IS NOT POSSIBLE), TO AVOID COLLISION FORCIBLY. |
| DROP SPEED. AVOID OBSTACLES. | TURN STEERING WHEEL.<br>PUT ON BRAKES. | O | O | BY WIRE | DETERMINE IF AVOIDANCE (DEVIATION FROM LANE) IS POSSIBLE, OR TO BRAKE (DEVIATION FROM LANE IS NOT POSSIBLE), TO AVOID COLLISION FORCIBLY.<br>RECOGNIZE PRIOR INFORMATION SUCH AS PRESENCE OF OBSTACLES AND SLIPPERY ROAD.<br>PREDICT WEAR (SLIPPERY) CONDITION OF TIRES. (DIFFERENCE BETWEEN WHEEL SPEED AND GPS POSITIONING) |
| PREDICT STOPPABLE DISTANCE. PREDICT AND AVOID COLLISION. | TURN STEERING WHEEL.<br>PUT ON BRAKES. | O | O | BY WIRE | DETERMINE IF AVOIDANCE (DEVIATION FROM LANE) IS POSSIBLE, OR TO BRAKE (DEVIATION FROM LANE IS NOT POSSIBLE), TO AVOID COLLISION FORCIBLY. |
| AVOID OBSTACLES. PREDICT AND AVOID COLLISION. | PUT ON BRAKES.<br>TURN STEERING WHEEL. | O | O | BY WIRE | COLLISION CAN BE AVOIDED. |
| | PREPARE BEFOREHAND SO AS TO BE BRAKED QUICKLY.<br>PREPARE BEFOREHAND SO AS TO TURN STEERING WHEEL LIGHTLY. | × | O | BY WIRE | EVEN DRIVER HAVING WEAK STRENGTH OF LEGS CAN PUT ON BRAKES POWERFULLY, TO SHORTEN BRAKING DISTANCE.<br>STEERING WHEEL CAN BE TURNED QUICKLY. |
| AVOID OBSTACLES. PREDICT AND AVOID COLLISION. | TURN STEERING WHEEL.<br>PUT ON BRAKES. | O | O | BY WIRE | COLLISION CAN BE AVOIDED. |
| | PREPARE BEFOREHAND SO AS TO BE BRAKED QUICKLY.<br>PREPARE BEFOREHAND SO AS TO TURN STEERING WHEEL LIGHTLY. | × | O | BY WIRE | EVEN DRIVER HAVING WEAK STRENGTH OF LEGS CAN PUT ON BRAKES POWERFULLY, TO SHORTEN BRAKING DISTANCE.<br>STEERING WHEEL CAN BE TURNED QUICKLY. |

FIG.26B

| | | | | | |
|---|---|---|---|---|---|
| | | | | | |
| ↑ | ↑ | × | O | ↑ | ↑ |
| WARN DRIVER. | BUZZER<br>SCREEN DISPLAY | × | O | | |
| PREDICT DEVIATION FROM LANE AND DROP SPEED. | EASE UP ON ACCELERATOR.<br>PUT ON BRAKES. | O | O | BY WIRE | |
| WARN DRIVER. | BUZZER<br>SCREEN DISPLAY | × | O | | |
| PREDICT DEVIATION FROM LANE AND RETURN TO OPTIMUM STEERING ANGLE. | TURN STEERING WHEEL. | O | O | BY WIRE | |
| WARN DRIVER. | BUZZER<br>SCREEN DISPLAY | × | O | | |
| PREDICT DEVIATION FROM LANE AND RETURN TO OPTIMUM STEERING ANGLE. | TURN STEERING WHEEL. | O | O | BY WIRE | |
| WARN DRIVER. | BUZZER<br>SCREEN DISPLAY<br>TURN STEERING WHEEL. | × | O | | |
| PREDICT DEVIATION FROM LANE AND RETURN TO OPTIMUM STEERING ANGLE. | | O | O | BY WIRE | |
| DETERMINE WHETHER TO FOLLOW VEHICLE IN FRONT. | | O | O | COLLISION TENDENCY ANALYSIS (ACCIDENT HISTORY DATABASE) | PREVENT ACCIDENT DUE TO VISUAL FALSE IMPRESSION.<br>BECOME MORE CAREFUL TO PRIORITIZED VEHICLES ENTERING INTO INTERSECTION FROM RIGHT AND LEFT, IN FRONT OF INTERSECTION. |
| DETERMINE THAT OTHER PARTY'S VEHICLE IS IN EMERGENCY. | | O | O | | |

[PREVENTION AND SAFETY] PREVENTION OF DEVIATION FROM LANE
(AVOID OBSTACLES = UNEXPECTED)

[PREVENTION AND SAFETY]
PREVENTION OF DEVIATION FROM LANE (PASSING/LANE CHANGE = INTENTIONAL)

[PREVENTION AND SAFETY] PREVENTION OF DEVIATION FROM LANE (OVER-SPEED = UNEXPECTED)

FIG.35

STORAGE UNIT 302

| ACQUISITION TARGET | ACQUISITION CONTENTS |
|---|---|
| OWN VEHICLE | POSITION, SPEED, ACCELERATION, TRAVELING DIRECTION, TYPE OF VEHICLE, SIZE, ... |
| DRIVER | FREQUENCY OF BLINKS, LINE OF SIGHT, DIRECTION OF FACE, POSITION OF HEAD, DRIVING HISTORY, ... |
| ROAD | ROAD SHAPE (INTERSECTION, CURVE, TWO-WAY TWO LANES, ...), ROAD CONDITIONS (FURROW, UNDULATION, FREEZING, ...) PRESENCE OF TRAFFIC LIGHT AND COLOR, PRESENCE OF SIGNS AND CONTENTS (STOP, SPEED LIMIT, ...), ACCIDENT HISTORY, ... |
| OBSTACLE (VEHICLE AHEAD) | POSITION, SPEED, ACCELERATION, TRAVELING DIRECTION, TYPE OF VEHICLE, SIZE, DRIVER INFORMATION (LINE OF SIGHT, DIRECTION OF FACE, DRIVING HISTORY, ...), DISTANCE FROM OWN VEHICLE, ... |
| OBSTACLE (VEHICLE ON SIDE) | POSITION, SPEED, ACCELERATION, TRAVELING DIRECTION, TYPE OF VEHICLE, SIZE, DRIVER INFORMATION (LINE OF SIGHT, DIRECTION OF FACE, DRIVING HISTORY, ...), DISTANCE FROM OWN VEHICLE, ... |
| OBSTACLE (FOLLOWING VEHICLE) | POSITION, SPEED, ACCELERATION, TRAVELING DIRECTION, TYPE OF VEHICLE, SIZE, DRIVER INFORMATION (LINE OF SIGHT, DIRECTION OF FACE, DRIVING HISTORY, ...), DISTANCE FROM OWN VEHICLE, ... |
| OBSTACLE (ONCOMING VEHICLE) | POSITION, SPEED, ACCELERATION, TRAVELING DIRECTION, TYPE OF VEHICLE, SIZE, DRIVER INFORMATION (LINE OF SIGHT, DIRECTION OF FACE, DRIVING HISTORY, ...), DISTANCE FROM OWN VEHICLE, ... |
| OBSTACLE (MOTORCYCLE) | POSITION, SPEED, ACCELERATION, TRAVELING DIRECTION, TYPE OF VEHICLE, SIZE, DRIVER INFORMATION (LINE OF SIGHT, DIRECTION OF FACE, DRIVING HISTORY, ...), DISTANCE FROM OWN VEHICLE, ... |
| OBSTACLE (BICYCLE) | POSITION, SPEED, ACCELERATION, TRAVELING DIRECTION, DRIVER INFORMATION (ADULT, AGED PERSON, CHILD, ...), DISTANCE FROM OWN VEHICLE, ... |
| OBSTACLE (PEDESTRIAN) | POSITION, SPEED, ACCELERATION, TRAVELING DIRECTION, ATTRIBUTE (ADULT, AGED PERSON, CHILD, ...), DISTANCE FROM OWN VEHICLE, ... |
| OBSTACLE (FALLEN OBJECT) | POSITION, SIZE, TYPE, DISTANCE FROM OWN VEHICLE, ... |
| ⋮ | ......... |
| OTHERS | WEATHER CONDITION, TIME, BRIGHTNESS,... |

FIG.36

SITUATION SPECIFYING TABLE

301a

| SITUATION | SPECIFYING CONDITIONS |
|---|---|
| [APPROACHING FORWARD INTERSECTION WITHOUT TRAFFIC LIGHT] · PREVENTING HEAD-TO-HEAD COLLISION WITH OBSTACLE AHEAD (VEHICLE IN FRONT) · PREVENTING HEAD-TO-HEAD COLLISION WITH INVISIBLE VEHICLE ⋮ | · ROAD SHAPE (INTERSECTION), * PRESENCE OF TRAFFIC LIGHT (NO), * TRAVELING DIRECTION OF OWN VEHICLE (STRAIGHT) |
| | · POSITION OF OWN VEHICLE (INTERSECTION WITHOUT TRAFFIC LIGHT), * TRAVELING DIRECTION OF OWN VEHICLE (STRAIGHT) |
| | ......... |
| [APPROACHING INTERSECTION WITH TRAFFIC LIGHT] · PREVENTING HEAD-TO-HEAD COLLISION WITH OBSTACLE AHEAD (VEHICLE IN FRONT) · PREVENTING HEAD-TO-HEAD COLLISION WITH INVISIBLE VEHICLE ⋮ | · ROAD SHAPE (INTERSECTION), * PRESENCE OF TRAFFIC LIGHT (YES), * TRAVELING DIRECTION OF OWN VEHICLE (STRAIGHT) |
| | ......... |
| [TURNING RIGHT AT INTERSECTION WITHOUT TRAFFIC LIGHT] · PREVENTING HEAD-TO-HEAD COLLISION WITH INVISIBLE VEHICLE · PREVENTING HEAD-TO-HEAD COLLISION WITH OBSTACLES WHEN TURNING TO RIGHT (ONCOMING VEHICLE, PEDESTRIAN) ⋮ | · ROAD SHAPE (INTERSECTION), * PRESENCE OF TRAFFIC LIGHT (NO), * TRAVELING DIRECTION OF OWN VEHICLE (TURNING RIGHT) |
| | ......... |
| [TURNING RIGHT AT INTERSECTION WITH TRAFFIC LIGHT] · PREVENTING HEAD-TO-HEAD COLLISION WITH INVISIBLE VEHICLE ·PREVENTING HEAD-TO-HEAD COLLISION WITH OBSTACLES WHEN TURNING TO RIGHT (ONCOMING VEHICLE, PEDESTRIAN) ⋮ | · ROAD SHAPE (INTERSECTION), * PRESENCE OF TRAFFIC LIGHT (YES), * TRAVELING DIRECTION OF OWN VEHICLE (TURNING RIGHT) |
| | ......... |
| ⋮ | ......... |
| [STRAIGHT LINE] · PREVENTING HEAD-TO-HEAD COLLISION WITH OBSTACLE AHEAD (VEHICLE IN FRONT) ⋮ | · ROAD SHAPE (STRAIGHT), * TRAVELING DIRECTION OF OWN VEHICLE (STRAIGHT) |
| | ......... |
| [STRAIGHT LINE] · PREVENTING HEAD-TO-HEAD COLLISION WITH OBSTACLE AHEAD (VEHICLE IN FRONT) ⋮ | ·ROAD SHAPE (RIGHT CURVE), * TRAVELING DIRECTION OF OWN VEHICLE (STRAIGHT) |
| | ......... |
| ⋮ | ......... |

FIG.37

DANGER PREDICTION TABLE

301b

| PREVENTION AND SAFETY CONTENTS (SITUATION) | ITEMS OF DANGER PREDICTION | PREDICTION CONDITIONS |
|---|---|---|
| PREVENTION OF HEAD-TO-HEAD COLLISION WITH OBSTACLE AHEAD (VEHICLE IN FRONT) | COLLISION WITH OBSTACLE AHEAD (VEHICLE IN FRONT) | · DISTANCE BETWEEN VEHICLE IN FRONT AND OWN VEHICLE (WITHIN 5 METERS) |
| | | · DISTANCE BETWEEN VEHICLE IN FRONT AND OWN VEHICLE (WITHIN 10 METERS) * SPEED OF OWN VEHICLE (NOT LESS THAN 50 KILOMETERS PER HOUR) * SPEED OF VEHICLE IN FRONT (NOT FASTER THAN 40 KILOMETERS PER HOUR) |
| | | ...... |
| | OVERSIGHT OR JUDGMENT DELAY OF DRIVER | · ROAD SHAPE (INTERSECTION) * COLOR OF TRAFFIC LIGHT (RED) * POSITION OF OWN VEHICLE (WITHIN 20 METERS BEFORE INTERSECTION) * SPEED OF OWN VEHICLE (NOT LESS THAN 30 KILOMETERS PER HOUR) |
| | | · CONTENT OF SIGN (STOP) * POSITION OF OWN VEHICLE (WITHIN 20 METERS BEFORE INTERSECTION) * SPEED OF OWN VEHICLE (NOT LESS THAN 30 KILOMETERS PER HOUR) |
| | | ...... |
| | ⋮ | ...... |
| PREVENTION OF HEAD-TO-HEAD COLLISION WITH INVISIBLE VEHICLE | COLLISION WITH INVISIBLE VEHICLE | · ROAD SHAPE (INTERSECTION) * PRESENCE OF TRAFFIC LIGHT (NO) * POSITION OF OWN VEHICLE (WITHIN 20 METERS BEFORE INTERSECTION) * SPEED OF OWN VEHICLE (NOT LESS THAN 30 KILOMETERS PER HOUR) * POSITION OF UNSEEN VEHICLE (WITHIN 20 METERS RIGHTWARD OF INTERSECTION) * SPEED OF INVISIBLE VEHICLE (NOT LESS THAN 30 KILOMETERS PER HOUR) |
| | | ...... |
| | OVERSIGHT OR JUDGMENT DELAY OF DRIVER | ...... |
| | ⋮ | ...... |
| PREVENTION OF DEVIATION FROM LANE DUE TO DOZE OR LOOKING ASIDE | DOZE | ·NUMBER OF BLINKS (NOT LESS THAN 5 TIMES PER 10 SECONDS) |
| | | ...... |
| | LOOKING ASIDE | ·DIRECTION OF FACE (5 SECONDS OR MORE IN RIGHTWARD DIRECTION) |
| | | ...... |
| | DEVIATION FROM LANE | · ROAD SHAPE (ONE LANE) * SPEED OF OWN VEHICLE (NOT LESS THAN 50 KILOMETERS PER HOUR) * TRAVELING DIRECTION OF OWN VEHICLE (RIGHT FORWARD) |
| | | ...... |
| | COLLISION WITH OBSTACLE | · DISTANCE BETWEEN VEHICLE IN FRONT AND OWN VEHICLE (5 METERS) |
| | | ...... |
| | OVERSIGHT OR JUDGMENT DELAY OF DRIVER | ...... |
| | ⋮ | ...... |
| ⋮ | ⋮ | ...... |

FIG.38

DANGER DETERMINATION TABLE 301c

| ITEMS OF DANGER DETERMINATION | DETERMINATION CONDITIONS |
| --- | --- |
| COLLISION WITH OBSTACLE AHEAD (VEHICLE AHEAD) | · DANGER LEVEL 1: SPEED OF OWN VEHICLE (NOT LESS THAN 50 TO 55 KILOMETERS PER HOUR) * SPEED OF VEHICLE IN FRONT (NOT FASTER THAN 40 KILOMETERS PER HOUR) |
| | · DANGER LEVEL 2: SPEED OF OWN VEHICLE (NOT LOWER THAN 55 TO 60 KILOMETERS PER HOUR) * SPEED OF VEHICLE IN FRONT (NOT FASTER THAN 40 KILOMETERS PER HOUR) |
| | · DANGER LEVEL 3: SPEED OF OWN VEHICLE (NOT LOWER THAN 60 TO 65 KILOMETEBS PER HOUR) * SPEED OF VEHICLE IN FRONT (NOT FASTER THAN 40 KILOMETERS PER HOUR) |
| | · DANGER LEVEL 4: SPEED OF OWN VEHICLE (NOT LOWER THAN 65 TO 70 KILOMETERS PER HOUR) * SPEED OF VEHICLE IN FRONT (NOT FASTER THAN 40 KILOMETERS PER HOUR) |
| ⋮ | ...... |
| COLLISION WITH INVISIBLE VEHICLE | · DANGER LEVEL 1: POSITION OF OWN VEHICLE (WITHIN 20 METERS BEFORE INTERSECTION) * POSITION OF INVISIBLE VEHICLE (WITHIN 20 METERS RIGHTWARD OF INTERSECTION) |
| | · DANGER LEVEL 2: POSITION OF OWN VEHICLE (WITHIN 15 METERS BEFORE INTERSECTION) * POSITION OF INVISIBLE VEHICLE (WITHIN 20 METERS RIGHTWARD OF INTERSECTION) |
| | · DANGER LEVEL 3: POSITION OF OWN VEHICLE (WITHIN 15 METERS BEFORE INTERSECTION) * POSITION OF INVISIBLE VEHICLE (WITHIN 15 METERS RIGHTWARD OF INTERSECTION) |
| | · DANGER LEVEL 4: POSITION OF OWN VEHICLE (WITHIN 10 METERS BEFORE INTERSECTION) * POSITION OF INVISIBLE VEHICLE (WITHIN 10 METERS RIGHTWARD OF INTERSECTION) |
| ⋮ | ...... |
| DOZE | · DANGER LEVEL 1: |
| | · DANGER LEVEL 2: |
| LOOKING ASIDE | · DANGER LEVEL 1: |
| | · DANGER LEVEL 2: |
| DEVIATION FROM LANE | · DANGER LEVEL 1: |
| | · DANGER LEVEL 2: |
| | · DANGER LEVEL 3: |
| COLLISION WITH OBSTACLE | · DANGER LEVEL 1: |
| | · DANGER LEVEL 2: |
| | · DANGER LEVEL 3: |
| | · DANGER LEVEL 4: |
| ⋮ | ...... |

FIG.39

CONTROL TABLE
301d

| ITEMS OF DANGER DETERMINATION | DETERMINATION CONDITION | CONTROL CONTENTS |
|---|---|---|
| COLLISION WITH OBSTACLE AHEAD (VEHICLE AHEAD) | DANGER LEVEL 1 | PRODUCE WARNING SOUND A<br>* SHOW WARNING DISPLAY A<br>* PROHIBIT ACCELERATION |
| | DANGER LEVEL 2 | PRODUCE WARNING SOUND B<br>* SHOW WARNING DISPLAY B<br>* DECELERATE (SMALL) |
| | DANGER LEVEL 3 | PRODUCE WARNING SOUND C<br>* SHOW WARNING DISPLAY C * DECELERATE (MEDIUM) * AVOID COLLISION |
| | DANGER LEVEL 4 | PRODUCE WARNING SOUND D<br>* SHOW WARNING DISPLAY D<br>* DECELERATE (LARGE)<br>* OPERATE SAFETY SYSTEM<br>(EXPANSION OF AIRBAG, TIGHTEN SEATBELT) |
| ⋮ | ⋮ | ...... |
| COLLISION WITH INVISIBLE VEHICLE | DANGER LEVEL 1 | PRODUCE WARNING SOUND A<br>* SHOW WARNING DISPLAY A<br>* PROHIBIT ACCELERATION |
| | DANGER LEVEL 2 | PRODUCE WARNING SOUND B<br>* SHOW WARNING DISPLAY B<br>* DECELERATE (SMALL) |
| | DANGER LEVEL 3 | PRODUCE WARNING SOUND C<br>* SHOW WARNING DISPLAY C<br>* DECELERATE (MEDIUM) * AVOID COLLISION |
| | DANGER LEVEL 4 | PRODUCE WARNING SOUND D<br>* SHOW WARNING DISPLAY D<br>* DECELERATE (LARGE)<br>* OPERATE SAFETY SYSTEM<br>(EXPANSION OF AIRBAG, TIGHTEN SEATBELT) |
| ⋮ | ⋮ | ...... |
| DOZE | DANGER LEVEL 1 | PRODUCE WARNING SOUND A<br>* VIBRATE SEAT * APPLY BLOWER TO FACE<br>* PROHIBIT ACCELERATION |
| | DANGER LEVEL 2 | ...... |
| LOOKING ASIDE | DANGER LEVEL 1 | PRODUCE WARNING SOUND A<br>* SHOW WARNING DISPLAY A<br>* VIBRATE SEAT * APPLY BLOWER TO FACE<br>* PROHIBIT ACCELERATION |
| | DANGER LEVEL 2 | ...... |
| DEVIATION FROM LANE | DANGER LEVEL 1<br>DANGER LEVEL 2<br>DANGER LEVEL 3 | ...... |
| COLLISION WITH OBSTACLE | DANGER LEVEL 1<br>DANGER LEVEL 2<br>DANGER LEVEL 3<br>DANGER LEVEL 4 | ...... |
| ⋮ | ⋮ | ...... |

FIG.40

| PERCEPTION | | RECOGNITION | | PREDICTION | | DETERMINATION | | WARNING/DISPLAY OUTPUT INTERVENTION CONTROL | |
|---|---|---|---|---|---|---|---|---|---|
| • PRESENCE OF INTERSECTION AND ROAD<br>• PRESENCE OF TRAFFIC LIGHT<br>• PRESENCE OF SIGN<br>• PRESENCE OF OBSTACLE | FRONT CAMERA<br>↓<br>IMAGE RECOGNI-TION ECU | •SHAPE OF INTERSECTION AND ROAD<br>•COLOR OF TRAFFIC LIGHT<br>•CONTENT OF SIGN<br>•TYPE OF OBSTACLE<br>•POSITION OF OBSTACLE<br>•TRAVELING DIRECTION OF OBSTACLE<br>•SPEED OF OBSTACLE | IMAGE RECOGNI-TION ECU | • PREDICT COLLISION WITH OBSTACLE<br>• PREDICT OVERSIGHT AND JUDGMENT DELAY OR DRIVER | PREDICTION AND DETERMI-NATION ECU | DETERMINE DANGER<br>• DANGER LEVEL<br>• DANGER DIRECTION<br>• DANGER AREA | PREDICTION AND DETERMINATION ECU | LEVEL 1: PRODUCE WARNING SOUND A, SHOW WARNING SIGN A, PROHIBIT ACCELERA-TION | SPEAKER MONITOR ENGINE CONTROL ECU |
| • POSITION OF OWN VEHICLE<br>• PRESENCE OF INTERSECTION AND ROAD<br>• PRESENCE OF SIGN | NAVIGATION SYSTEM<br>↓<br>LOCATOR FOR CONTROL | •DISTANCE BETWEEN OWN VEHICLE AND INTERSECTION<br>•SHAPE OF INTERSECTION AND ROAD<br>•PRESENCE OF TRAFFIC LIGHT<br>•CONTENT OF SIGN | LOCATOR FOR CONTROL | | | | | LEVEL 2: PRODUCE WARNING SOUND B, SHOW WARNING DISPLAY B, DECELERATE (SMALL) | SPEAKER MONITOR BRAKE CONTROL ECU |
| • SPEED OF OWN VEHICLE<br>• BRAKING POWER | BRAKE CONTROL ECU | | | | | | | LEVEL 3: PRODUCE WARNING SOUND C, SHOW WARNING DISPLAY C, DECELERATE (MEDIUM), AVOID COLLISION | SPEAKER MONITOR BRAKE CONTROL ECU STEERING CONTROL ECU |
| • ACCEL-ERATION DEGREE | ENGINE CONTROL ECU | | | | | | | LEVEL 4: PRODUCE WARNING SOUND D, SHOW WARNING DISPLAY D, DECELERATE (LARGE), OPERATE SAFETY SYSTEM (EXPANSION OF AIRBAG, TIGHTEN SEATBELT) | SPEAKER MONITOR BRAKE CONTROL ECU COLLISION SAFETY CONTROL SYSTEM |

FIG.42

| PERCEPTION | | RECOGNITION | | PREDICTION | | DETERMINATION | | WARNING/DISPLAY OUTPUT INTERVENTION CONTROL | |
|---|---|---|---|---|---|---|---|---|---|
| · PRESENCE OF INTERSECTION AND ROAD<br>· PRESENCE OF TRAFFIC LIGHT<br>· PRESENCE OF SIGN | FRONT CAMERA<br>↓<br>IMAGE RECOGNITION ECU | ·SHAPE OF INTERSECTION AND ROAD<br>·COLOR OF TRAFFIC LIGHT<br>·CONTENT OF SIGN | IMAGE RECOGNITION ECU | · PREDICT COLLISION WITH OBSTACLE<br>· PREDICT OVERSIGHT AND JUDGMENT DELAY OR DRIVER | PREDICTION AND DETERMINATION ECU | DETERMINE DANGER<br>· DANGER LEVEL<br>· DANGER DIRECTION<br>· DANGER AREA | PREDICTION AND DETERMINATION ECU | LEVEL 1: PRODUCE WARNING SOUND A, SHOW WARNING SIGN A, PROHIBIT ACCELERATION | SPEAKER<br>MONITOR<br>ENGINE CONTROL ECU |
| | | ·TYPE OF VEHICLE<br>·POSITION OF VEHICLE<br>·TRAVELING DIRECTION OF VEHICLE<br>·SPEED OF VEHICLE | VEHICLE COMMUNICATION APPARATUS<br>↓<br>COMMUNICATION ECU | | | | | LEVEL 2: PRODUCE WARNING SOUND B, SHOW WARNING DISPLAY B, DECELERATE (SMALL) | SPEAKER<br>MONITOR<br>BRAKE CONTROL ECU |
| · POSITION OF OWN VEHICLE<br>· PRESENCE OF INTERSECTION AND ROAD<br>· PRESENCE OF SIGN | NAVIGATION SYSTEM<br>↓<br>LOCATOR FOR CONTROL | ·DISTANCE BETWEEN OWN VEHICLE AND INTERSECTION<br>·SHAPE OF INTERSECTION AND ROAD<br>·PRESENCE OF TRAFFIC LIGHT<br>·CONTENT OF SIGN | LOCATOR FOR CONTROL | | | | | LEVEL 3: PRODUCE WARNING SOUND C, SHOW WARNING DISPLAY C, DECELERATE (MEDIUM), AVOID COLLISION | SPEAKER<br>MONITOR<br>BRAKE CONTROL ECU<br>STEERING CONTROL ECU |
| · SPEED OF OWN VEHICLE<br>· BRAKING POWER | BRAKE CONTROL ECU | | | | | | | LEVEL 4: PRODUCE WARNING SOUND D, SHOW WARNING DISPLAY D, DECELERATE (LARGE), OPERATE SAFETY SYSTEM (EXPANSION OF AIRBAG, TIGHTEN SEATBELT) | SPEAKER<br>MONITOR<br>BRAKE CONTROL ECU<br>COLLISION SAFETY CONTROL SYSTEM |
| · ACCELERATION DEGREE | ENGINE CONTROL ECU | | | | | | | | |

FIG.44

| PERCEPTION | | RECOGNITION | | PREDICTION | | DETERMINATION | | WARNING/DISPLAY OUTPUT INTERVENTION CONTROL | |
|---|---|---|---|---|---|---|---|---|---|
| · EYES OF DRIVER<br>· FACE OF DRIVER<br>· HEAD OF DRIVER | VEHICLE CAMERA<br>↓<br>IMAGE RECOGNITION ECU | · FREQUENCY OF BLINKS OF DRIVER<br>SIGHT LINE<br>DIRECTION OF HEAD<br>POSITION OF HEAD | IMAGE RECOGNITION UNIT | · PREDICT DOZE<br>· PREDICT LOOKING ASIDE<br>· PREDICT DEVIATION FROM LANE<br>· PREDICT COLLISION WITH OBSTACLE<br>· PREDICT OVERSIGHT OR JUDGMENT DELAY OF DRIVER | PREDICTION AND DETERMINATION ECU | DETERMINATION DANGER<br>· DANGER LEVEL<br>· DANGER DIRECTION<br>· DANGER AREA | PREDICTION AND DETERMINATION ECU | DOZE LEVEL 1: PRODUCE WARNING SOUND A, VIBRATE SEAT, APPLY BLOWER TO FACE, PROHIBIT ACCELERATION<br>LOOKING ASIDE LEVEL 1: PRODUCE WARNING SOUND A, SHOW WARNING DISPLAY A, VIBRATE SEAT, PROHIBIT ACCELERATION<br>LEVEL 2:PRODUCE WARNING SOUND B, SHOW WARNING DISPLAY B, DECELERATE (SMALL)<br>LEVEL 3: PRODUCE WARNING SOUND C, SHOW WARNING DISPLAY C, DECELERATE (MEDIUM), AVOID COLLISION<br>LEVEL 4: PRODUCE WARNING SOUND D, SHOW WARNING DISPLAY D, DECELERATE (LARGE), OPERATE SAFETY SYSTEM (EXPANSION OF AIRBAG, TIGHTEN SEATBELT) | SPEAKER BODY CONTROL ECU<br>AIR-CONDITIONING ECU<br>ENGINE CONTROL ECU<br>SPEAKER MONITOR BODY CONTROL ECU ENGINE CONTROL ECU<br>SPEAKER MONITOR BRAKE CONTROL ECU<br>SPEAKER MONITOR BRAKE CONTROL ECU STEERING CONTROL ECU<br>SPEAKER MONITOR BRAKE CONTROL ECU COLLISION SAFETY CONTROL SYSTEM |
| · ROAD LANE | REAR CAMERA<br>↓<br>IMAGE RECOGNITION ECU<br>SIDE CAMERA<br>↓<br>IMAGE RECOGNITION ECU | · POSITION OF LANE OF OWN VEHICLE | | | | | | | |
| PRESENCE OF OBSTACLE | FRONT CAMERA<br>↓<br>IMAGE RECOGNITION ECU | · TYPE OF OBSTACLE<br>· POSITION OF OBSTACLE<br>· TRAVELING DIRECTION OF OBSTACLE<br>· SPEED OF OBSTACLE | | | | | | | |
| · POSITION OF OWN VEHICLE<br>· PRESENCE OF ROAD | NAVIGATION SYSTEM<br>↓<br>LOCATOR FOR CONTROL | · DISTANCE BETWEEN OWN VEHICLE AND OBSTACLE<br>· SHAPE OF ROAD | LOCATOR FOR CONTROL | | | | | | |
| STEERING ANGLE | STEERING CONTROL ECU | | | | | | | | |
| · SPEED OF OWN VEHICLE<br>· BRAKING POWER | BRAKE CONTROL ECU | | | | | | | | |
| ACCELERA-TION DEGREE | ENGINE CONTROL ECU | | | | | | | | |

FIG.55

| DRIVING HISTORY | | EXAMPLE |
|---|---|---|
| ENTERED INTO INTERSECTION FROM MINOR ROAD WITHOUT STOPPING. | TARGET VEHICLE | · HEAD-TO-HEAD COLLISION |
| | OWN VEHICLE | |
| EXCEEDED SPEED LIMIT BY PREDETERMINED SPEED. | TARGET VEHICLE | · HEAD-TO-HEAD COLLISION<br>· COLLISION WITH ONCOMING VEHICLE DRIVING STRAIGHT AHEAD, AT THE TIME OF TURNING RIGHT<br>· OVERSPEED AT THE TIME OF FOLLOWING VEHICLE IN FRONT |
| | OWN VEHICLE | · COLLISION WITH ONCOMING RIGHT TURN VEHICLE |
| DECELERATED SUDDENLY. | TARGET VEHICLE | · BUMP FROM BEHIND AGAINST DECELERATING/STOPPING VEHICLE IN FRONT |
| | OWN VEHICLE | · BUMPED BY FOLLOWING VEHICLE FROM BEHIND |
| ACCELERATED SUDDENLY. | TARGET VEHICLE | · BUMPED BY FOLLOWING VEHICLE FROM BEHIND |
| | OWN VEHICLE | · BUMP FROM BEHIND AGAINST DECELERATING/STOPPING VEHICLE IN FRONT |
| OPERATION OF INDICATOR WAS INAPPROPRIATE. | TARGET VEHICLE | · REAR-END COLLISION AT THE TIME OF TURNING RIGHT OR LEFT<br>· COLLISION AT THE TIME OF STARTING, CHANGING COURSE |
| | OWN VEHICLE | · REAR-END COLLISION AT THE TIME OF TURNING RIGHT OR LEFT<br>· COLLISION AT THE TIME OF STARTING, CHANGING COURSE |
| DROVE CAR WHILE LOOKING ASIDE. | TARGET VEHICLE | · BUMP FROM BEHIND AGAINST VEHICLE IN FRONT |
| | OWN VEHICLE | |
| DID NOT STOP APPROPRIATELY. | TARGET VEHICLE | · HEAD-TO-HEAD COLLISION |
| | OWN VEHICLE | |
| IGNORED RED LIGHT. | TARGET VEHICLE | · COLLISION AT INTERSECTION |
| | OWN VEHICLE | |
| ACCELERATED AT YELLOW LIGHT. | TARGET VEHICLE | · COLLISION AT INTERSECTION |
| | OWN VEHICLE | |
| WERE NOT CAREFUL ABOUT SURROUNDINGS. | TARGET VEHICLE | · COLLISION WITH ONCOMING VEHICLE DRIVING STRAIGHT AHEAD, AT THE TIME OF TURNING RIGHT |
| | OWN VEHICLE | · COLLISION WITH RIGHT TURNING VEHICLE |
| DROVE CAR RECKLESSLY. | TARGET VEHICLE | · COLLISION AT THE TIME OF PASSING EACH OTHER IN NARROW ROAD |
| | OWN VEHICLE | |
| ACCELERATED AT THE TIME OF BEING OVERTAKEN. | TARGET VEHICLE | · ACCIDENT DUE TO FAILURE OF OVERTAKING |
| | OWN VEHICLE | · ACCIDENT DUE TO INTERRUPTION OF OVERTAKING |
| INTERRUPTED CUTTING-IN VEHICLE. | TARGET VEHICLE | · ACCIDENT DUE TO FAILURE OF CUTTING-IN OR CHANGING LANE |
| | OWN VEHICLE | · ACCIDENT DUE TO INTERRUPTION OF CUTTING-IN OR CHANGING LANE |
| IGNORED WARNING FROM SYSTEM. | TARGET VEHICLE | · ALL CASES |
| | OWN VEHICLE | |

VEHICLE CONTROL APPARATUS, VEHICLE CONTROL METHOD, AND COMPUTER PROGRAM

BACKGROUND OF THE INVENTION

1) Field of the Invention

The present invention relates to a technology for preventing a traffic accident by obtaining various kinds of information on a vehicle and controlling various units of the vehicle instead of a driver.

2) Description of the Related Art

One of the well-known technologies for preventing a traffic accident and ensuring a safety of a vehicle obtains various kinds of information on the vehicle and controls various units instead of a driver of the vehicle. For example, Japanese Patent Application Laid-Open No. H7-57198 discloses a technique for detecting a distance between a vehicle and an obstacle ahead, and warning the driver of the vehicle when the distance detected is shorter than a predetermined distance.

However, every attempt to make the vehicle itself perceive, recognize, and determine danger instead of the driver is not practical. For example, the information (situation) to be perceived and recognized to ensure prevention of a traffic accident and a safety of a vehicle depends on the actual situation of the vehicle. The conventional technology cannot accurately specify the actual situation under which the vehicle is placed. Therefore, the information to be perceived and recognized cannot be accurately obtained, which deteriorates the accuracy in the determination of the danger. As a result, the prevention of the traffic accident and ensuring of the safety of the vehicle is correspondingly limited.

Hence, it is an extremely important how to perform proper perception, recognition, judgment, act, and operation instead of the driver, and a technology that can prevent the traffic accident and ensure the safety of the vehicle is highly desired.

SUMMARY OF THE INVENTION

It is an object of the present invention to solve at least the problems in the conventional technology.

The vehicle control apparatus according to one aspect of the present invention includes an information acquiring/managing unit that acquires information for controlling various units in a vehicle instead of a driver of the vehicle, and manages the information acquired; a situation determining unit that determines a situation under which the vehicle is placed, based on the information; a danger determining unit that selects predetermined information corresponding to the situation from among the information, and determines degree of danger of the situation based on the predetermined information; and a vehicle controller that controls predetermined units in the vehicle in such a manner that the degree of danger is reduced.

The vehicle control method according to another aspect of the present invention includes acquiring information for controlling various units in a vehicle instead of a driver of the vehicle and managing the information acquired; determining unit a situation under which the vehicle is placed, based on the information; selecting predetermined information corresponding to the situation from among the information; determining degree of danger of the situation based on the predetermined information; and controlling predetermined units in the vehicle in such a manner that the degree of danger is reduced.

The computer program for controlling a vehicle, according to still another aspect of the present invention realizes the method according to the above aspect on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a table for explaining significant cases of a traffic accident;

FIG. 4 is a table for explaining accident prevention and safety processing when entering into an intersection (part 1);

FIG. 5 is a table for explaining accident prevention and safety processing when entering into an intersection (part 2);

FIG. 6 is a table for explaining accident prevention and safety processing when entering into an intersection (part 3);

FIG. 7 is a table for explaining accident prevention and safety processing when entering into an intersection (part 4);

FIG. 8 is a table for explaining accident prevention and safety processing when entering into an intersection (part 5);

FIG. 9 is a table for explaining accident prevention and safety processing when entering into an intersection (part 6);

FIG. 10 is a table for explaining accident prevention and safety processing when entering into an intersection (part 7);

FIG. 11 is a table for explaining accident prevention and safety processing when entering into an intersection (part 8);

FIG. 12 is a table for explaining accident prevention and safety processing when entering into an intersection (part 9);

FIG. 13 is a table for explaining accident prevention and safety processing when entering into an intersection (part 10);

FIG. 14 is a table for explaining accident prevention and safety processing when entering into an intersection (part 11);

FIG. 15 is a table for explaining accident prevention and safety processing when making a right turn at an intersection (part 1);

FIG. 16 is a table for explaining accident prevention and safety processing when making a right turn at an intersection (part 2);

FIG. 17 is a table for explaining accident prevention and safety processing when making a right turn at an intersection (part 3);

FIG. 18 is a table for explaining accident prevention and safety processing when making a right turn at an intersection (part 4);

FIG. 19 is a table for explaining accident prevention and safety processing when making a right turn at an intersection (part 5);

FIG. 20 is a table for explaining accident prevention and safety processing when making a right turn at an intersection (part 6);

FIG. 21 is a table for explaining accident prevention and safety processing when making a right turn at an intersection (part 7);

FIG. 22 is a table for explaining accident prevention and safety processing when making a right turn at an intersection (part 19);

FIG. 25A and FIG. 25B are tables for explaining accident prevention and safety processing when deviating from a lane;

FIG. 26A and FIG. 26B are tables for explaining accident prevention and safety processing when deviating from a lane;

FIG. 35 is a table for explaining a configuration of information stored in a storage unit;

FIG. 36 is a table for explaining a configuration of information stored in a situation specifying table;

FIG. 37 is a table for explaining a configuration of information stored in a danger prediction table;

FIG. 38 is a table for explaining a configuration of information stored in a danger prediction table;

FIG. 39 is a table for explaining a configuration of information stored in a control table;

FIG. 40 is a table for explaining prevention of head-to-head collision with an obstacle (vehicle) ahead;

FIG. 42 is a table for explaining prevention of head-to-head collision with an invisible vehicle;

FIG. 44 is a table for explaining prevention of deviation from a lane due to doze or looking aside;

FIG. 55 is a table for explaining specific examples of driving history and its use examples;

DETAILED DESCRIPTION

Figure 1:
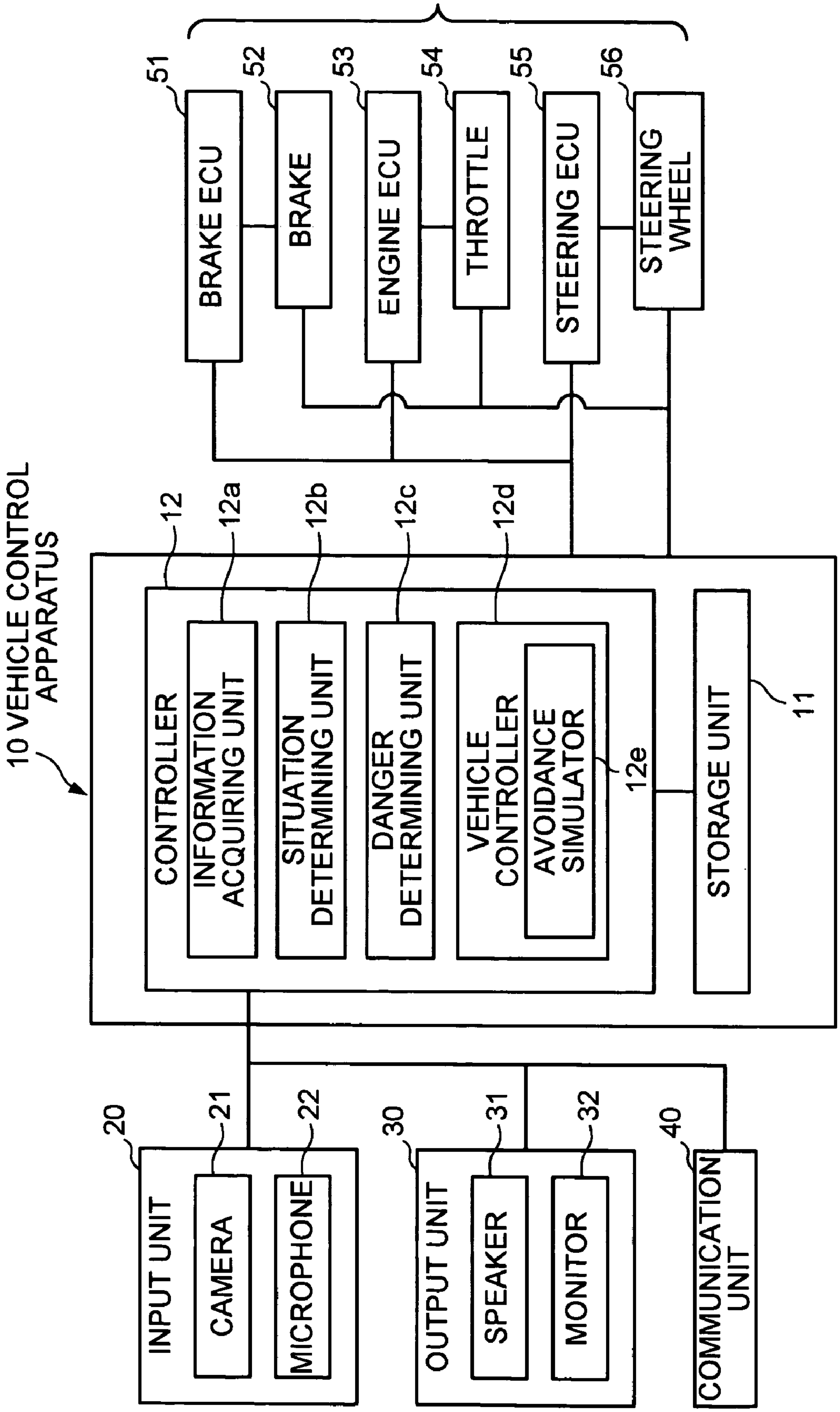
FIG. 1 is a block diagram of a vehicle control apparatus according to an embodiment of the present invention.

Exemplary embodiments of a vehicle control apparatus, a vehicle control method, and a computer program, according to the present invention, are explained in detail with reference to the accompanying drawings.

At first, the concept of the present invention is explained with reference to FIG. 3 to FIG. 24. FIG. 3 is a table for explaining significant cases of a traffic accident; FIG. 4 to FIG. 14 are tables for explaining accident prevention and safety processing when approaching an intersection; FIG. 15 to FIG. 22 are tables for explaining accident prevention and safety processing when making a right turn at an intersection; FIG. 23A to FIG. 23D are schematics for explaining perception, recognition, judgment, action, and operation when approaching an intersection; and FIG. 24A to FIG. 24D are schematics for explaining perception, recognition, judgment, action, and operation when making a right turn at the intersection.

As shown in FIG. 3, the ultimate object of the present invention is to reduce the number of casualties by half by the accident prevention and safety processing at the time of head-to-head meeting with another vehicle. In other words, head-to-head accident situations of vehicles include situations such as approaching an intersection without traffic lights, approaching an intersection with traffic lights, turning to the right at an intersection without traffic lights, and turning to the right at an intersection with traffic lights. Further, the main causes of such accidents include a delay in detection and a judgment error, and more significant cases include oversight, assuming deceleration of other party's vehicle, violation of the traffic rule to stop, ignoring a traffic signal, and a low visibility during nighttime or due to bad weather.

To reduce the number of casualties by half by the accident prevention and safety processing at the time of head-to-head meeting with another vehicle, it becomes an important object how to eliminate the "delay in detection and judgment error" of the driver, with respect to the significant causes in the respective situations, and a solution with respect to such a problem is the concept that becomes the basics of the present invention. That is, realization of appropriate perception, recognition, judgment, action, and operation shown in FIG. 4 to FIG. 24 is the concept, being the basics of the present invention.

The "perception and recognition of information" and "judgment and action" indicate contents to be perceived and recognized in each situation (or case) and contents to be judged and acted based on the perceived and recognized contents, respectively. The "elemental technology" and "supplement" indicate realization methods how to perceive and recognize" and how to judge and act. In other words, in the situation of "approaching the intersection", a sign of "stop" is perceived and recognized by "a spot camera and image processing or radio communications, and a collision tendency is analyzed based on the "accident history database", and approaching and going into the accident prone intersection is notified to the driver, thereby realizing accident prevention and safety.

The process procedure in the upper part in FIG. 23 and FIG. 24 indicates the contents and flow of perception, recognition, judgment, action, and operation to be essentially performed by the driver, and the processing procedure in the lower part indicates the contents and flow of perception, recognition, judgment, action, and operation to be realized by the present invention. That is, in the situation of "approaching the intersection", accident prevention and safety are realized by recognizing signs and other vehicles to determine the danger, and performing avoiding action corresponding thereto.

Methods of realizing appropriate perception, recognition, judgment, action, and operation for accident prevention and safety are proposed in FIG. 4 to FIG. 24. The respective realization methods are the concept that is the basics of the present invention, and embodied in a vehicle control apparatus according to the present invention, thereby contributing to accident prevention and safety at the time of head-to-head meeting of vehicles.

Figure 2:
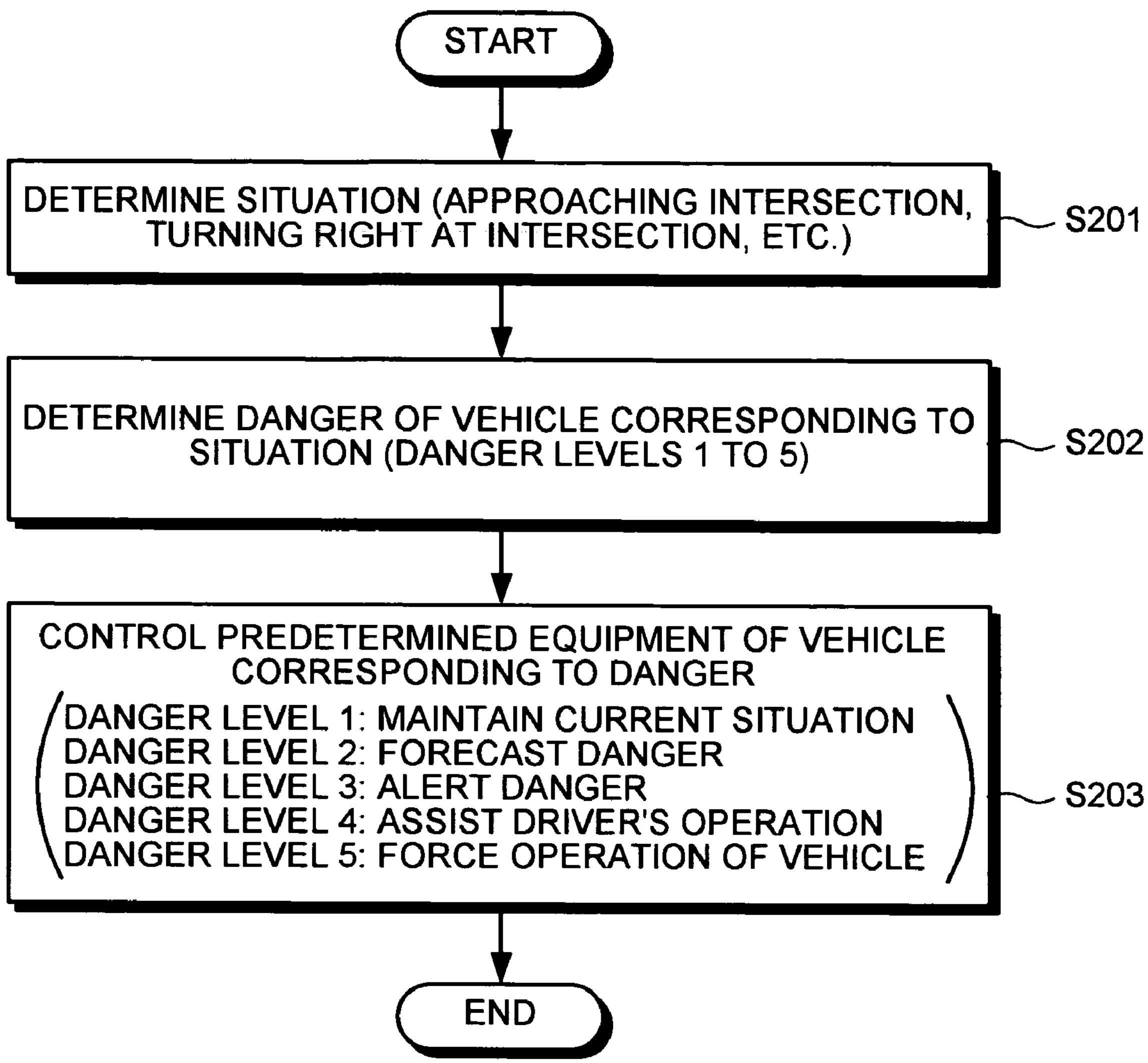
FIG. 2 is a flowchart of process procedure of vehicle control according to the embodiment.
Figure 23A:
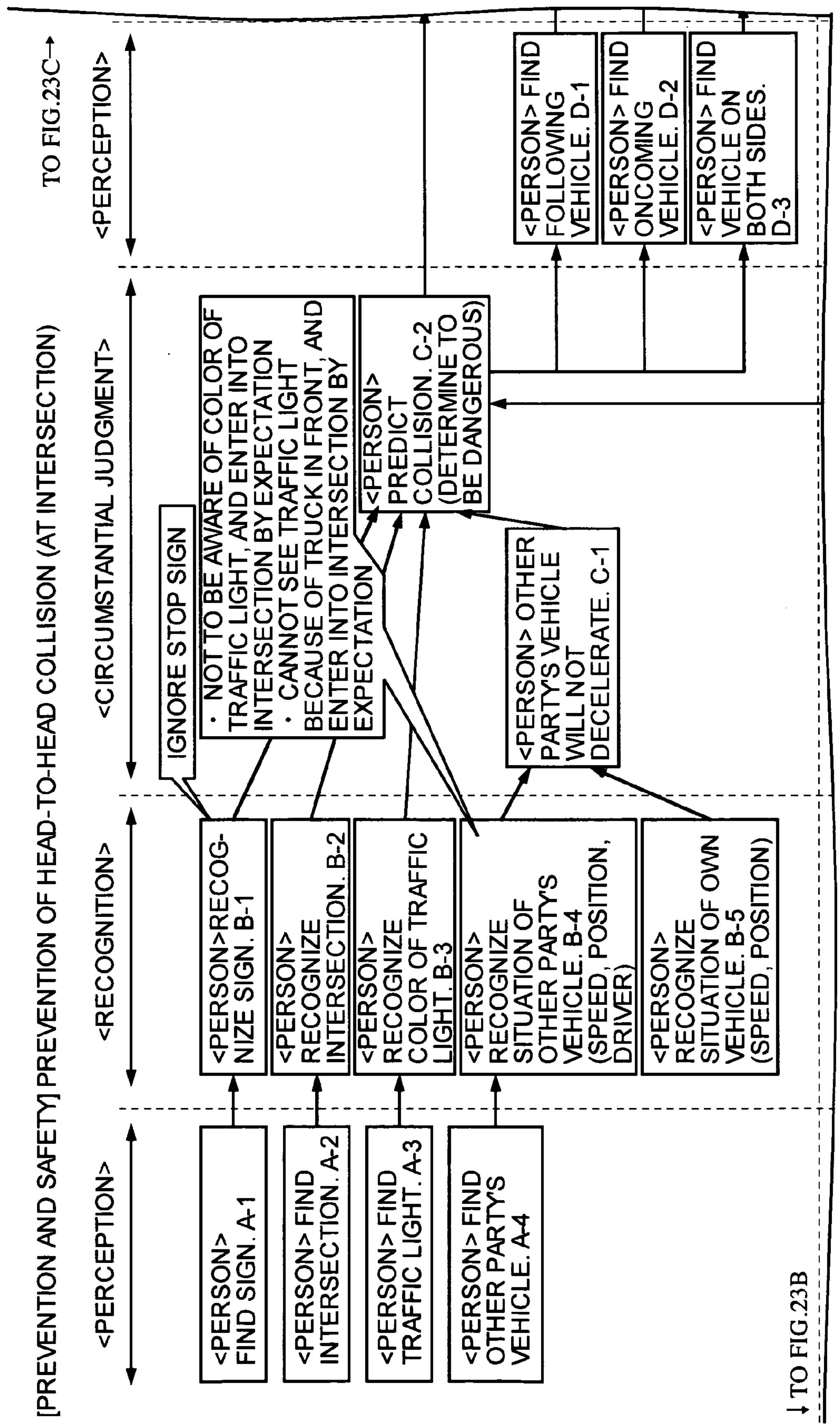
FIG. 23A to FIG. 23D are schematics for explaining perception, recognition, judgment, action, and operation when approaching an intersection.
Figure 23B:
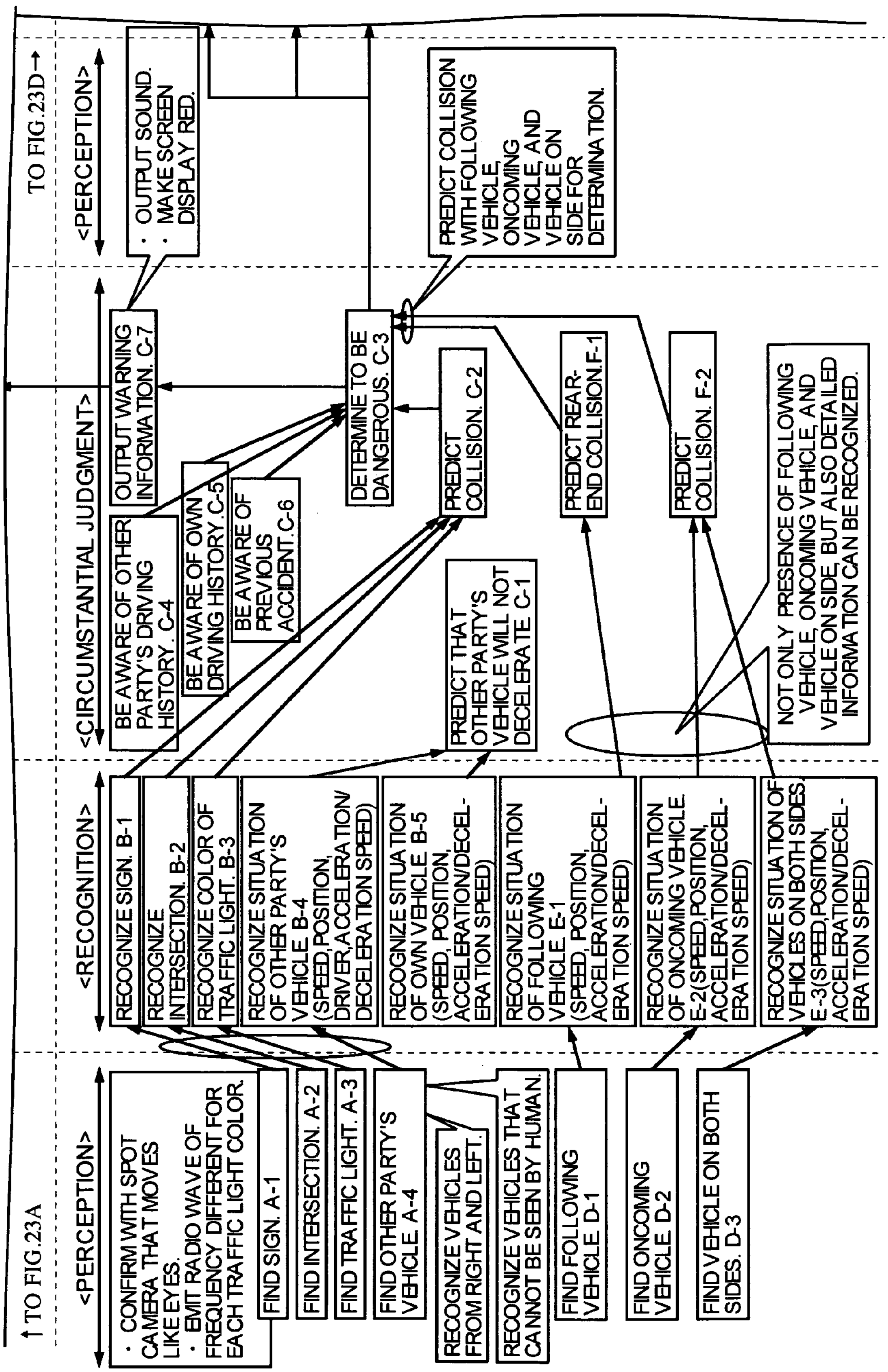
Figure 23C:
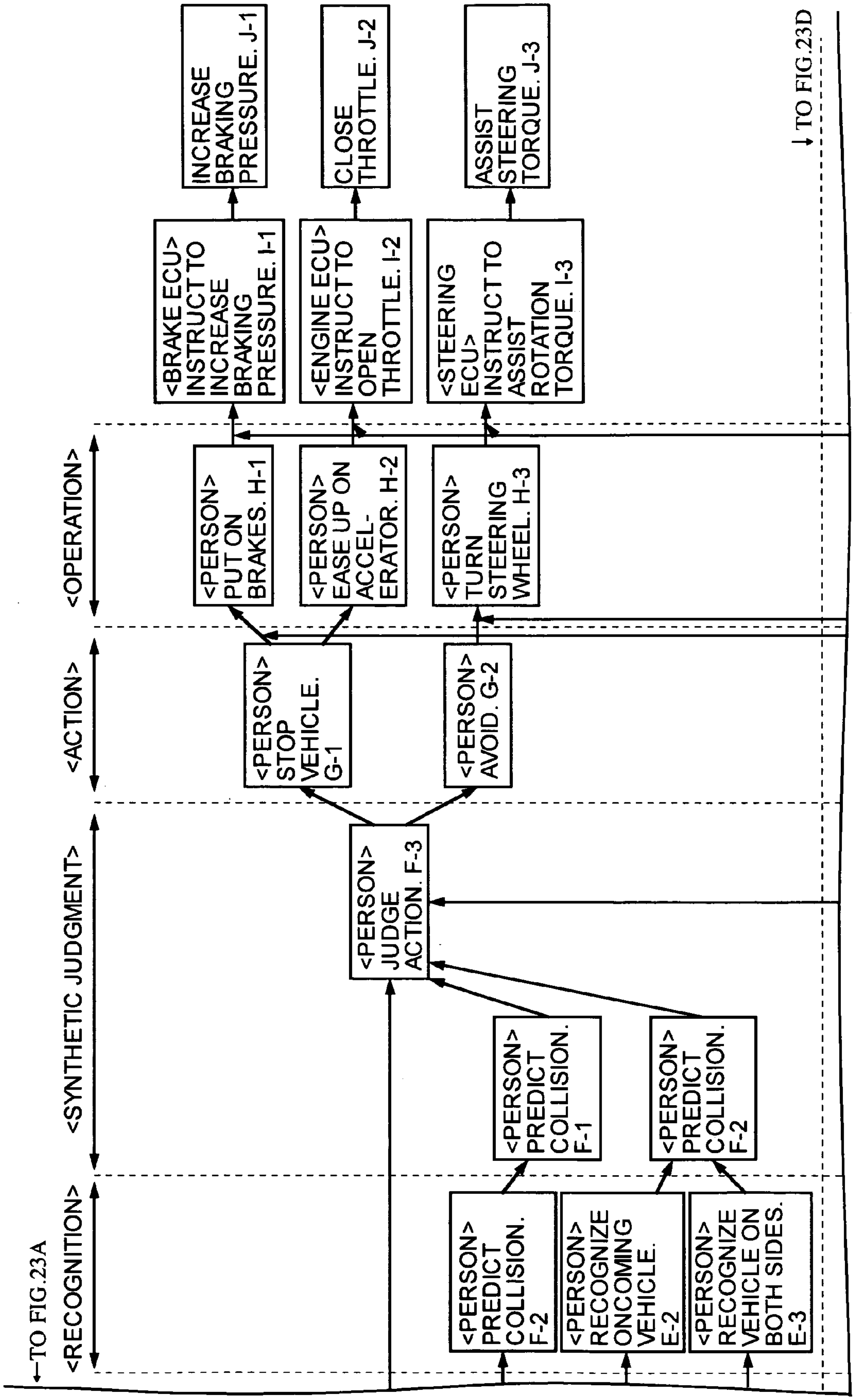
Figure 23D:
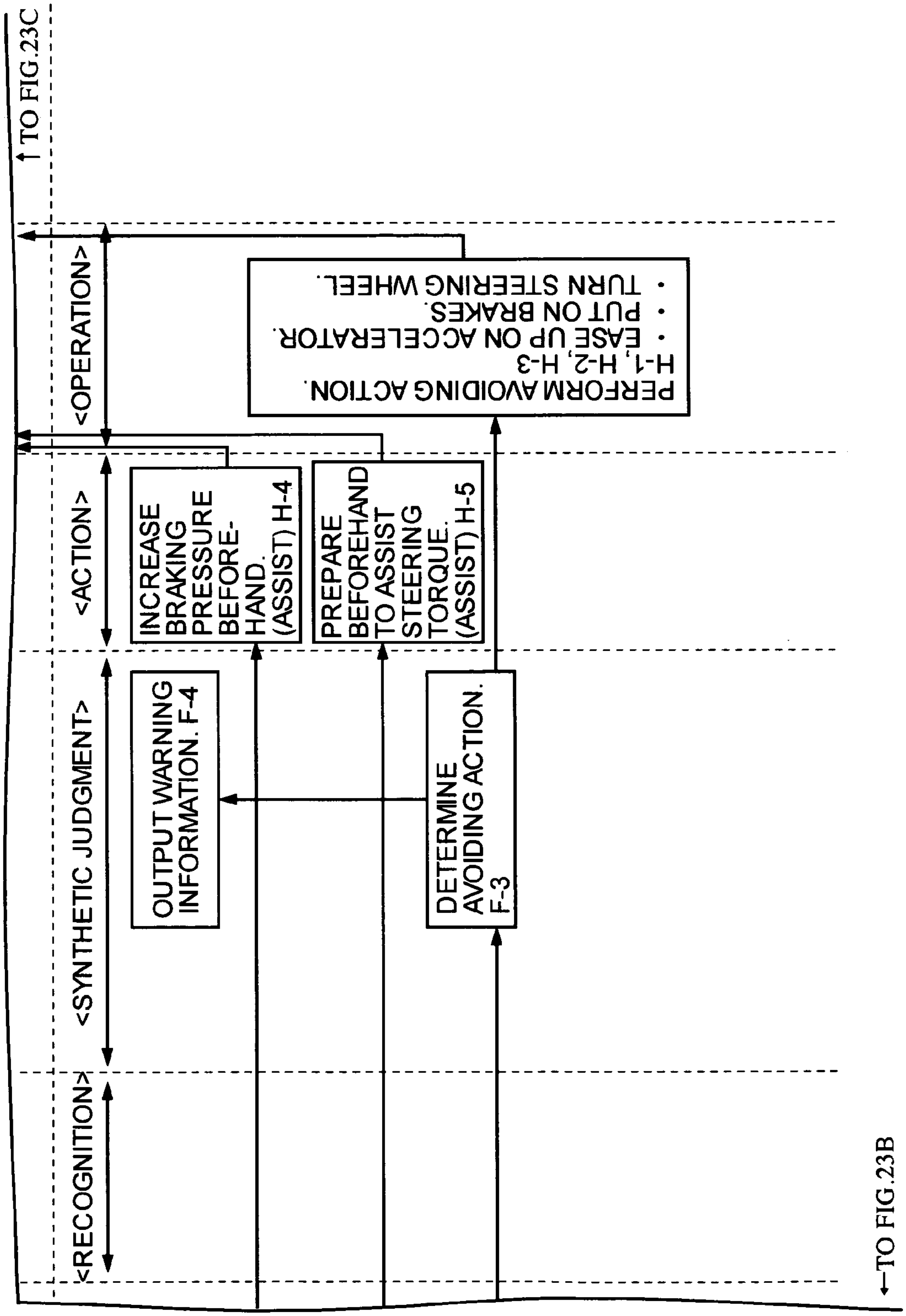
Figure 24A:
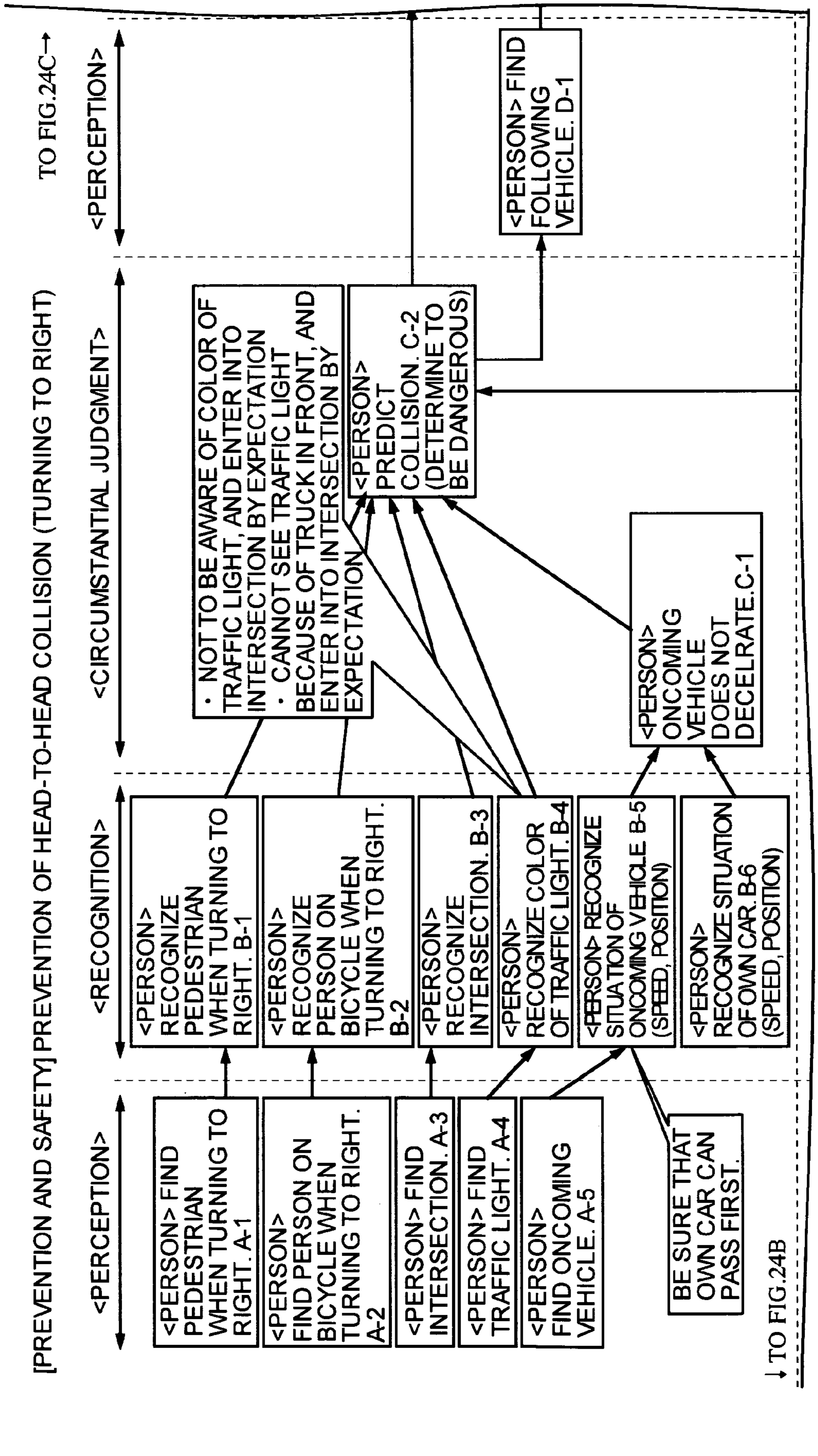
FIG. 24A to FIG. 24D are schematics for explaining perception, recognition, judgment, action, and operation when making a right turn at the intersection.
Figure 24B:
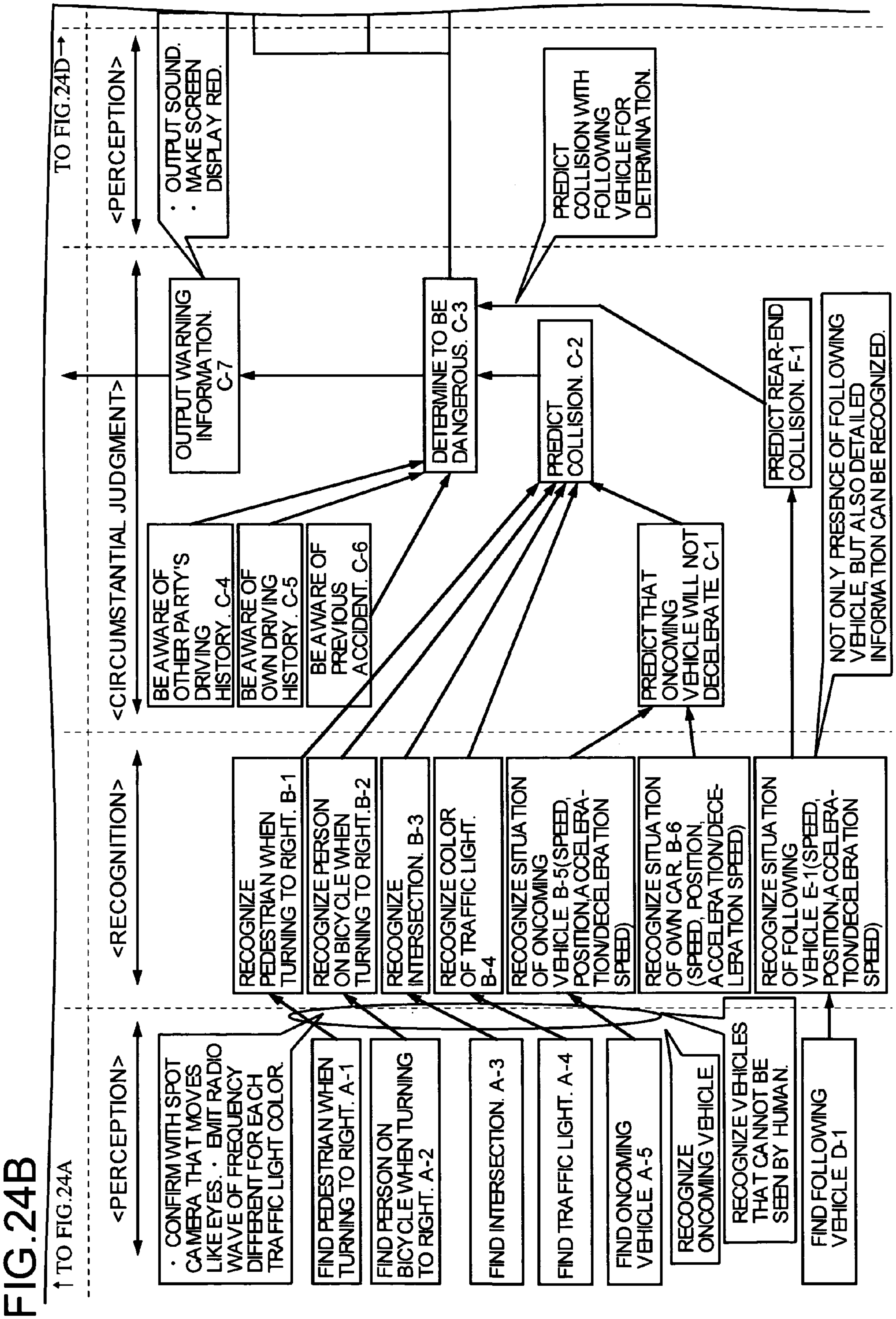
Figure 24C:
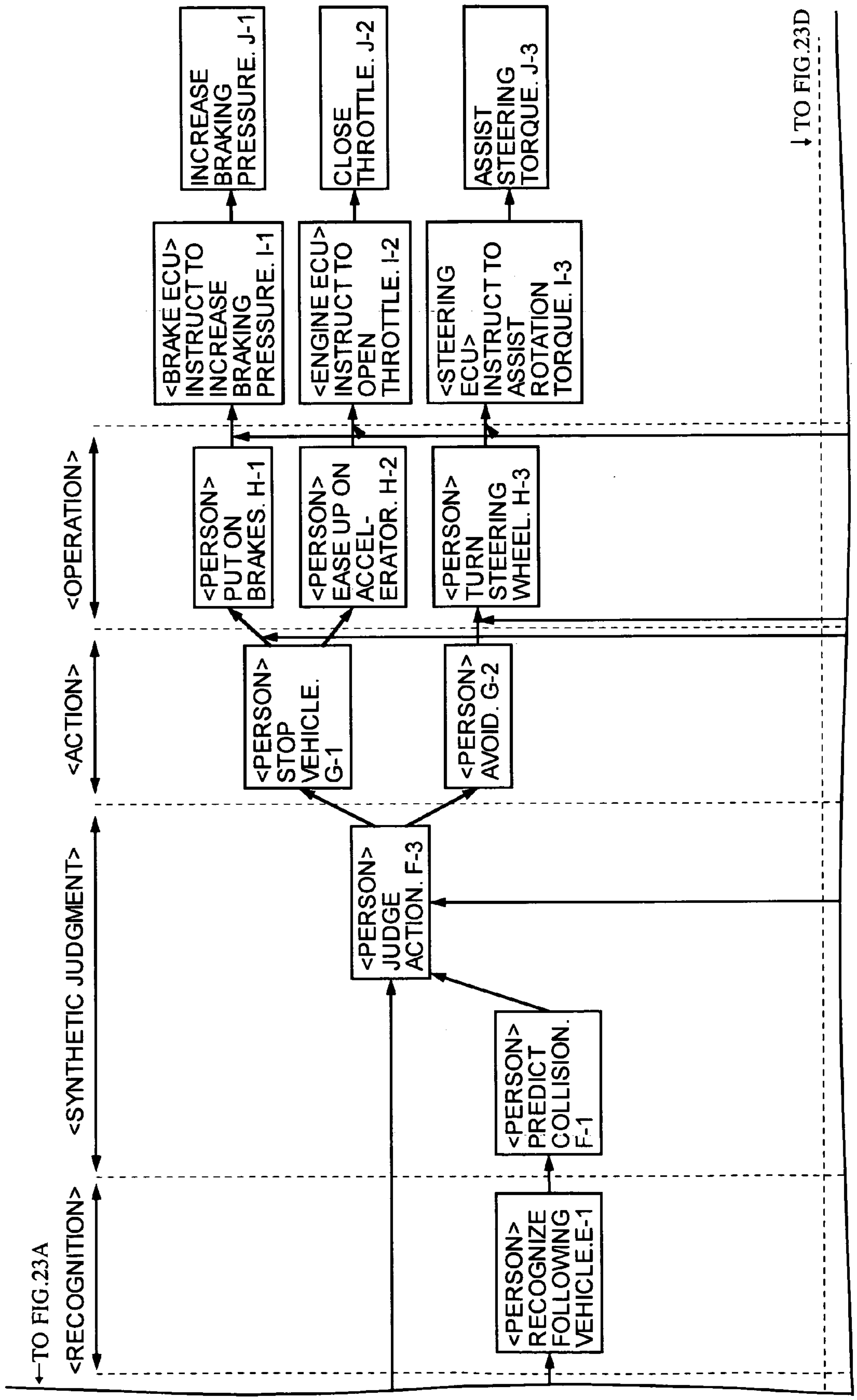
Figure 24D:
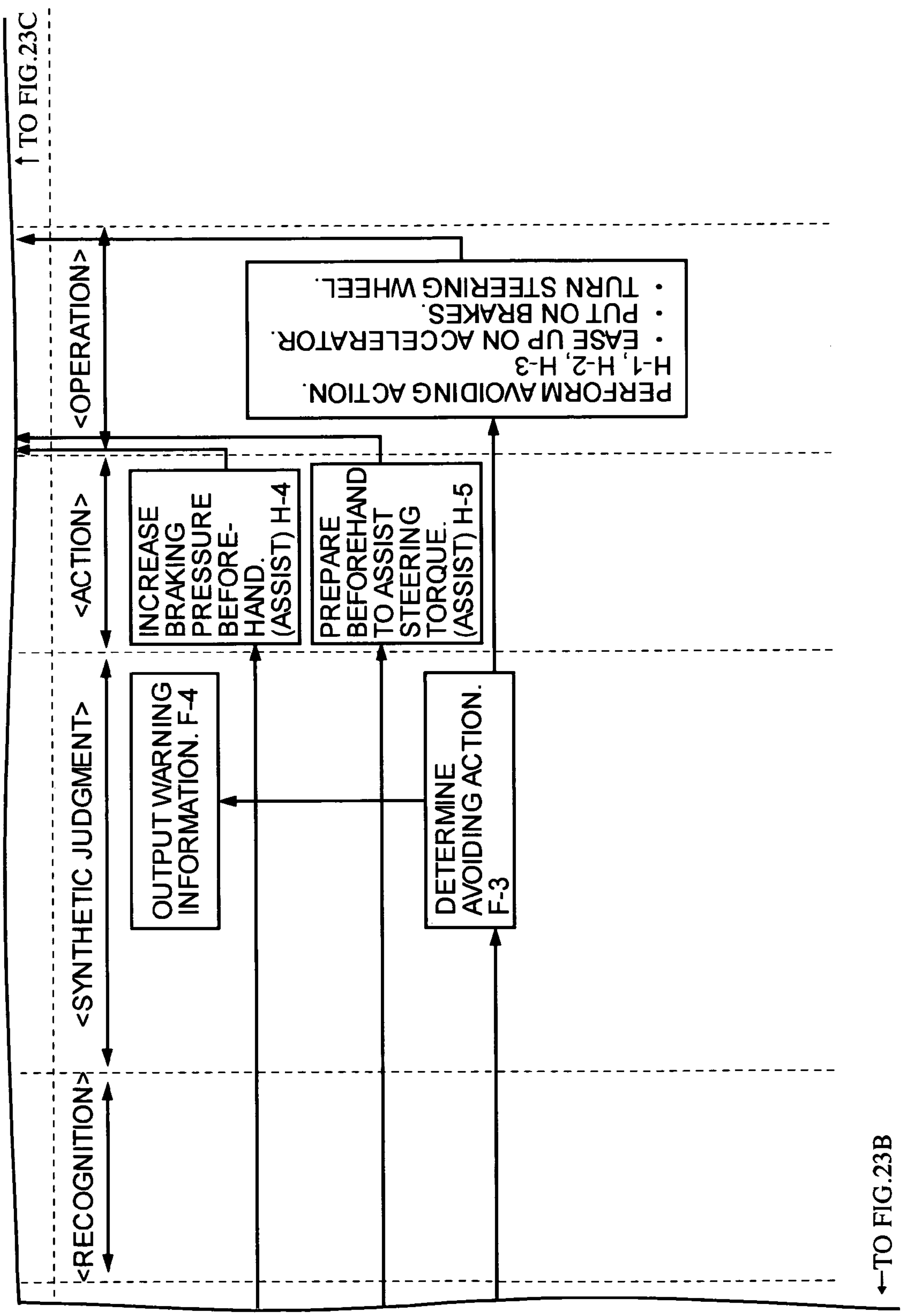

The vehicle control apparatus according to an embodiment of the present invention are explained below with reference to FIG. 1 and FIG. 2. FIG. 1 is a block diagram of a vehicle control apparatus according to the embodiment; and FIG. 2 is a flowchart of process procedure of vehicle control according to the embodiment.

The vehicle control apparatus 10 according to the embodiment is connected to an input unit 20, an output unit 30, a communication device 40, and various kinds of equipment 50, and includes a storage unit 11 and a controller 12, for controlling the vehicle by obtaining various kinds of information instead of the driver of the vehicle.

The input unit 20 is an input unit such as a camera 21 for inputting an image, and a microphone 22 for inputting voice. The input unit 20 mainly inputs various kinds of information utilizable for control of the vehicle (for example, voice information and image information relating to various objects utilizable for control of the vehicle, such as signs, intersections, traffic lights, other party's vehicle, following vehicle, vehicle on side, and persons and persons on bicycle when turning to the right, and information of the vehicle itself, for example, information of engine, brake and tires) to the vehicle control apparatus 10.

The output unit 30 is an output unit such as a speaker 31 for outputting voice and a monitor 32 for outputting an image, and outputs various kinds of information useful for driving (for example, voice information and image information for predicting or warning the danger to the driver) from the vehicle control apparatus 10.

The communication device 40 is a communication device that allows communication between the vehicle and external equipment, and mainly receives various kinds of information utilizable for control of the vehicle (for example, the driving history of an other party who has a possibility of collision at the time of entering into an intersection, or information of previous accidents occurred in the intersection) from the external equipment to be communicated therewith (for example, a history managing center that controls various kinds of information relating to the traffic, and information dispatching server apparatus arranged at each intersection), and inputs the information to the vehicle control apparatus 10.

The input unit 20 and the communication device 40 are for inputting information outside of the vehicle for realizing "perception" and "recognition" shown in FIG. 4 to FIG. 24. Information inside of the vehicle, such as the position information, speed, and acceleration/deceleration speed of the vehicle, and situations of various kinds of equipment 50 are also input to the vehicle control apparatus 10 and controlled, thereby realizing "perception" and "recognition" shown in FIG. 4 to FIG. 24.

Various kinds of equipment 50 are equipment that brakes the vehicle, such as a brake electronic control unit (ECU) 51 and a brake 52 for decelerating the vehicle, an engine ECU 53 and a throttle 54 for accelerating the vehicle, and a steering ECU 55 and a steering wheel 56 for turning the vehicle to the right and left. These various kinds of equipment 50 not only operate based on the operation of the driver to brake the vehicle, but also operate by the control of the vehicle control apparatus 10 without depending on the driver, as described below.

The storage unit 11 in the vehicle control apparatus 10 is a storage unit (memory unit) that stores data and programs necessary for various kinds of processing by the controller 12, and stores various kinds of information utilizable for control of the vehicle (for example, information relating to signs, intersections, traffic lights, other party's vehicle, following vehicle, vehicle on side, and persons and persons on bicycle when turning to the right), input via the input unit 20 and the communication device 40 and acquired by the control of an information acquiring unit 12*a*.

The controller 12 of the vehicle control apparatus 10 is a processor that has an internal memory for storing a control program for an operating system (OS), a program specifying various processing procedures, and necessary data, and executes various kinds of processing by using these. Particularly, the controller 12 has the information acquiring unit 12*a*, a situation determining unit 12*b*, a danger determining unit 12*c*, a vehicle controller 12*d*, and an avoidance simulator 12*e*, as those closely related to the present invention.

These respective units will be explained briefly. The information acquiring unit 12*a* is a unit that acquires various kinds of information utilizable for control of the vehicle (for example, information of the type of sign, the shape of the intersection, the color of traffic lights, the positions, speeds, and acceleration/deceleration speeds of a vehicle with the vehicle control apparatus according to the present invention (hereinafter, "own vehicle") and other party's vehicle) instead of the driver, from the information input via the input unit 20 and the communication device 40, and controls the information in the storage unit 11. The situation determining unit 12*b* is a unit that determines the situation under which the vehicle is placed (for example, approaching the intersection, turning to the right at the intersection, etc.) based on the various kinds of information controlled in the storage unit 11.

The danger determining unit 12*c* is a unit that selects predetermined information corresponding to the situation (for example, under the situation of approaching the intersection, information of other vehicles approaching the intersection from other directions), from the various kinds of information controlled in the storage unit 11, and determines the danger of the vehicle (for example, danger levels 1 to 5, based on the collision possibility with other vehicles), based on the selected predetermined information.

The vehicle controller 12$d$ is a unit that controls the various kinds of equipment 50 and the output unit 30 so as to reduce the danger of the vehicle determined by the danger determining unit 12$c$ (for example, in the case of the danger level 2, a prediction that another vehicle is approaching the intersection is informed to the driver from the speaker 31). The avoidance simulator 12$e$ is a unit that simulates the operation of the driver or the action of the vehicle required for avoiding the danger of the vehicle, based on the various kinds of information controlled in the storage unit 11, when the vehicle controller 12$d$ controls the various kinds of equipment 50 so as to assist the operation of the driver or compel the action of the vehicle (for example, when the danger level is 4 or 5).

The vehicle control apparatus 10 according to the embodiment acquires various kinds of information utilizable for control of the vehicle (for example, information such as the type of sign, the shape of intersection, the color of traffic lights, the position, speed, and acceleration and deceleration speed of the other party's vehicle) for the driver, and controls the information in the storage unit 11. The vehicle control apparatus 10 then specifies the situation under which the vehicle is placed (for example, approaching the intersection, turning to the right at the intersection, etc.) based on the various kinds of information controlled in the storage unit 11 (step S201).

After determination of the situation, the vehicle control apparatus 10 determines the danger of the vehicle (for example, in the situation of approaching the intersection, danger levels 1 to 5 based on the collision possibility with another vehicle approaching the intersection from another direction), corresponding to the situation (step S202). The vehicle control apparatus 10 then controls various kinds of equipment 50 and the output unit 30 so as to reduce the danger of the vehicle (step S203). In other words, for example, if the danger level is 2, a prediction that the other party's vehicle approaches the intersection is informed to the driver from the speaker 31. If the danger level is 4 or 5, various kinds of equipment 50 is controlled so as to assist the operation of the driver or compel the action of the vehicle, corresponding to the simulation result by the avoidance simulator 12$e$.

The vehicle control apparatus 10 according to the embodiment executes a series of processing procedures of perception, recognition, judgment, action, and operation for the driver (in cooperation with the driver), and particularly has various features as described below, for realizing appropriate perception, recognition, judgment, action, and operation for accident prevention and safety.

The information acquiring unit 12$a$ in the vehicle control apparatus 10 acquires various kinds of information utilizable for control of the vehicle for the driver, from the information input via the input unit 20 and the communication device 40, and controls the information in the storage unit 11. Therefore, according to the embodiment, the vehicle control apparatus 10 can acquire the information effective for control of the vehicle from inside and outside of the vehicle, instead of the driver, and control the information.

Specifically, the information acquiring unit 12$a$ acquires various kinds of information inside and outside of the vehicle, as shown in FIG. 4 to FIG. 24, such as the type of sign, the shape of the intersection, the color of traffic lights, the positions, speeds, and acceleration/deceleration speeds of other vehicles having a possibility of direct collision, the positions, speeds, and acceleration/deceleration speeds of the following vehicle, the oncoming vehicle, the vehicle on side, and persons and persons on bicycle when turning to the right, having a possibility of indirect collision, the driving history of the other party who has the possibility of collision at the time of approaching the intersection, previous accidents previously occurred at the approaching intersection, the position, speed and acceleration and deceleration speed of the own vehicle, and situations of various kinds of equipment 50 of the own vehicle. In other words, all types of information that may be useful for determination processing such as determination of situation, danger determination, vehicle control, and avoidance simulation are acquired.

The information acquired by the information acquiring unit 12$a$ is controlled in the storage unit 11, and read out and used as determination materials at the time of determination processing listed up above. That is, at the time of determination processing listed up above, not only the information acquired by the vehicle control apparatus 10 on real-time bases, but also the information acquired in the past are used as the determination materials.

The image information and voice information input to the vehicle control apparatus 10 via the camera 21 and the microphone 22 are appropriately analyzed by the information acquiring unit 12$a$, and converted to information directly utilizable as the determination materials, such as the "type" of sign, the "color" of traffic lights, and the "position, speed, and acceleration and deceleration speed" of vehicles and persons.

The situation determining unit 12$b$ in the vehicle control apparatus 10 determines the situation under which the vehicle is placed based on the various kinds of information controlled in the storage unit 11. Therefore, according to the embodiment, the situation under which the vehicle is placed can be determined appropriately, thereby enabling appropriate perception, recognition, judgment, action, and operation.

Specifically, the situation determining unit 12$b$ determines the situations such as approaching an intersection with traffic lights, turning to the right or left at the intersection, approaching an intersection without traffic lights, and turning to the right or left at the intersection, as shown in FIG. 4 to FIG. 24. That is, various situations at the intersection can be appropriately determined.

The determination of the situation is performed by using information acquired by the information acquiring unit 12$a$, such as the position information of the own vehicle acquired from the GPS satellite, the type of the sign, the color of the traffic lights, and the shape of the road acquired from the camera 11, and the information of the direction indicator acquired from inside of the own vehicle. The information to be acquired by the information acquiring unit 12$a$ may be selected according to the determined situation. That is, by selecting the sensor to be operated, the power consumption can be reduced. For example, in a section where there is no interchange in a motorway, the power consumption can be reduced and the load on the computer can be reduced by suspending the sensor and the processing for detecting an oncoming vehicle.

The danger determining unit 12$c$ in the vehicle control apparatus 10 selects predetermined information corresponding to the situation, from the various kinds of information controlled in the storage unit 11, and determines the danger of the vehicle based on the selected predetermined information. Therefore, according to the embodiment, the vehicle control apparatus 10 can select appropriate information corresponding to the determined situation, to determine the danger appropriately.

Specifically, the danger determining unit 12$c$ selects an object having the possibility of direct collision with the own vehicle according to the determined situation, as shown in FIG. 4 to FIG. 24, and then presumes the possibility of direct collision based on the information acquired and controlled relating to the selected object and the own vehicle. That is, for example, in the situation of approaching an intersection, another vehicle approaching the intersection from the right or left direction is selected as the "object having the possibility of direct collision with the own vehicle", and presumes the possibility of direct collision (for example, the probability of collision when going into the intersection at the current speed) from the information relating to the position, speed and acceleration and deceleration speed of the other party's vehicle and the own vehicle.

As another example, in the situation of turning to the right at an intersection, another vehicle approaching the intersection from the straight ahead direction is selected as the "object having the possibility of direct collision with the own vehicle", and presumes the possibility of direct collision. According to the embodiment, therefore, the vehicle control apparatus 10 can appropriately perceive and recognize the object having the possibility of direct collision with the own vehicle corresponding to the situation, and appropriately determine the danger of the vehicle, in view of the possibility of collision with the object.

At the time of determination of the danger, the situation determining unit 12*b* selects, as shown in FIG. 4 to FIG. 22, not only an object having the possibility of direct collision but also an object having the possibility of indirect collision, to presume the possibility of indirect collision. In other words, for example, in a situation of approaching an intersection, a following vehicle, an oncoming vehicle, and a vehicle on side are selected as the "objects having the possibility of indirect collision with the own vehicle", to presume the possibility of indirect collision (for example, the probability of indirect collision with the following vehicle when braking hard from the current situation) from the information relating to the position, speed and acceleration and deceleration speed of these vehicles and the own vehicle.

As another example, in a situation of turning to the right at an intersection, a person and a person on bicycle when turning to the right, a following vehicle, and a vehicle on side are selected as the "objects having the possibility of indirect collision with the own vehicle", to presume the possibility of indirect collision (for example, the probability of hitting the person when turning to the right at the current speed at the intersection) from the information relating to the position, speed and acceleration and deceleration speed of the own vehicle. According to the embodiment, therefore, the vehicle control apparatus 10 can appropriately perceive and recognize the object having the possibility of direct collision with the own vehicle but also an object having the possibility of indirect collision corresponding to the situation, and appropriately determine the danger of the vehicle, in view of the possibility of collision with these objects.

At the time of determination of the danger, the situation determining unit 12*b* determines, as shown in FIG. 4 to FIG. 22, not only the information relating to the current situation of the object and the own vehicle, but also the information relating to a previous situation thereof, to determine the danger. In other words, for example, the situation determining unit 12*b* presumes the possibility of collision with the object, by taking into account the driving history of the other party who has the possibility of direct collision (for example, the other party had an accident at an intersection in the past), and the driving history of the driver of the own vehicle (for example, it is not long since the driver obtained a driving license). Therefore, according to the embodiment, the vehicle control apparatus 10 can determine the danger of the vehicle more appropriately from various points of view, by perceiving and recognizing not only the current situation of the object and the own vehicle, but also the past tendency.

At the time of determination of the danger, the situation determining unit 12*b* determines the danger of the vehicle, as shown in FIG. 4 to FIG. 22, based on the information relating to cases previously occurred in the determined situation. That is, for example, the situation determining unit 12*b* presumes the possibility of collision with the object by taking into account the information of previous accidents previously occurred at the approaching intersection (for example, many accidents have occurred in the similar situation in a predetermined time zone). Therefore, according to the embodiment, the vehicle control apparatus 10 can determine the danger of the vehicle more appropriately from various points of view, by perceiving and recognizing not only the current situation of the object and the own vehicle, but also the past tendency depending on the situation.

The situation determining unit 12*b* determines to which danger level (of the danger levels 1 to 5) the vehicle belongs, from the possibility of collision. That is, the danger of the vehicle is determined stepwise in a plurality of danger levels, thereby enabling appropriate vehicle control (operation and action) corresponding to each danger level.

The vehicle controller 12*d* in the vehicle control apparatus 10 controls the various kinds of equipment 50 and the output unit 30 so as to reduce the danger of the vehicle determined by the danger determining unit 12*c*. Therefore, according to the embodiment, the vehicle control apparatus 10 can finally perform appropriate vehicle control for avoiding the danger.

Specifically, the danger determining unit 12*c* determines the danger level of the vehicle, of a level at which there is no danger of the vehicle (danger level 1), a level to inform the driver (danger level 2), a level to warn the driver (danger level 3), a level at which collision can be avoided by the operation of the driver (danger level 4), and a level at which collision cannot be avoided (danger level 5).

On the other hand, the vehicle controller 12*d* controls the various kinds of equipment 50 and the output unit 30 corresponding to the determined danger level, so as to do nothing at danger level 1, to predict the danger of the vehicle for the driver at danger level 2, to warn the driver of the danger of the vehicle at danger level 3, to assist the operation of the driver to avoid the danger at danger level 4, and to forcibly control the action of the vehicle to avoid the danger at danger level 5.

In other words, for example, in the case,of danger level 2, the vehicle controller 12*d* sounds a long buzzer as a prediction from the microphone 22, outputs a voice message as a prediction that "a vehicle is approaching the intersection from the right direction", and in the case of danger level 3, sounds a short buzzer as a warning from the microphone 22, or outputs a voice message as a warning that "pay attention to a vehicle approaching the intersection from the right direction". Therefore, according to the embodiment, appropriate prediction or warning can be issued according to the danger level, thereby urging the driver to perform appropriate operation and action.

As another example, in the case of danger level 4, the vehicle controller 12*d* outputs a control instruction to increase the pressure of the brake 52 beforehand (so as to quicken the reaction of the brake 52) to assist the operation of the driver, or to prepare to increase the rotating torque of the steering wheel 56 beforehand, and in the case of danger level 4, outputs a control instruction to put on the brake 52 to compel the action of the vehicle, to release the accelerator (throttle 54), or to steer the vehicle, to the respective ECUs (the brake ECU 51, the engine ECU 53, and the steering ECU 55). According to the embodiment, therefore, the vehicle control apparatus 10 can not only make appropriate prediction or warning corresponding to the danger level, but also perform appropriate vehicle control (operation assistance or compulsive action) corresponding to the danger level.

The avoidance simulator 12*e* in the vehicle controller 12*d* simulates the operation of the driver or the action of the vehicle required for avoiding the danger of the vehicle, based on the various kinds of information controlled in the storage unit 11, when the vehicle controller 12*d* controls the various kinds of equipment 50 to assist the operation of the driver or compel the action of the vehicle.

That is, for example, in the case of danger level 4, the avoidance simulator 12*e* presumes how much the danger of collision can be avoided by assisting the operation, such as decreasing the pressure of the brake 52 or increasing the rotating torque of the steering wheel 56. In the case of danger level 5, the avoidance simulator 12*e* presumes how much the danger of collision can be avoided by the compulsive action, such as putting on the brake 52, releasing the accelerator (throttle 54), or steering the vehicle. The vehicle controller 12*d* executes the operation assistance or compulsive action having the highest possibility of avoiding the danger, as a result of avoidance simulation. Therefore, according to the present embodiment, when the vehicle is in a danger level requiring the operation assistance or compulsive action (for example, when the danger level is 4 or 5), the vehicle control apparatus 10 can perform more appropriate vehicle control (operation assistance or compulsive action).

When it is difficult to completely avoid the danger of the vehicle in the avoidance simulation, the avoidance simulator 12*e* presumes the content of the operation assistance or compulsive action so that the damage in the situation becomes the smallest. In other words, for example, when it is difficult to completely avoid the danger of the vehicle, the avoidance simulator 12*e* operates to avoid reckless operation assistance or compulsive action such as abruptly steering the vehicle or abruptly putting on the brake. Therefore, according to the embodiment, an increase in the secondary damage due to the reckless operation assistance or compulsive action can be avoided.

When it is difficult to completely avoid collision, the avoidance simulator 12*e* presumes the content of the operation assistance or compulsive action so that the damages of the own vehicle, an object having the possibility of direct collision, and an object having the possibility of indirect collision become the smallest. In other words, for example, the avoidance simulator 12*e* simulates in which case the damage becomes the smallest, when the own vehicle collides with the object having the possibility of direct collision, or when the own vehicle collides with the object having the possibility of indirect collision, or by which operation assistance or compulsive action, the damages occurring in these become the smallest. Therefore, according to the embodiment, by the appropriate operation assistance or compulsive action, the vehicle's damage by the collision with an object can be the smallest.

For the simulation, a method in which a time-dependent change in the vehicle and obstacles is sequentially calculated in detail, and a simple method for determining which control should be performed based on the condition at that time (various detection values) (having a memory for the map of a control method using conditions as a parameter) can be applied.

Through the series of processing procedures of (1) information acquisition, (2) determination of the situation, (3) danger determination, (4) vehicle control, and (5) avoidance simulation, the information effective for vehicle control can be acquired and controlled, the situation under which the vehicle is placed can be appropriately determined, the appropriate information can be selected corresponding to the determined situation to determine the danger appropriately, and appropriate vehicle control can be performed for avoiding the danger. In other words, appropriate perception, recognition, judgment, action, and operation can be performed instead of the driver, thereby realizing prevention of traffic accident and safety of vehicles.

So far, an example in which various situations at an intersection are determined has been explained, but the present invention is not limited thereto. Specific examples of perception, recognition, judgment, action, and operation when the present invention is applied to prevention of deviation from the lane are shown in FIG. 25 to FIG. 32. When a vehicle deviates from the traveling lane, the probability of an accident increases. The determination of situation shown in FIG. 25 to FIG. 32 is for performing appropriate perception, recognition, judgment, action, and operation instead of the driver at the time of deviating from the lane.

More specifically, deviation from the lane includes deviation from the lane occurring suddenly and unexpectedly for avoiding an obstacle or due to doze or looking aside, intentional deviation from the lane occurring according to the intention of the driver, such as passing and changing the lane, and unexpected deviation from the lane due to approaching a curve at an excessive speed, without decelerating sufficiently at the time of curving.

As shown in FIG. 25 to FIG. 32, deviation from the lane occurs mainly because of a "delay in detection" and a "judgment error". Particularly, significant cases relating to the "delay in detection" include one due to "looking aside", one due to "doze", one due to "a pedestrian, a person on bicycle, a parked vehicle, and a fallen object", and one due to "a change in the road condition because of "furrow, undulations on the road surface, rain, snow, etc."

To prevent deviation from the lane due to looking aside, it is necessary to know that the driver does not look ahead, that is, the condition of the driver. Therefore, the danger can be notified to the driver beforehand by monitoring the driver by a spot camera and an image recognition apparatus, and by warning the driver by buzzer or the like when the driver does not look ahead. Further, when it is determined that it will be too late for avoiding collision by the control by the driver according to the danger level, it is preferred to perform braking operation and steering operation to avoid collision.

To prevent deviation from the lane due to doze, it is necessary to detect dozing of the driver. Information such as the line of sight of the driver, movement of the driver's head, pulse, and breathing is necessary to detect dozing of the driver. Therefore, the spot camera, the image recognition apparatus, and database are used to obtain the information, to detect dozing of the driver, and the danger can be informed to the driver beforehand by warning the driver by a buzzer or the like. Further, when it is determined that it will be too late for avoiding collision by the control by the driver according to the danger level, it is preferred to perform braking operation and steering operation to avoid collision.

To prevent deviation from the lane due to a pedestrian, a person on bicycle, a parked vehicle, and a fallen object, it is necessary to detect the pedestrian, the person on bicycle, the parked vehicle, and the fallen object. Therefore, by recognizing the pedestrian, the person on bicycle, the parked vehicle, and the fallen object by using the spot camera and the image recognition apparatus, and warning the driver by a screen display or the like, the danger can be informed to the driver beforehand. Further, when it is determined that it will be too late for avoiding collision by the control by the driver, according to the danger level, it is preferred to perform braking operation and steering operation to avoid collision.

Likewise, to prevent deviation from the lane due to a change in the road condition because of furrow, undulations on the road surface, rain, snow, or the like, it is necessary to know the road condition. Therefore, by recognizing the road condition by using the spot camera, the image recognition apparatus, and a probe and a hot-spot (an equipment installed on the road, for providing data indicating the road condition near the point by the communication means such as radio wave), appropriate action can be taken, such as deceleration, and avoiding an obstacle. By warning the driver by a screen display or the like, the danger can be informed beforehand. Further, not only the road condition, but the wear condition of tires can be also obtained and used. The wear condition of tires can be calculated by a comparison between the number of revolutions of the wheels and the actual travel distance obtained by the GPS.

Further, to prevent deviation from the lane due to a delay in recognition of the positions of the own vehicle and other vehicles, it is necessary to recognize the position of the own vehicle, and positions of a vehicle ahead, a following vehicle, vehicles on sides, and an oncoming vehicle, by the vehicle control apparatus. Therefore, by obtaining the relative position of the own vehicle with the oncoming vehicle and the vehicle ahead by the spot camera, and finding a vehicle on side and the following vehicle by a peripheral monitoring camera, a stoppable position can be determined and an obstacle can be avoided. Avoidance of an obstacle is not limited to the one executed compulsively by the vehicle control apparatus, but may be the one assisting the operation of the driver, such as increasing the braking pressure, and enabling the steering wheel to be operated lightly.

On the other hand, significant cases relating to the "judgment error" include one due to "an excessive speed", and another due to "following the vehicle ahead". To prevent deviation from the lane due to an excessive speed, it is necessary to recognize the speed of the own vehicle, the steering angle, and the curve condition. Necessary information can be collected by detecting the relative speed by a speedometer, detecting the steering angle by using the position of the steering wheel and a yaw rate sensor, and detecting the curve condition by the spot camera and map data.

To prevent deviation from the lane due to following the vehicle ahead, it is necessary to recognize the position relation with the vehicle ahead, the condition of the lane, and whether the vehicle ahead is an emergency vehicle. By obtaining necessary information by using the spot camera and radio communications, visual false impression of the driver can be prevented, and a prioritized vehicle (emergency vehicle) can be recognized, thereby enabling prevention of an accident.

Figure 27:
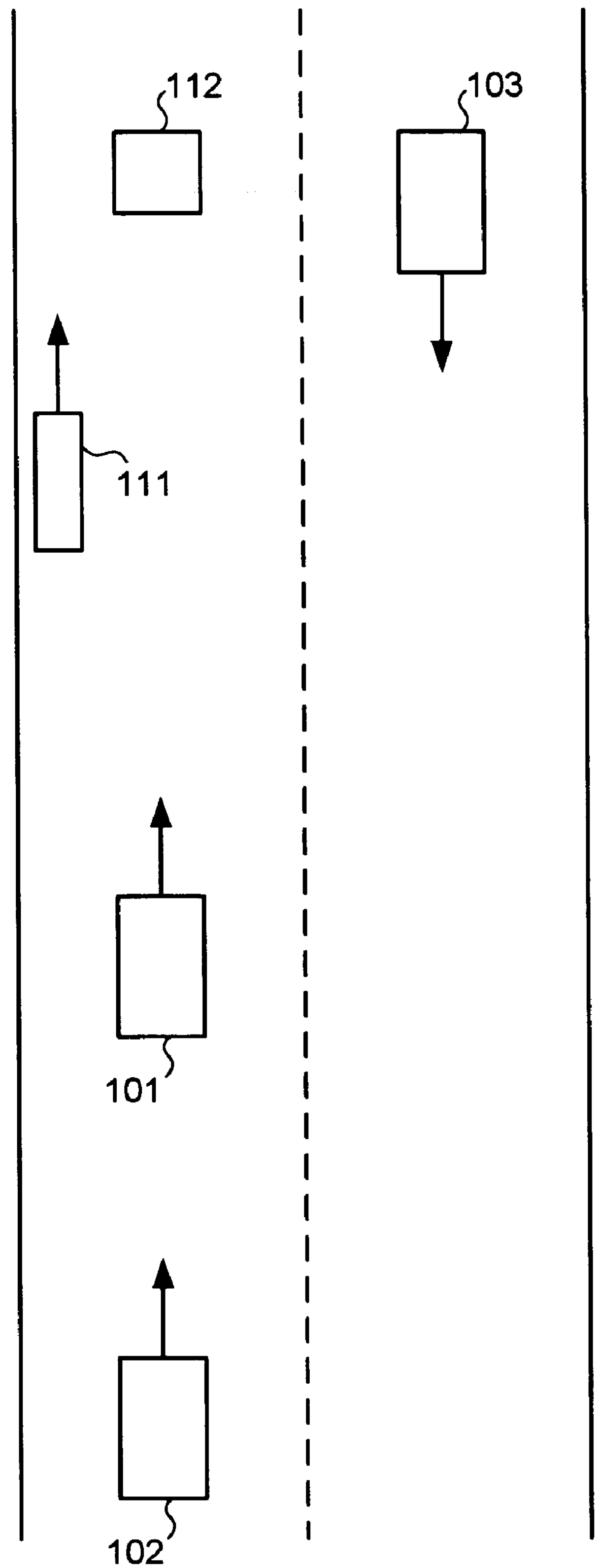
FIG. 27 is a schematic for illustrating an example of a situation when deviating from a lane unexpectedly.
Figure 28A:
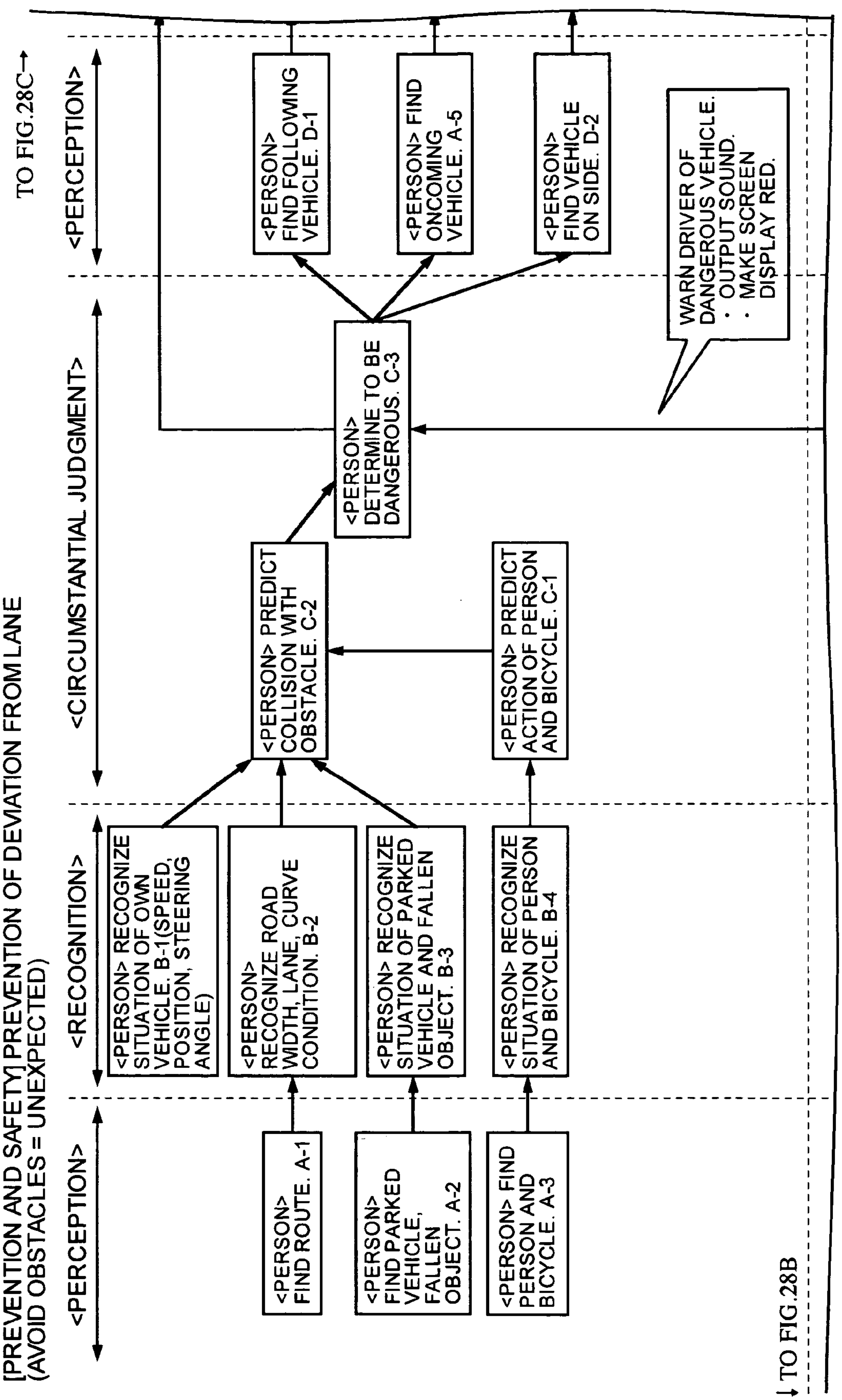
FIG. 28A to FIG. 28D are schematics for explaining specific examples of perception, recognition, judgment, action, and operation when deviating from a lane unexpectedly.
Figure 28B:
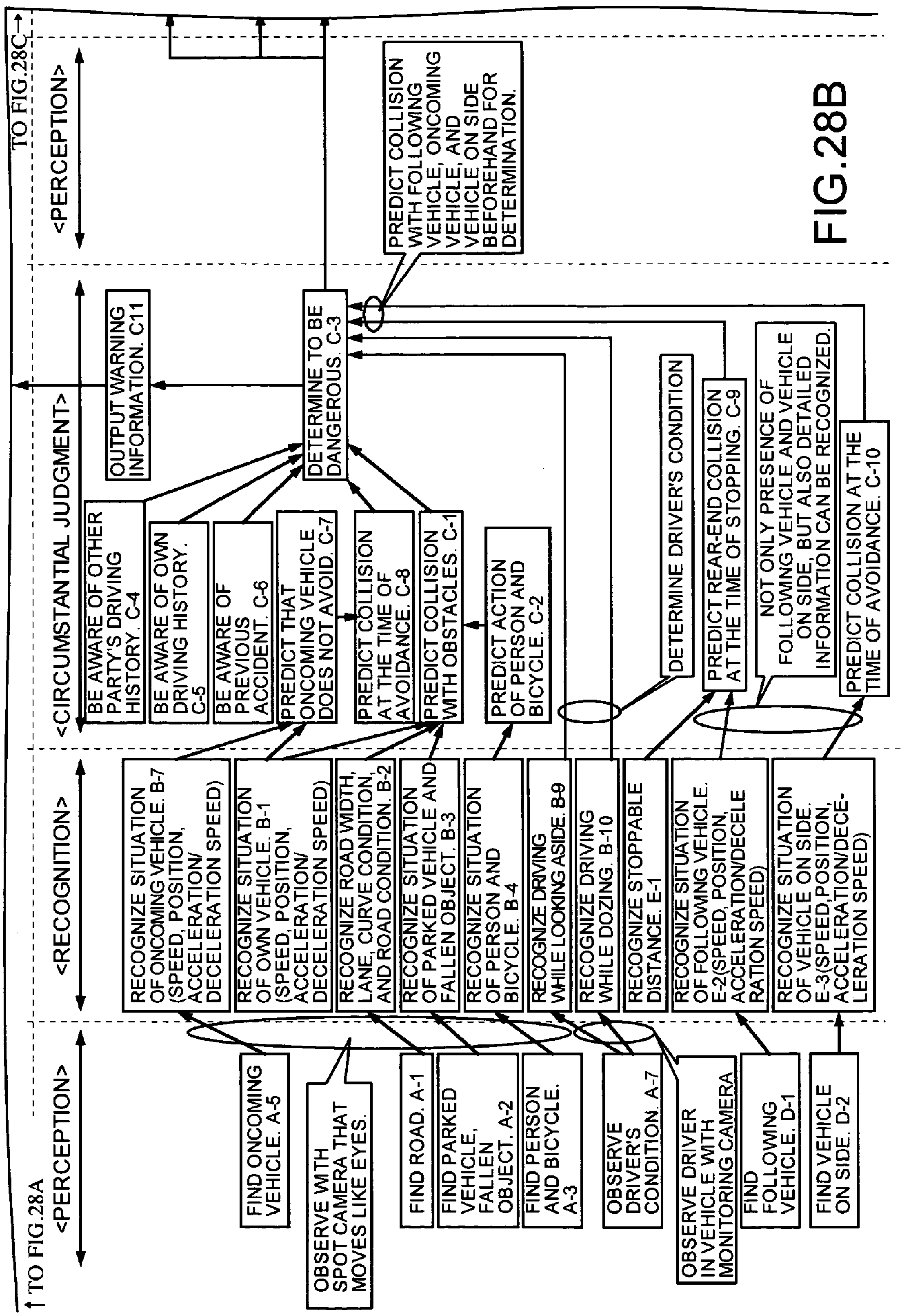
Figure 28C:
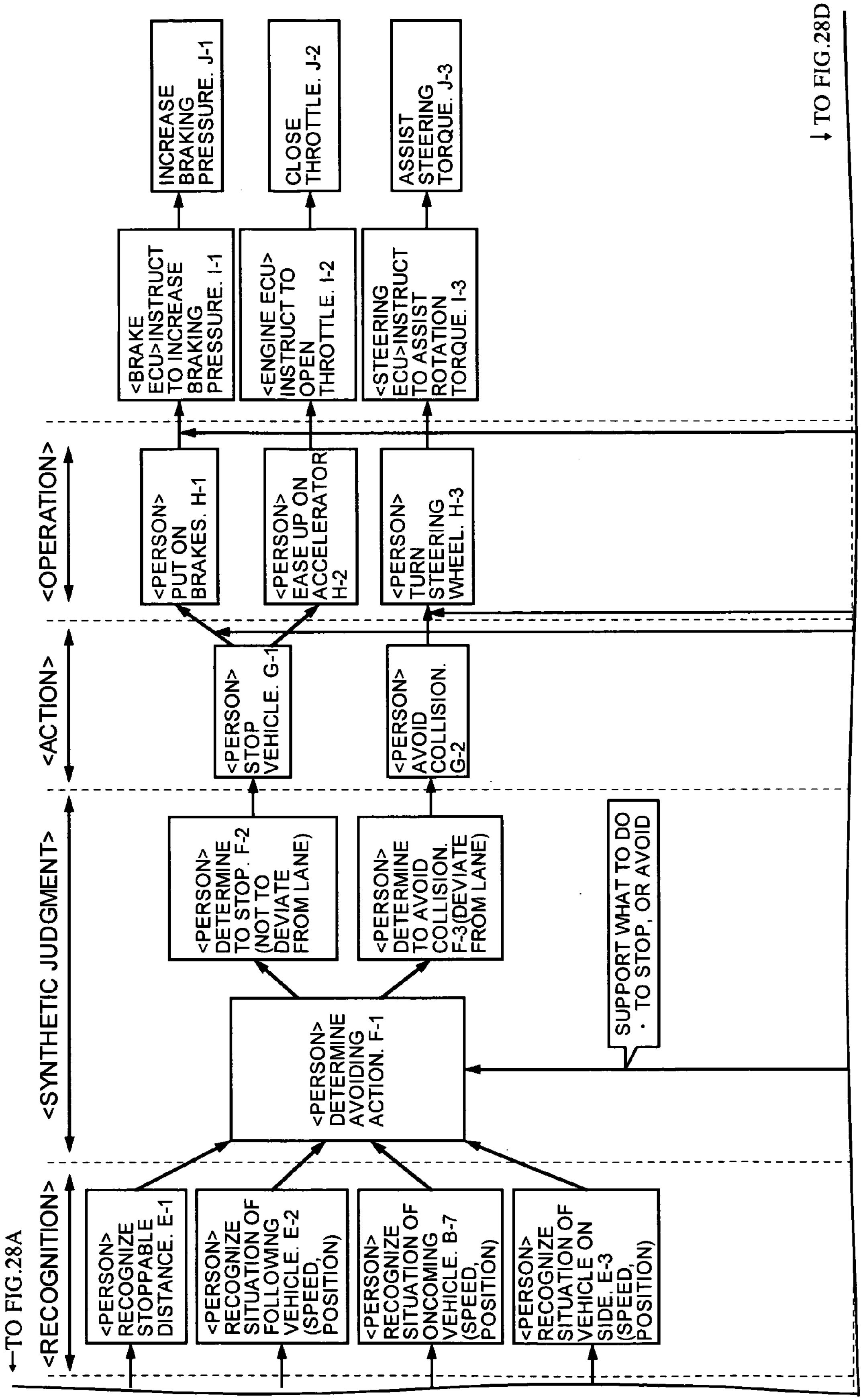
Figure 28D:
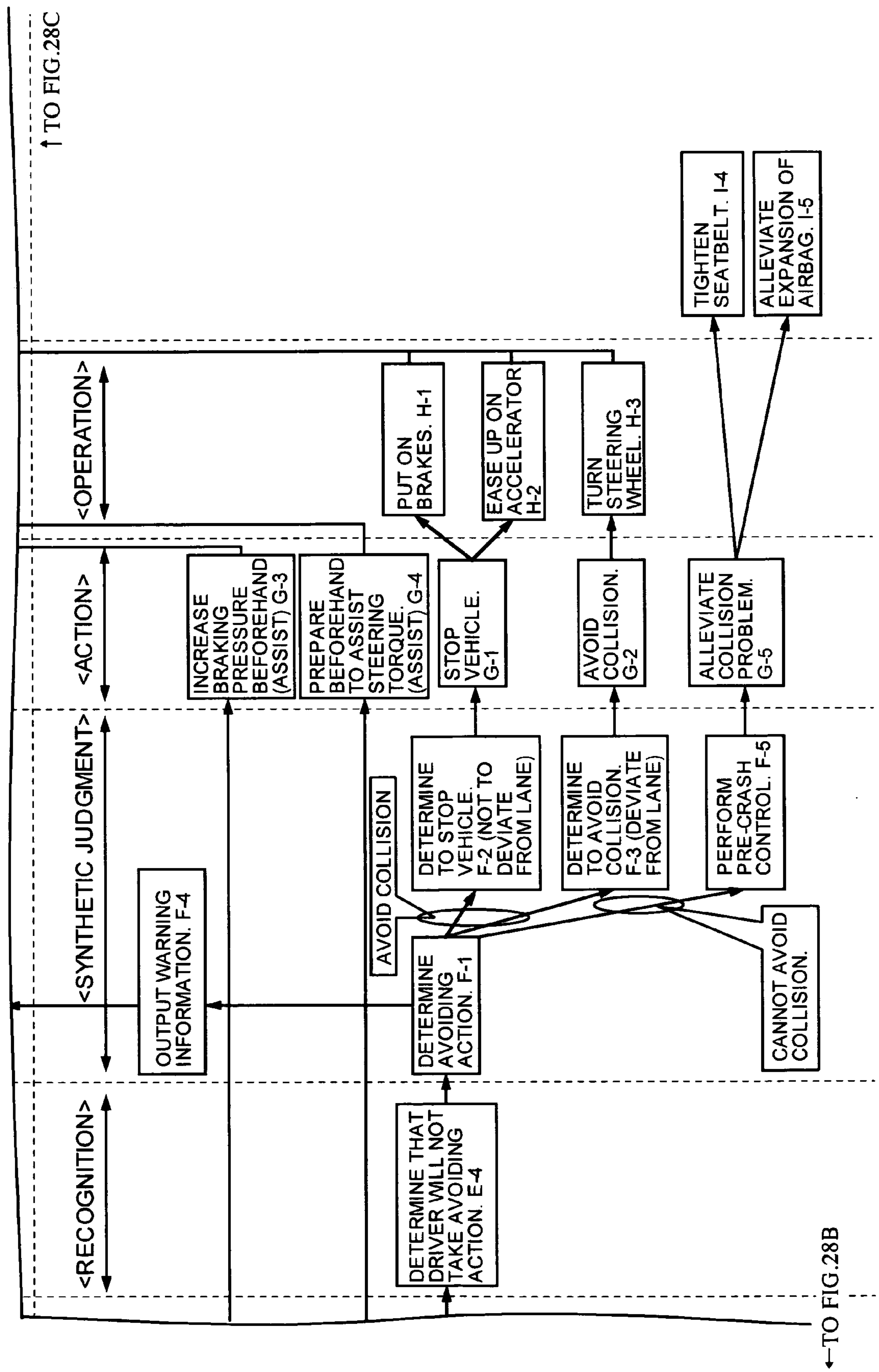

Specific actions for preventing unexpected deviation from the lane occurring due to avoiding an obstacle or the like will be explained below with reference to FIG. 27 and FIG. 28. FIG. 27 is a schematic for illustrating an example of a situation when deviating from a lane unexpectedly. FIG. 28A to FIG. 28D are schematics for explaining specific examples of perception, recognition, judgment, action, and operation when deviating from a lane unexpectedly.

As shown in FIG. 27, a person on bicycle 111 is traveling ahead of the own vehicle 101, and a fallen object 112 exists ahead of the vehicle 111. At the back of the own vehicle 101, a following vehicle 102 is traveling, and an oncoming vehicle 103 is traveling in the opposite lane. Under such a situation, the own vehicle 202 may drop the speed or deviate from the lane, to avoid the bicycle 111 and the fallen object 112. At this time, as to which, dropping the speed or deviating from the lane, is a more appropriate avoiding action varies according to the position and speed of the following vehicle 102 and the oncoming vehicle 103.

In the vehicle control apparatus according to the present invention, as shown in FIG. 28, various kinds of information are acquired to specify the situation, to execute appropriate operation. The processing procedure in the upper part in FIG. 28 indicates the contents and flow of perception, recognition, judgment, action, and operation to be essentially performed by the driver, and the processing procedure in the lower part indicates the contents and flow of perception, recognition, judgment, action, and operation to be realized by the vehicle control apparatus.

That is, in the operation by the driver, at first, when the driver recognizes the road situation, a fallen object and pedestrians, recognizes the respective conditions, presumes a possible situation, and judges it is dangerous, the driver then perceives the existence of the following vehicle, the oncoming vehicle, and the vehicle on side, and recognizes the conditions thereof, to avoid these or stop the vehicle.

On the other hand, on the vehicle control apparatus side, the driver's condition is perceived and recognized, in addition to the information of the oncoming vehicle, the road situation, the fallen object, pedestrians, the following vehicle, and the vehicles on sides, and adds the driving histories of the other party and the driver of the own vehicle and the previous accidents, to perform circumstantial judgment. As a result of this circumstantial judgment, if it is determined to be dangerous, the vehicle control apparatus warns the driver of the danger, and assists the avoiding action by the driver. Further, when it is recognized that the avoiding action by the driver will be too late for avoiding the danger, the vehicle control apparatus determines the necessary avoiding action, and takes a compulsive avoiding action together with warning.

The assistance to the avoiding action of the driver specifically means increasing the braking pressure beforehand, thereby improving the braking force of the brake, or improving the operation speed of the steering wheel by increasing the rotating torque of the steering wheel beforehand. The compulsive avoiding action means increasing the braking pressure and releasing the accelerator to stop the own vehicle, or changing the traveling direction of the own vehicle by steering the vehicle.

Further, when it is determined that collision cannot be avoided, the vehicle control apparatus performs pre-crash control. The pre-crash control means, specifically, tightening the seatbelt or preparation for expansion of the airbag, to alleviate the impact by the collision.

Figure 29:
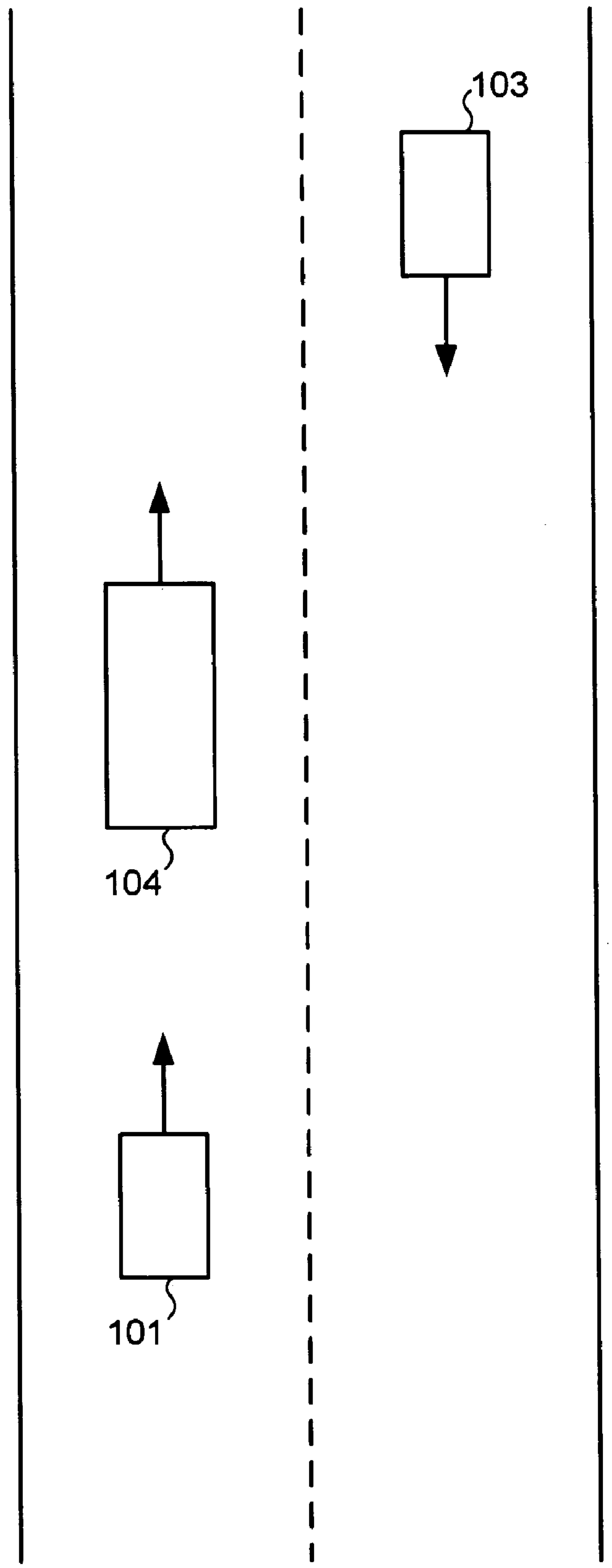
FIG. 29 is a schematic for illustrating an example of a situation when deviating from a lane intentionally.
Figure 30A:
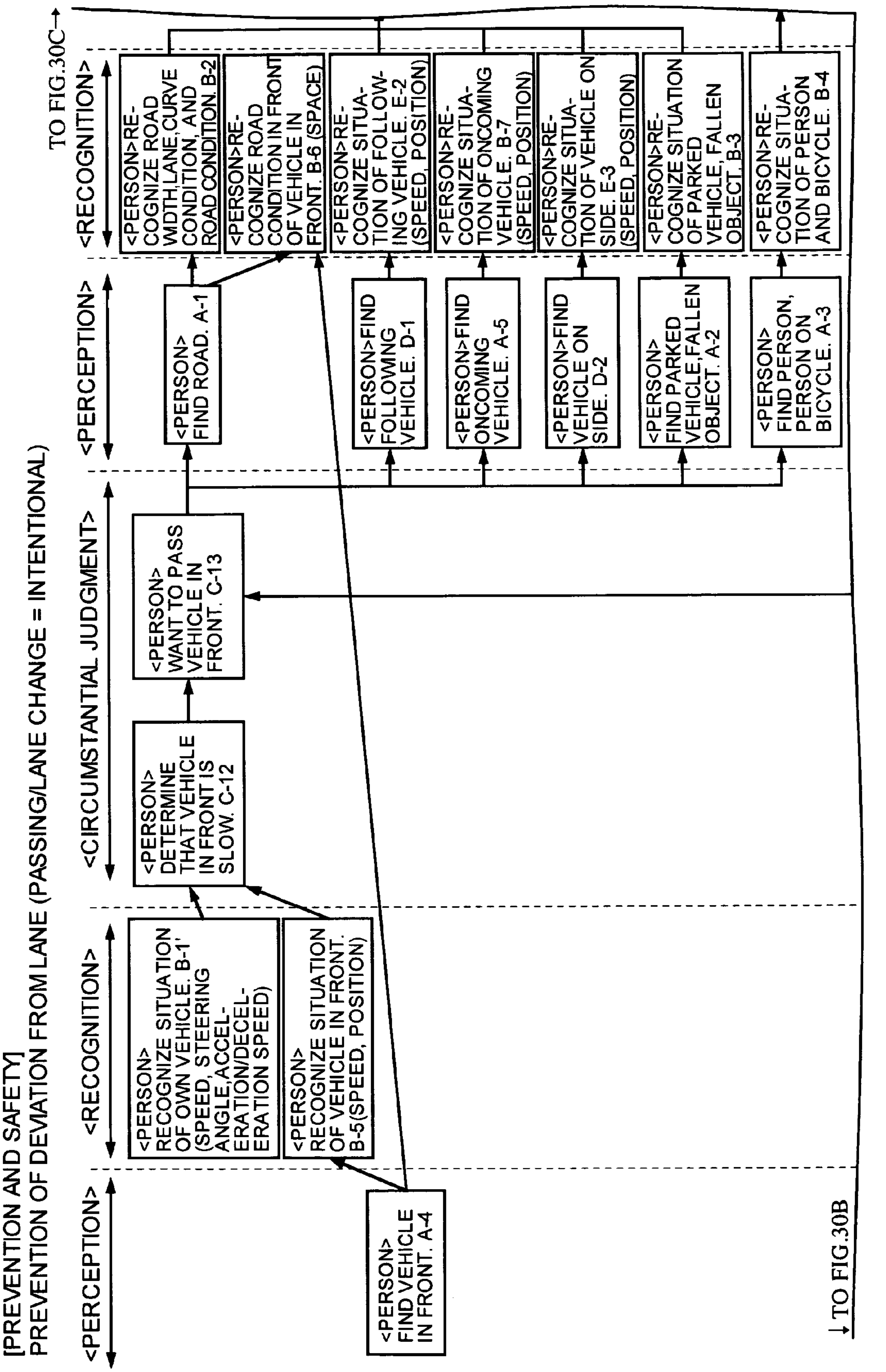
FIG. 30A to FIG. 30D are schematics for explaining specific examples of perception, recognition, judgment, action, and operation when deviating from a lane intentionally.
Figure 30B:
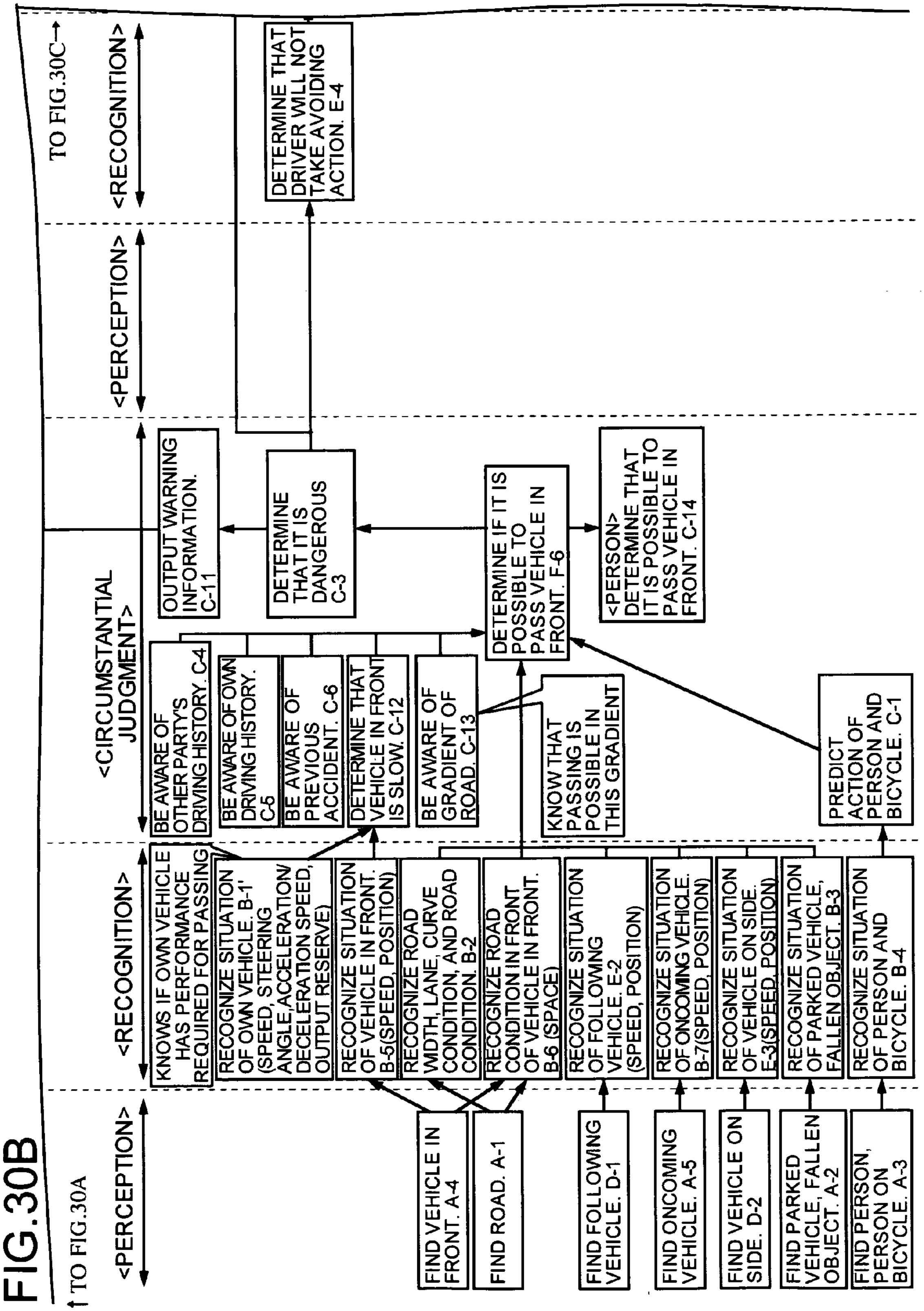
Figure 30C:
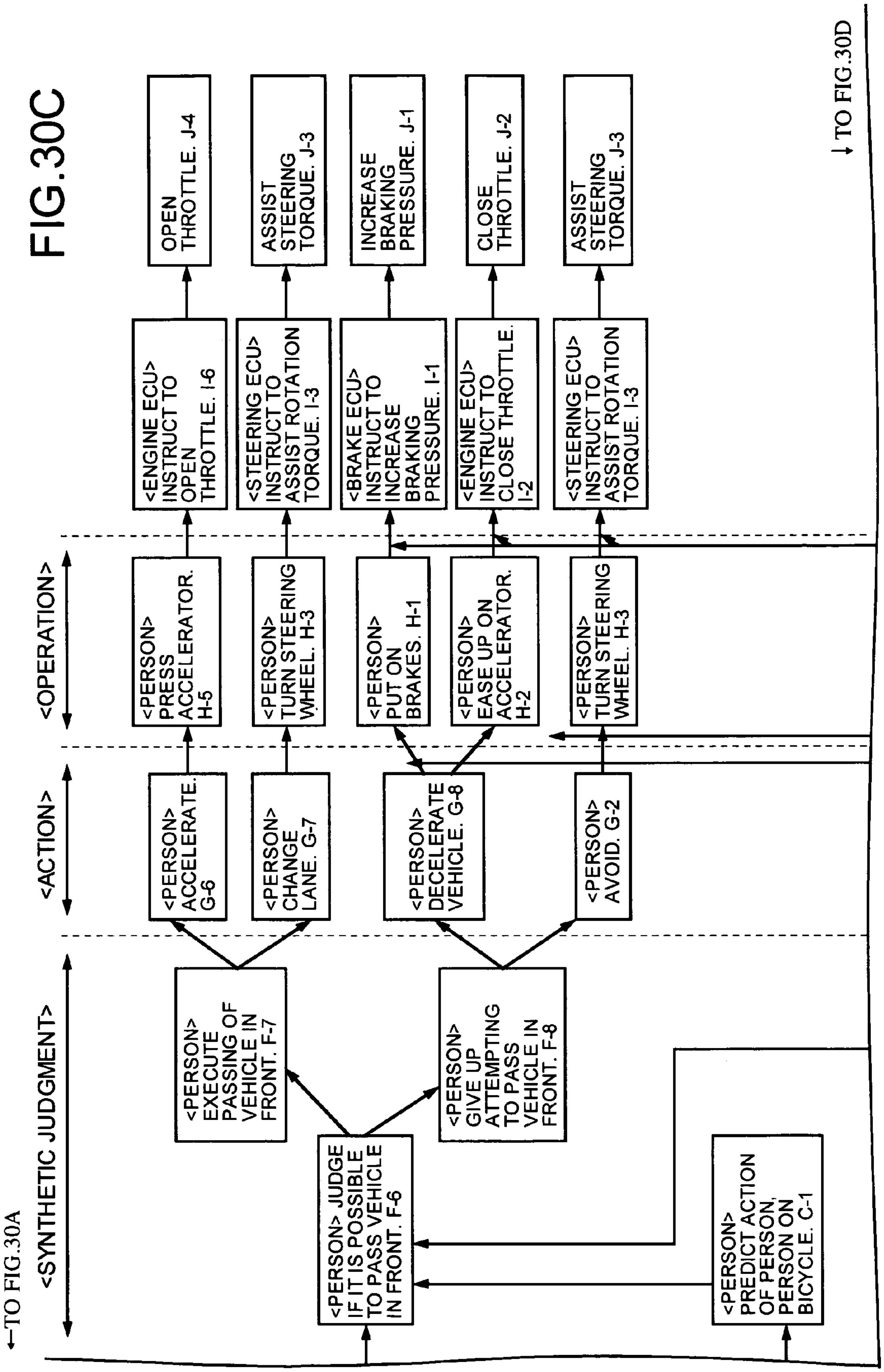
Figure 30D:
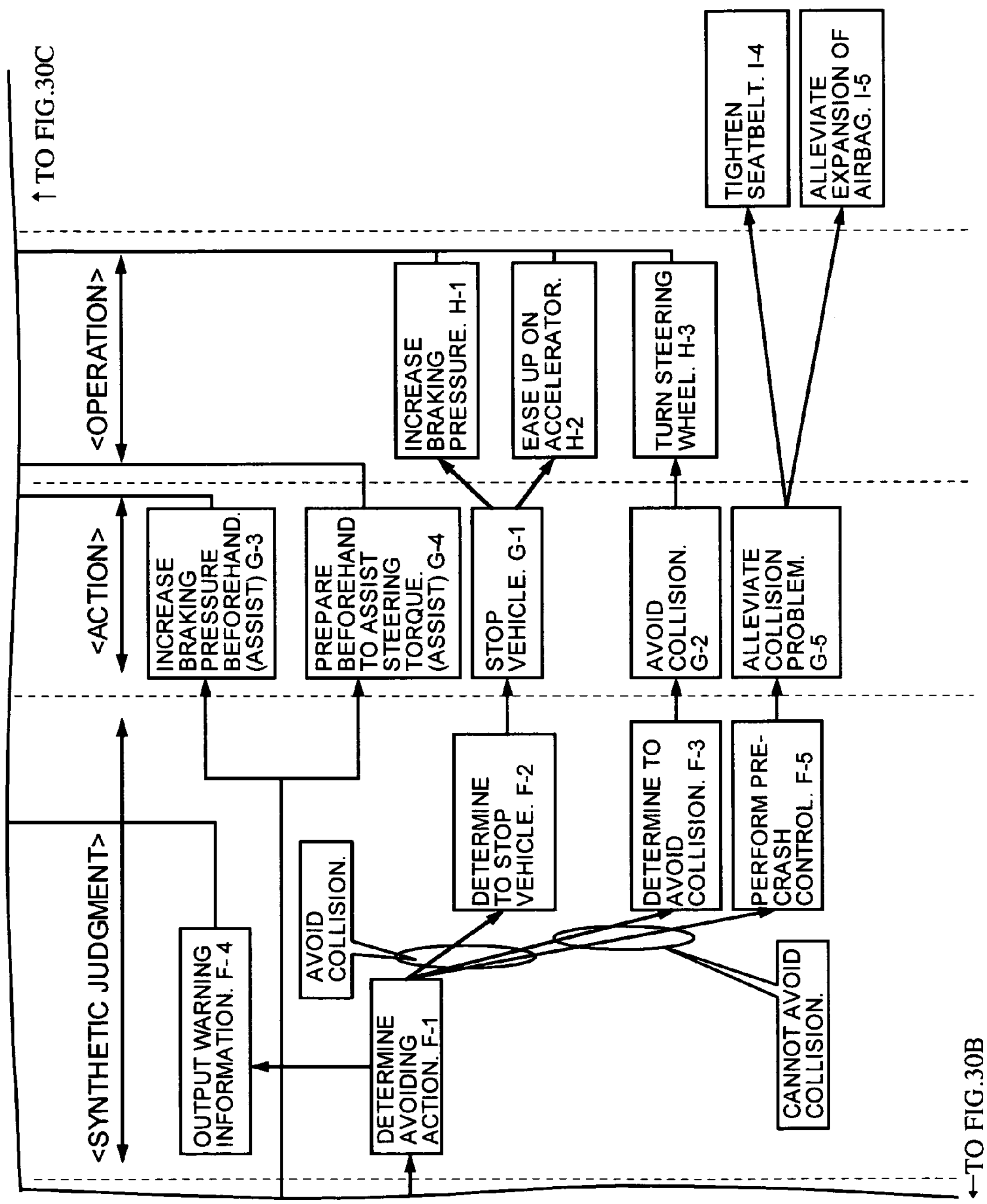

Specific actions for accident prevention and safety at the time of intentional deviation from the lane, such as passing or changing the lane, will be explained with reference to FIG. 29 and FIG. 30. FIG. 29 is a schematic for illustrating an example of a situation when deviating from a lane intentionally; and FIG. 30A to FIG. 30D are schematics for explaining specific examples of perception, recognition, judgment, action, and operation when deviating from a lane intentionally.

As shown in FIG. 29, a vehicle 104 ahead is traveling ahead of the own vehicle 101. An oncoming vehicle 103 is traveling in the opposite lane. Under such a situation, the driver of the own vehicle 101 may deviate from the lane to pass the vehicle 104 ahead. To support deviation from the lane based on the intention of the driver on the vehicle control apparatus side, to prevent an accident beforehand, it is important to perceive the intention of the driver, provide information that the driver fails to grasp and information that cannot be obtained by the driver, and to determine whether passing is possible.

When accident prevention and safety processing is to be performed at the time of deviating from the lane according to the intention of the driver, perception, recognition, judgment, action, and operation as shown in FIG. 30 are performed. The processing procedure in the upper part in FIG. 30 indicates the contents and flow of perception, recognition, judgment, action, and operation to be essentially performed by the driver, and the processing procedure in the lower part indicates the contents and flow of perception, recognition, judgment, action, and operation on the vehicle control apparatus side.

That is, in the operation by the driver, at first, when the driver perceives and recognizes the vehicle ahead, the speed of the vehicle ahead is slow, and the driver considers to pass the vehicle ahead, the driver confirms the road situation, the following vehicle, the oncoming vehicle, the vehicle on side, the fallen object, and the pedestrian, to judge if passing is possible, and executes or stops passing.

On the other hand, the vehicle control apparatus perceives and recognizes the situation of the own vehicle, in addition to the information of the vehicle ahead, the road situation, the following vehicle, the oncoming vehicle, the vehicle on side, the fallen object, and the pedestrian, and adds the driving histories of the other party and the driver of the own vehicle and the previous accidents, to determine if passing is possible. Significant situation of the own vehicle at the time of passing includes the speed, steering angle, acceleration and deceleration speed, and reserve of output of the vehicle. For determination of the driver's intention, that is, whether the driver considers passing, it is effective to obtain the status of the indicator.

As a result of determination by the vehicle control apparatus, if the vehicle control apparatus determines that passing is dangerous, the vehicle control apparatus warns the driver of the danger and assists the avoiding action by the driver. Further, if the vehicle control apparatus recognizes that the avoiding action by the driver will be too late for avoiding the danger, the vehicle control apparatus determines the necessary avoiding action, and takes a compulsive avoiding action, together with warning. When determining that collision cannot be avoided, the vehicle control apparatus performs pre-crash control.

Figure 31:
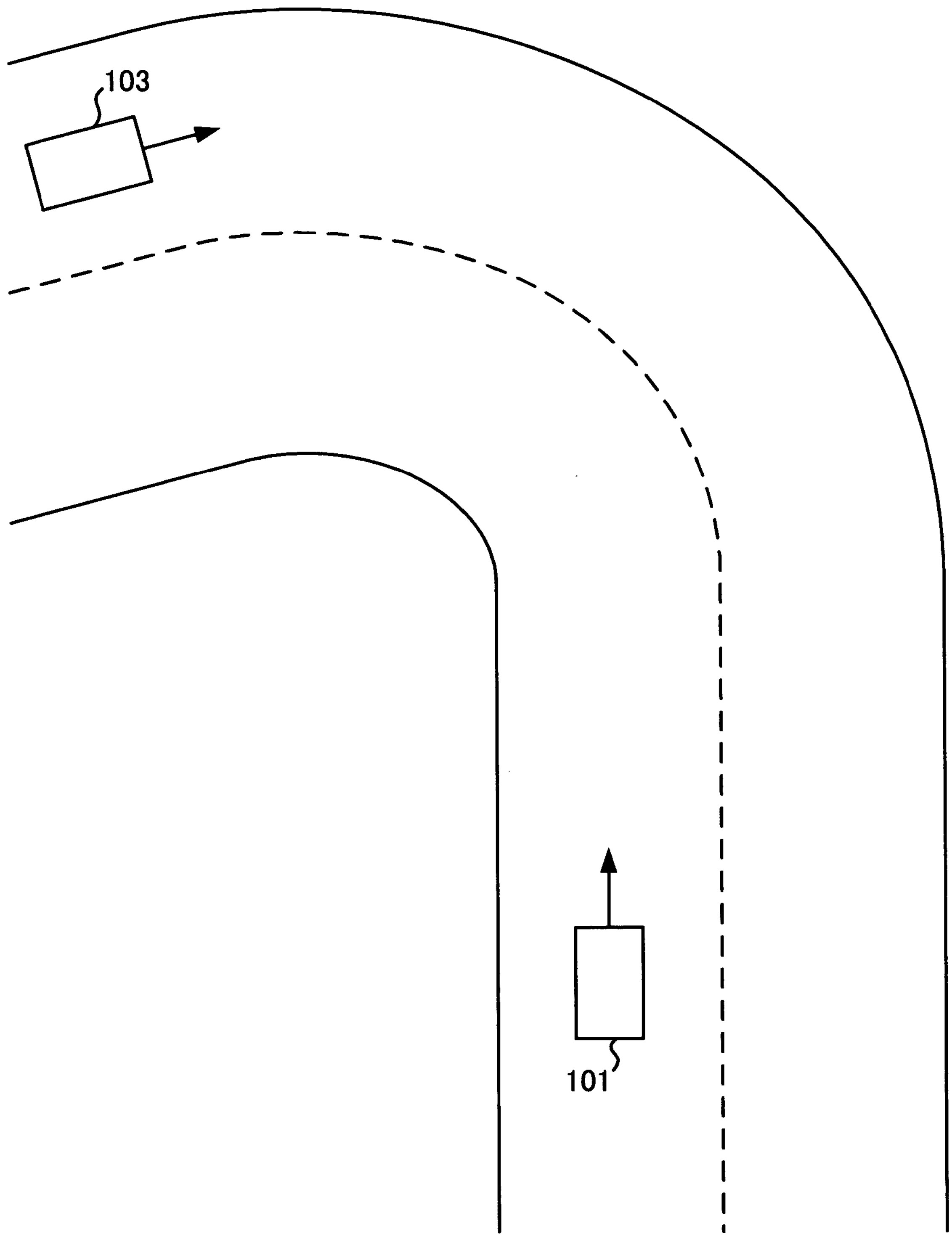
FIG. 31 is a schematic for illustrating an example of a situation when deviating from a lane due to an excessive speed.
Figure 32A:
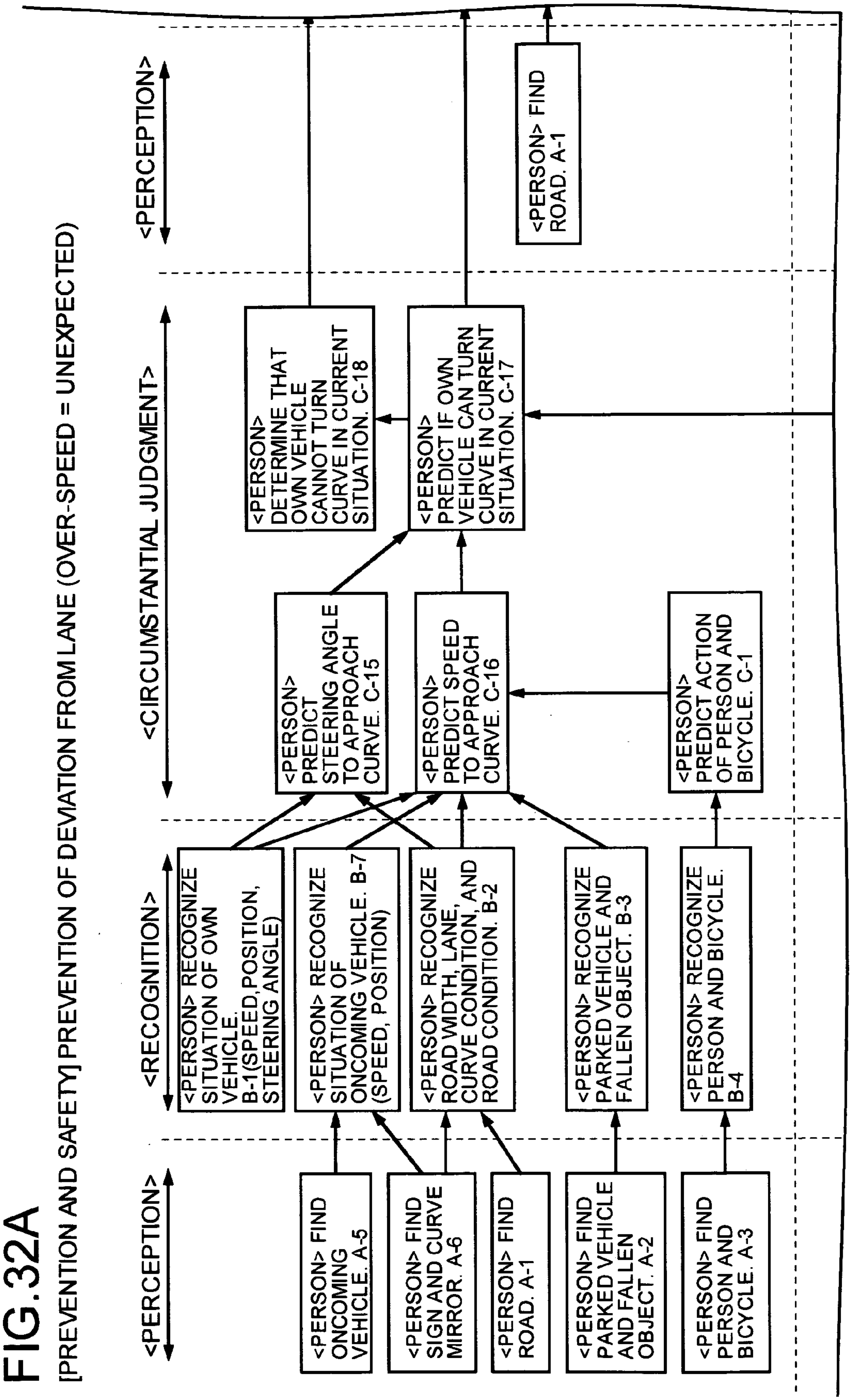
FIG. 32A to FIG. 32D are schematics for explaining specific examples of perception, recognition, judgment, action, and operation when deviating from a lane due to an excessive speed.
Figure 32B:
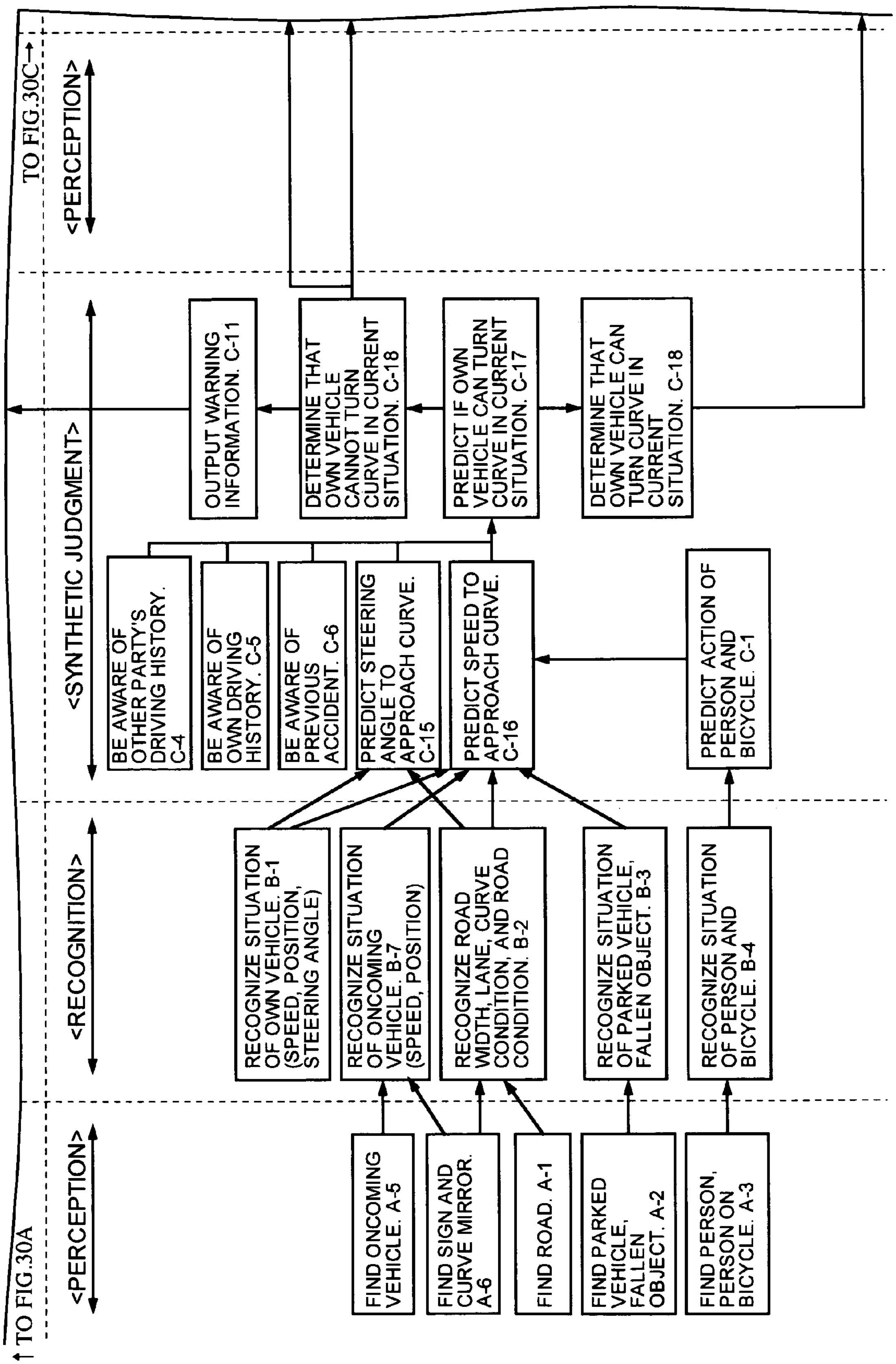
Figure 32C:
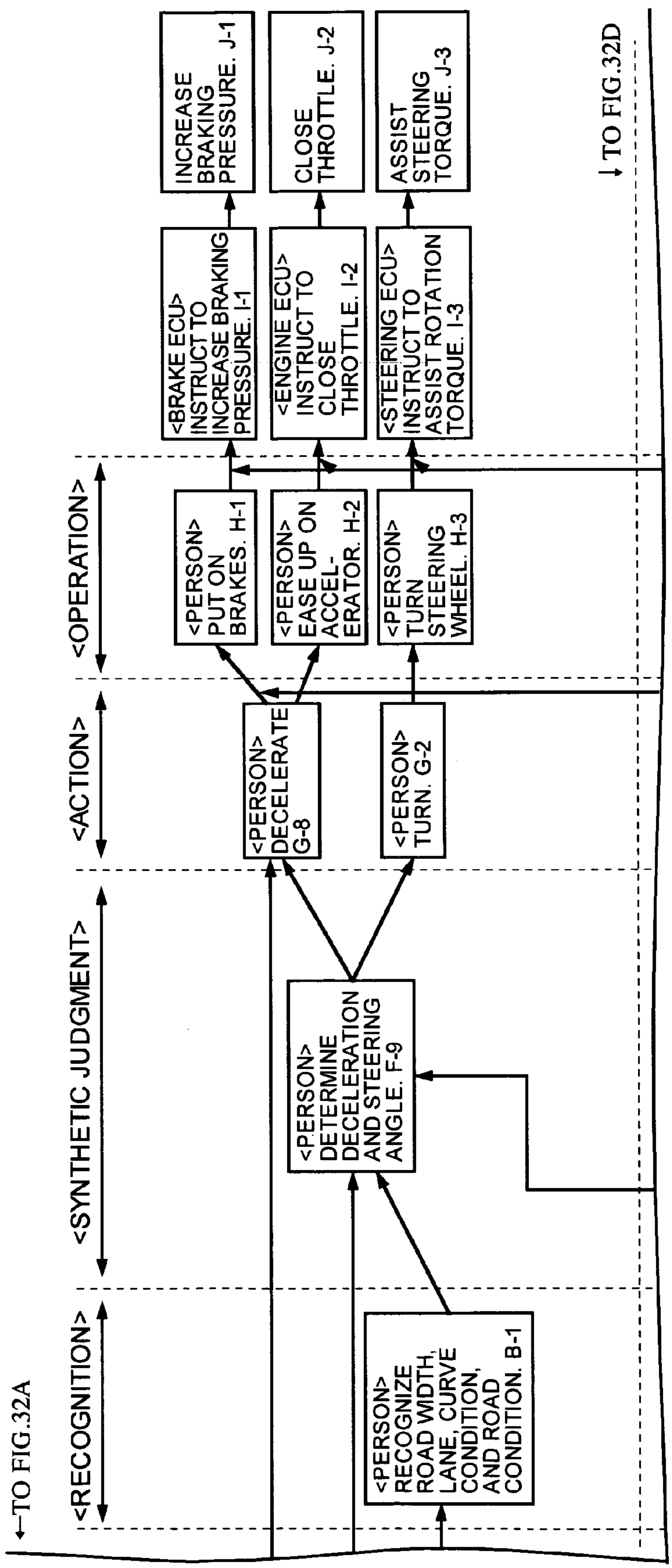
Figure 32D:
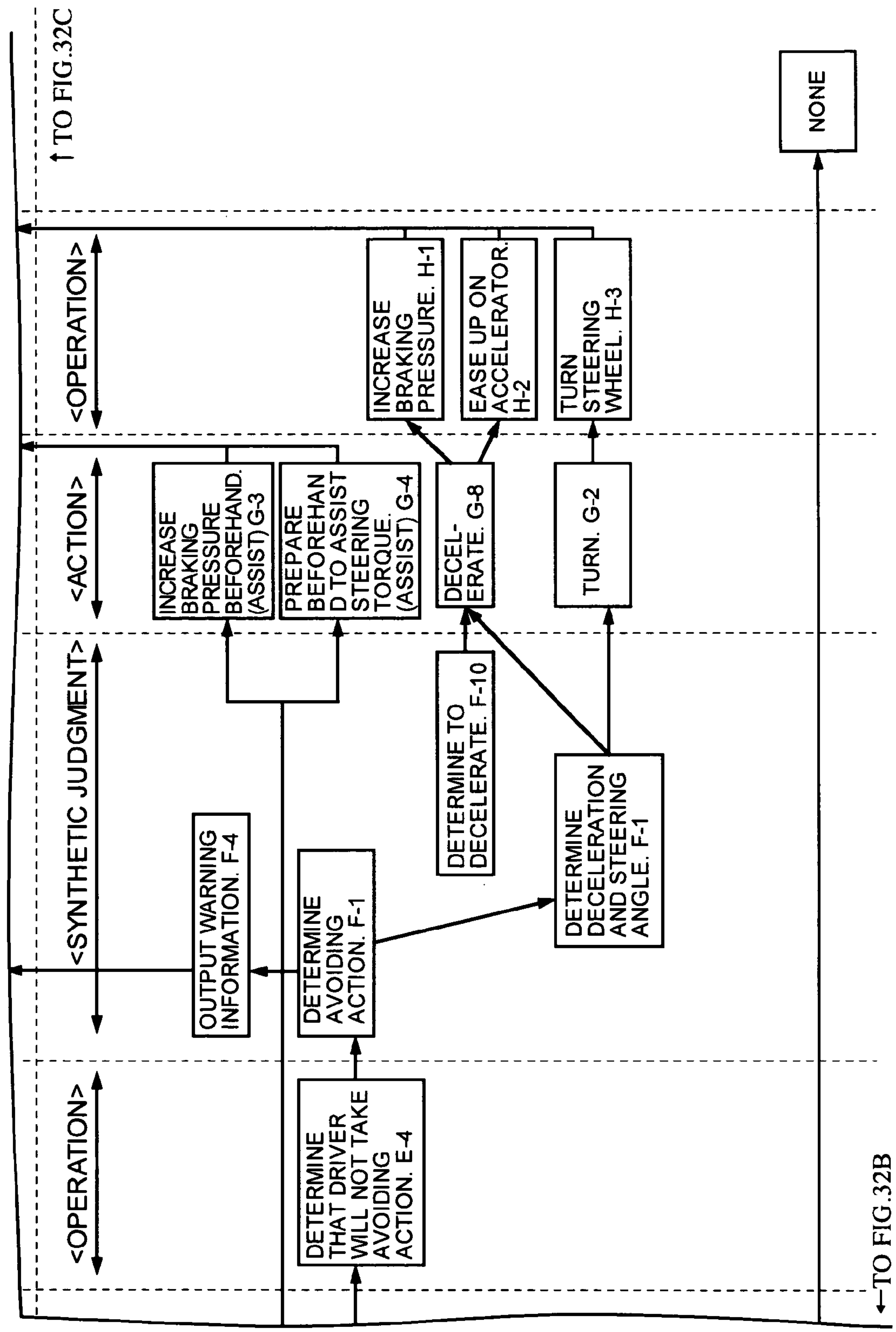

Specific actions for accident prevention and safety at the time of intentional deviation from the lane due to an excessive speed at the time of curving will be explained, with reference to FIG. 31 and FIG. 32. FIG. 31 is a schematic for illustrating an example of a situation when deviating from a lane due to an excessive speed. FIG. 32A to FIG. 32A are schematics for explaining specific examples of perception, recognition, judgment, action, and operation when deviating from a lane due to an excessive speed.

As shown in FIG. 31, the own vehicle 101 is traveling on a blind curve, and an oncoming vehicle 103 is traveling in the opposite lane. Under such a situation, if the speed of the own vehicle is too high, there is a possibility that the own vehicle deviates from the lane toward the opposite lane, to cause collision with the oncoming vehicle 103. Therefore, the vehicle control apparatus obtains the angle of the curve, the speed of the own vehicle, and the presence of an oncoming vehicle as information, and performs driving control so that the own vehicle travels without deviating from the lane.

The processing procedure in the upper part in FIG. 32 indicates the contents and flow of perception, recognition, judgment, action, and operation to be essentially performed by the driver, and the processing procedure in the lower part indicates the contents and flow of perception, recognition, judgment, action, and operation on the vehicle control apparatus side.

That is, in the operation by the driver, at first, the driver perceives and recognizes an oncoming vehicle, a sign, a curve mirror, the road situation, a fallen object, and a pedestrian, and estimates and judges the approaching steering angle and the approaching speed to the curve, to operate the steering wheel, the accelerator, and the brake.

On the other hand, the vehicle control apparatus perceives and recognizes the situation of the own vehicle, in addition to the information of the oncoming vehicle, the sign, the curve mirror, the road situation, the fallen object, and the pedestrian, and adds the driving histories of the other party and the driver of the own vehicle and the previous accidents, to determine if the own vehicle can curve without deviating from the lane. If the vehicle control apparatus determines that the own vehicle cannot curve, the vehicle control apparatus warns the driver of the danger, and assists the avoiding action by the driver. Further, if the vehicle control apparatus recognizes that the avoiding action by the driver will be too late for avoiding the danger, the vehicle control apparatus determines the necessary avoiding action, and takes a compulsive avoiding action, together with warning.

Assisting the avoiding action by the driver is not always limited to the driver of the own vehicle, and the vehicle control apparatus may warn the driver of the following vehicle by lighting a brake lamp, or warn the driver of the vehicle ahead by sounding a horn, using the high beam, or signaling.

Thus, in the embodiment, not only the situation at the intersection but also the situation relating to deviation from the lane at the time of traveling are determined, and appropriate perception, recognition, judgment, action, and operation can be performed instead of the driver.

One example of a specific method for danger determination, vehicle control, and avoidance simulation will be explained below. The controller 12 uses various kinds of information acquired by the information acquiring unit 12*a*, to set a danger area, a caution area, and a precaution area on the map, based on the positions, the moving directions, and the moving speeds of vehicles, bicycles, and pedestrians.

For example, even when pedestrians are advancing in a certain direction at a predetermined speed, they have a possibility of taking actions, such as increasing the speed, stopping, or rushing out to the right or left. Therefore, the danger area, the caution area, and the precaution area are set within a range based on an action that the pedestrian may take. In the case of bicycle, since the speed in the advancing direction is larger than that of the pedestrian, it is necessary to set the danger area, the caution area, and the precaution area wider in the advancing direction, as compared with the pedestrian. However, in the case of bicycles, the danger area, the caution area, and the precaution area in the right and left direction are set, assuming a case of turning sideways, not rushing out. Further, in the case of a traveling vehicle, it is necessary to set the danger area, the caution area, and the precaution area sufficiently wide in the advancing direction. These areas will change according to the condition of the own vehicle. For example, at the time of passing (detected by the information of the road and the direction indicator), the danger area, the caution area, and the precaution area on the right side of the vehicle become wider (which are also changed by the influence of speed and the like), and become narrower on the left side thereof.

Thus, the danger area, the caution area, and the precaution area are set from the obtained various kinds of information, and developed on the map and distinguished by color, thereby enabling easy and accurate danger determination, vehicle control, and avoidance simulation for the own vehicle.

For example, relating to danger determination, it can be determined to be "dangerous", when the own vehicle advances as it is, the own vehicle will approach the danger area. Relating to vehicle control, the vehicle can be safely controlled by avoiding the danger area, the caution area, and the precaution area. In the case of avoidance simulation, by simulating so as to avoid the danger area, the caution area, and the precaution area as much as possible, the most suitable avoiding method can be easily simulated.

Figure 33:
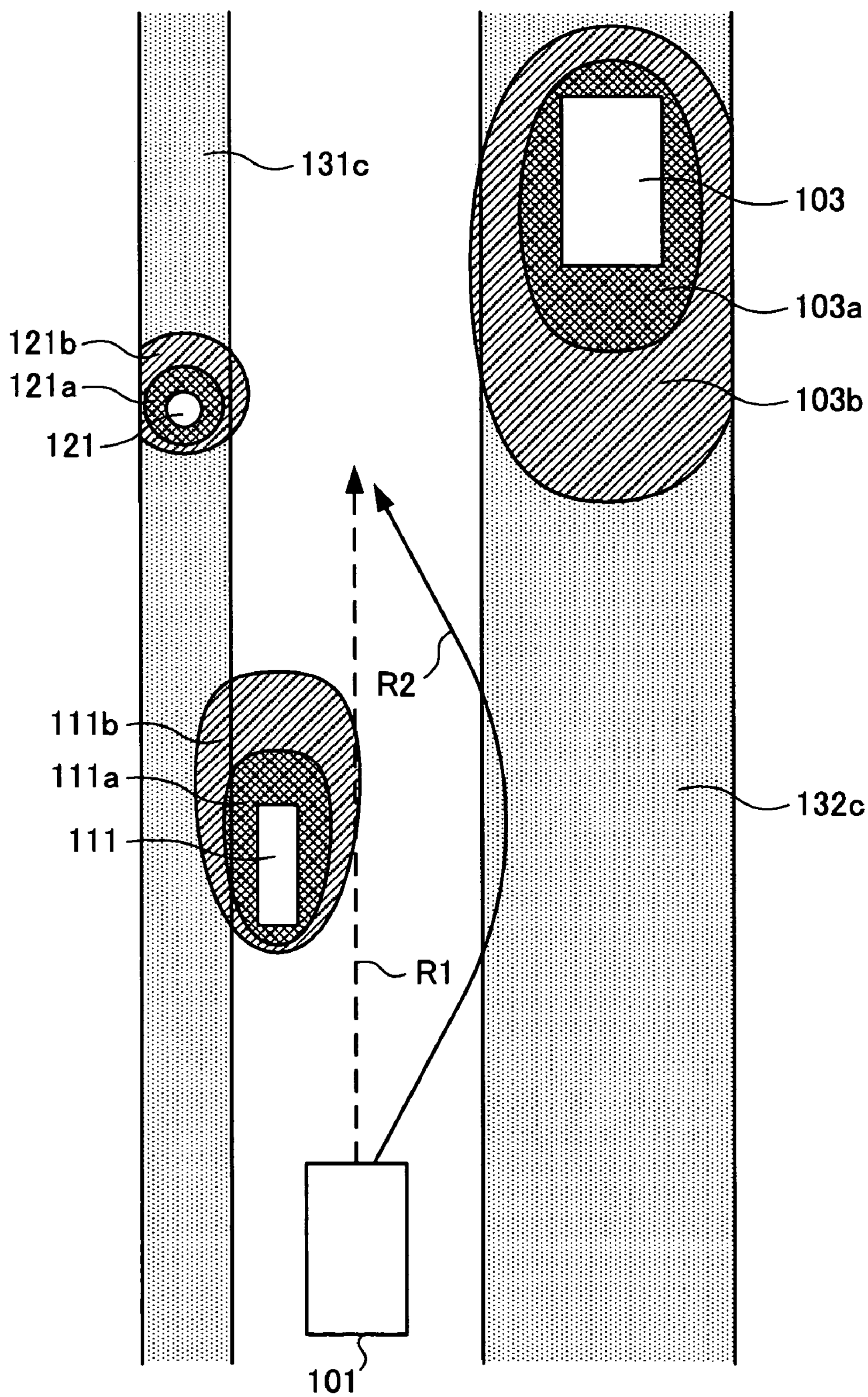
FIG. 33 is a schematic for illustrating a specific example of danger zone diagram.

FIG. 33 is a schematic for illustrating a specific example of danger zone diagram in which the danger area, the caution area, and the precaution area are developed on the map, and distinguished by color. A bicycle 111 is traveling and a pedestrian 121 is walking, ahead of the own vehicle 101. An oncoming vehicle 103 is traveling in the opposite lane.

The vehicle control apparatus sets the danger area and the caution area, based on the kind, the condition, and the moving speed of the bicycle 111, the pedestrian 121, and the oncoming vehicle 103. Further, the vehicle control apparatus obtains map data indicating the road condition, to develop the danger area, the caution area, and the precaution area on the map data, to distinguish these by color. As the map data, an image taken by the spot camera, and the road map stored in the database may be combined and used.

The space other than the driving lane of the own vehicle is set to be the precaution area. Specifically, precaution areas 131*c* and 132*c* are set on the footpath and in the opposite lane. Further, a danger area 111*a* and a caution area 111*b* are set with respect to the bicycle 111, and a danger area 121*a* and a caution area 121*b* are set with respect to the pedestrian 121. Similarly, a danger area 103*a* and a caution area 103*b* are set with respect to the oncoming vehicle 103.

The danger areas 111*a*, 121*a*, and 103*a* here are areas in which approach should be avoided, the caution area 111*b*, 121*b*, and 103*b* are areas in which it is preferred to avoid approach, and the precaution areas 131*c* and 132*c* are areas in which it is preferred to avoid approach, though not so much as in the caution areas.

The vehicle control apparatus performs danger determination, vehicle control, and avoidance simulation based on the danger zone diagram. In other words, in the danger determination, it is determined whether the own vehicle goes into any of the danger area, the caution area, and the precaution area, when the own vehicle advances as it is, thereby enabling determination of the presence of danger and the degree thereof. In the vehicle control, the vehicle is controlled so as to avoid the danger area, the caution area, and the precaution area, and in the avoidance simulation, simulation is performed so as to avoid the danger area, the caution area, and the precaution area, as much as possible.

Avoidance of approach to the danger area is given priority to avoidance of approach to the caution and precaution areas, and avoidance of approach to the caution area is given priority to avoidance of approach to the precaution area. That is, it is determined that approach to an area having a lower danger level is appropriate, to avoid approach to an area having a higher danger level. Therefore, most appropriate control operation and avoiding action are simply obtained according to the danger level, to expect safe driving, and the damage can be suppressed to the minimum.

Specifically, if the own vehicle 101 travels as it is along a route R1, the own vehicle will approach the caution area 111*b*. Therefore, the vehicle control apparatus calculates a route R2, to avoid the caution area 111*b*. With this route R2, the own vehicle 101 will approach the precaution area 132*c*, but avoidance of approach to the caution area 111*b* is given priority to avoidance of approach to the precaution area 132*c*.

Thus, by using the danger zone diagram in which the danger area, the caution area, and the precaution area are set corresponding to the danger level is used, to easily obtain the most appropriate control operation and avoiding action, to expect safe driving, and the damage can be suppressed to the minimum.

The three areas of the danger area, the caution area, and the precaution area are used to create the danger zone diagram, but more precise danger zone diagram may be created by setting more areas.

Figure 34:
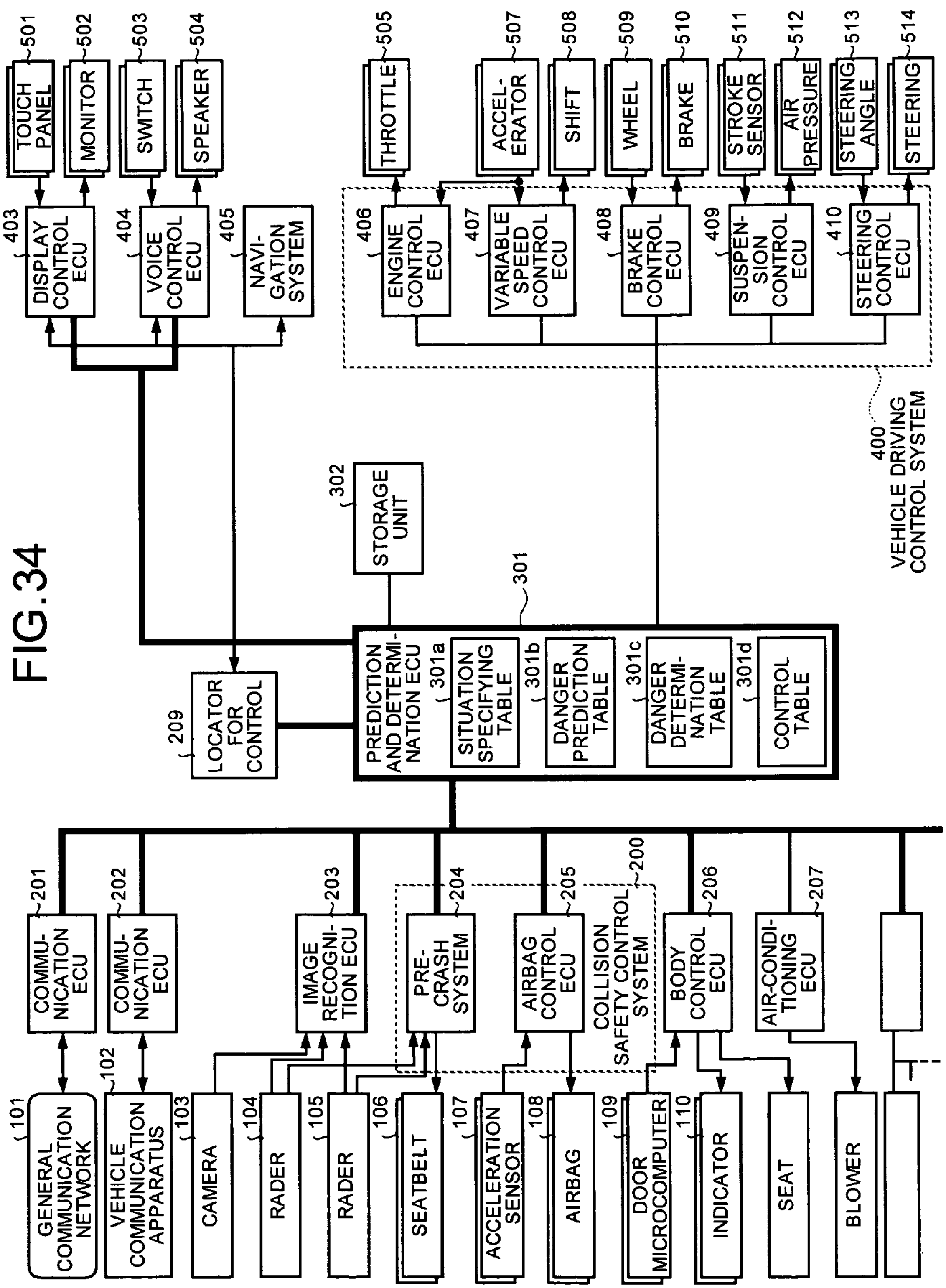
FIG. 34 is a block diagram of a vehicle control apparatus according to a first example of the embodiment.

As a first specific example of the vehicle control apparatus according to the embodiment, a specific example in which various tables are used to perform predictive determination will be explained. FIG. 34 is a block diagram of a vehicle control apparatus according to a first example of the embodiment.

In the vehicle control apparatus according to the first example, various kinds of equipment such as a communication electrical control unit (ECU) 201, a communication ECU 202, an image recognition ECU 203, a collision safety control system 200 (a pre-crash system 204, an airbag control ECU 205), a body control ECU 206, an air-conditioning ECU 207, a locator for control 209, a display control ECU 403, a voice control ECU 404, a vehicle driving control system 400 (an engine control ECU 406, a variable speed control ECU 407, a brake control ECU 408, and a suspension control ECU 409, and a steering control ECU 410), and a storage unit 302 are connected to one another, centering on a prediction and determination ECU 301.

Among these, the communication ECU 201 is connected to a general communication network 101 using W-CDMA and CDMA 2000, 802.11b, to obtain various kinds of information utilizable for control of the vehicle (for example, information of the driving history of an other party who has the possibility of collision at the time of approaching the intersection, previous accidents previously occurred in the approaching intersection, weather, and time), from an external apparatus to be communicated therewith (for example, a history managing center controlling various kinds of information relating to the traffic, and an information dispatching server apparatus arranged at each intersection). The obtained information is stored in the storage unit 302.

The communication ECU 202 is connected to the vehicle communication device 102 such as a short-distance radio communication (DSRC) for communicating with other vehicles or the road surface, to mainly obtain information of other vehicles or the road surface (for example, the type, the position, the traveling direction, and the speed of a vehicle approaching the intersection from a visually blocked direction) by communication between vehicles. The obtained information is stored in the storage unit 302.

The image recognition ECU 203 is connected to the camera 103 (a front camera, a side camera, a rear camera, and a camera in vehicle), and radars 104 and 105 (the radar 104 is for medium and long distance and the radar 105 is for short distance), to subject the image information perceived by these, of the road, obstacles (a vehicle ahead, a vehicle on side, a following vehicle, an oncoming vehicle, a motorbike, a bicycle, a pedestrian, and a fallen object), and the driver of the own vehicle, to image recognition processing, to obtain the information, such as the shape of the road (intersection, curve, two-lane road, etc.), the condition of the road (furrow, undulations, frozen, etc.), the presence and color of the traffic lights, the presence and content of the sign (stop, speed limit, etc.), the position, speed, acceleration degree, traveling direction, type, size, and driver information (line of sight, direction of the face, driving history, etc.) of the obstacle, the distance from the own vehicle, the number of blinks, the line of sight, the direction of the face, and the head position of the driver of the own vehicle. The obtained information is stored in the storage unit 302. The image recognition ECU 203 also has a function of outputting a signal instructing distance control between the vehicle ahead and the own vehicle, based on the result of the image recognition processing.

The pre-crash system 204 is connected to the radars 104 and 105, which receive radio wave reflected from obstacles near the vehicle, to obtain the relative distance between the obstacle and the own vehicle, and the speed of the obstacle from the reflected radio wave (the obtained information is stored in the storage unit 302), and control tightening of the seatbelt 106 based on the relative distance and the speed. The airbag control ECU 205 is connected to an accelerator sensor 107 that detects the acceleration degree, to obtain the impact information of the own vehicle, and control the operation of the airbag 108 based on the impact information.

The body control ECU 206 is connected to a door microcomputer 109, and an indicator 110, to obtain the condition of various kinds of equipment, such as lights and indicators 110 arranged on the door and the body, and control the indicator 110, seats, doors, door locks, windows, and lighting systems. The air-conditioning ECU 207 is connected to a blower or the like, to control air conditioning in the vehicle.

The locator for control 209 is connected to a navigation system 405, the display control ECU 403, and the voice control ECU 404, to recognize and obtain the shape of the road (intersection, curve, two-lane road, etc.), the presence and color of the traffic lights, the presence and content of the sign (stop, speed limit, etc.), the distance from the own vehicle to the intersection, and the distance between the obstacle and the own vehicle. The obtained information is stored in the storage unit 302.

The display control ECU 403 is connected to a touch panel 501 and a monitor 502, to control various kinds of display vehicle equipment, such that a warning display is output, and the like. The voice control ECU 404 is connected to a switch 503 and a speaker 504, to control various kinds of voice output vehicle equipment, such that a warning sound is output, and the like.

The engine control ECU 406 is connected to a throttle 505 and an accelerator 507, to obtain opening of the throttle and opening of the accelerator (speed) of the own vehicle (the obtained information is stored in the storage unit 302), and control these. The variable speed control ECU 407 is connected to the accelerator 507 and a shift 508, to control these.

The brake control ECU 408 is connected to wheels 509 and a brake 510, to obtain the wheel speed (the speed of the own vehicle) and the braking pressure (braking power) (the obtained information is stored in the storage unit 302), and control these. The suspension control ECU 409 is connected to a stroke sensor 511 and the like, to obtain the suspension condition and control the air pressure 512. The steering control ECU 410 is connected to a steering angle sensor 513 and a steering 514, to obtain the steering angle and control the steering 514. The obtained information is stored in the storage unit 302.

Various kinds of information obtained by the perception and recognition processing by the respective processors is continuously stored in the storage unit 302. The storage unit 302 corresponds to the storage unit 11 in the vehicle control apparatus 10 shown in FIG. 1, and stores various kinds of information utilizable for control of the vehicle. Specifically, as shown in FIG. 35 illustrating the configuration example of information stored in the storage unit 302, the storage unit 302 stores various kinds of information utilizable for control of the vehicle (predictive determination, control, and the like), for each object such as the own vehicle, the driver, the road, obstacles (a vehicle ahead, a vehicle on side, a following vehicle, an oncoming vehicle, a motorbike, a bicycle, a pedestrian, and a fallen object), for example, the position, speed, acceleration degree, traveling direction, type, and size of the own vehicle.

The prediction and determination ECU 301 corresponds to the controller 12 in the vehicle control apparatus 10 shown in FIG. 1, and performs processing such as determination of situation, danger prediction, danger determination, and vehicle control by using various tables and various kinds of information stored in the storage unit 302. The processing will be explained below specifically.

The prediction and determination ECU 301 refers to various kinds of information stored in the storage unit 302, to determine whether the situation satisfies the specified condition stored in a situation specifying table 301*a* shown in FIG. 36, thereby specifying the situation that the own vehicle is confronting. That is, for example, if various kinds of information such as "the shape of the road (intersection), the presence of traffic lights (none), and the traveling direction of the own vehicle (straight ahead)", and various kinds of information such as "the position of the own vehicle (at an intersection without traffic lights), and the traveling direction of the own vehicle (straight ahead)" are actually stored in the storage unit 302, the prediction and determination ECU 301 determines that it is a situation of approaching an intersection without traffic lights, and more specifically, it is a situation to execute "prevention of head-to-head collision with an obstacle ahead (a vehicle ahead)", or "prevention of head-to-head collision with an invisible vehicle".

Further, the prediction and determination ECU 301 refers to various kinds of information stored in the storage unit 302, to determine whether the situation satisfies the prediction condition stored in a danger prediction table 301*b* shown in FIG. 37, to predict whether the own vehicle is confronting the danger. That is, for example, when the situation is specified as a situation to execute "prevention of head-to-head collision with an obstacle ahead (a vehicle ahead)", the danger such as "a collision with the obstacle ahead (vehicle ahead)" or "oversight or delay in detection of the driver" is predicted. If various kinds of information such as "the distance between the vehicle ahead and the own vehicle (5 meters or less)", or "the distance between the vehicle ahead and the own vehicle (10 meters or less), the speed of the own vehicle (50 km/h or above), and the speed of the vehicle ahead (40 km/h or less)" are stored in the storage unit 302, the danger is predicted such that "there is the possibility of collision with the obstacle ahead (the vehicle ahead)".

The prediction and determination ECU 301 refers to various kinds of information stored in the storage unit 302, to determine whether the situation satisfies the determination condition stored in a danger determination table 301*c* shown in FIG. 38, and determine the danger (the danger level, the danger direction, and the danger area) predicted for the own vehicle. That is, for example, under a situation that the danger is predicted such that "there is the possibility of collision with the obstacle ahead (the vehicle ahead)", if various kinds of information such as "the speed of the own vehicle (50 to 55 km/h or above), and the speed of the vehicle ahead (40 km/h or less)" are stored in the storage unit 302, the prediction and determination ECU 301 determines that the danger level is 1. If various kinds of information such as "the speed of the own vehicle (55 to 60 km/h or above), and the speed of the vehicle ahead (40 km/h or less)" are stored in the storage unit 302, the prediction and determination ECU 301 determines that the danger level is 2. If various kinds of information such as "the speed of the own vehicle (60 to 65 km/h or above), and the speed of the vehicle ahead (40 km/h or less)" are stored in the storage unit 302, the prediction and determination ECU 301 determines that the danger level is 3. If various kinds of information such as "the speed of the own vehicle (65 to 70 km/h or above), and the speed of the vehicle ahead (40 km/h or less)" are stored in the storage unit 302, the prediction and determination ECU 301 determines that the danger level is 4.

Further, the prediction and determination ECU 301 executes the control contents stored in the control table 301*d* shown in FIG. 39, corresponding to the danger (danger level) determined above. That is, for example, under a situation in which the danger is predicted such that "there is the possibility of collision with the obstacle ahead (the vehicle ahead)", if it is determined to be the danger level 1, the prediction and determination ECU 301 executes vehicle control such as "producing a warning sound A from the speaker 504, showing a warning display a on the monitor 502, and prohibiting acceleration by the engine control ECU 406". When it is determined to be the danger level 2, the prediction and determination ECU 301 executes vehicle control such as "producing a warning sound B from the speaker 504, showing a warning display b on the monitor 502, and decelerating (small) by the engine control ECU 406". When it is determined to be the danger level 3, the prediction and determination ECU 301 executes vehicle control such as "producing a warning sound C from the speaker 504, showing a warning display c on the monitor 502, and decelerating (medium) by the engine control ECU 406, and avoiding collision by the steering control ECU 410". When it is determined to be the danger level 4, the prediction and determination ECU 301 executes vehicle control such as "producing a warning sound D from the speaker 504, showing a warning display d on the monitor 502, and decelerating (large) by the engine control ECU 406, and operating the safety system (expansion of airbag, tightening of seatbelt) by the collision safety control system 200".

In the vehicle control apparatus according to the first specific example, prevention of traffic accident and safety of vehicles is planned, by performing predictive determination (processing such as determination of situation, danger prediction, danger determination, and vehicle control), by using various tables and various kinds of information stored in the storage unit 302. Specific operation example of the vehicle control apparatus will be explained below, under three situations of (1) prevention of head-to-head collision with an obstacle ahead (a vehicle ahead), (2) prevention of head-to-head collision with an invisible vehicle, and (3) prevention of deviation from lane due to doze or looking aside. In the following examples, processing such as danger prediction, danger determination, and vehicle control will be explained, assuming that the situation has been already determined.

Figure 41:
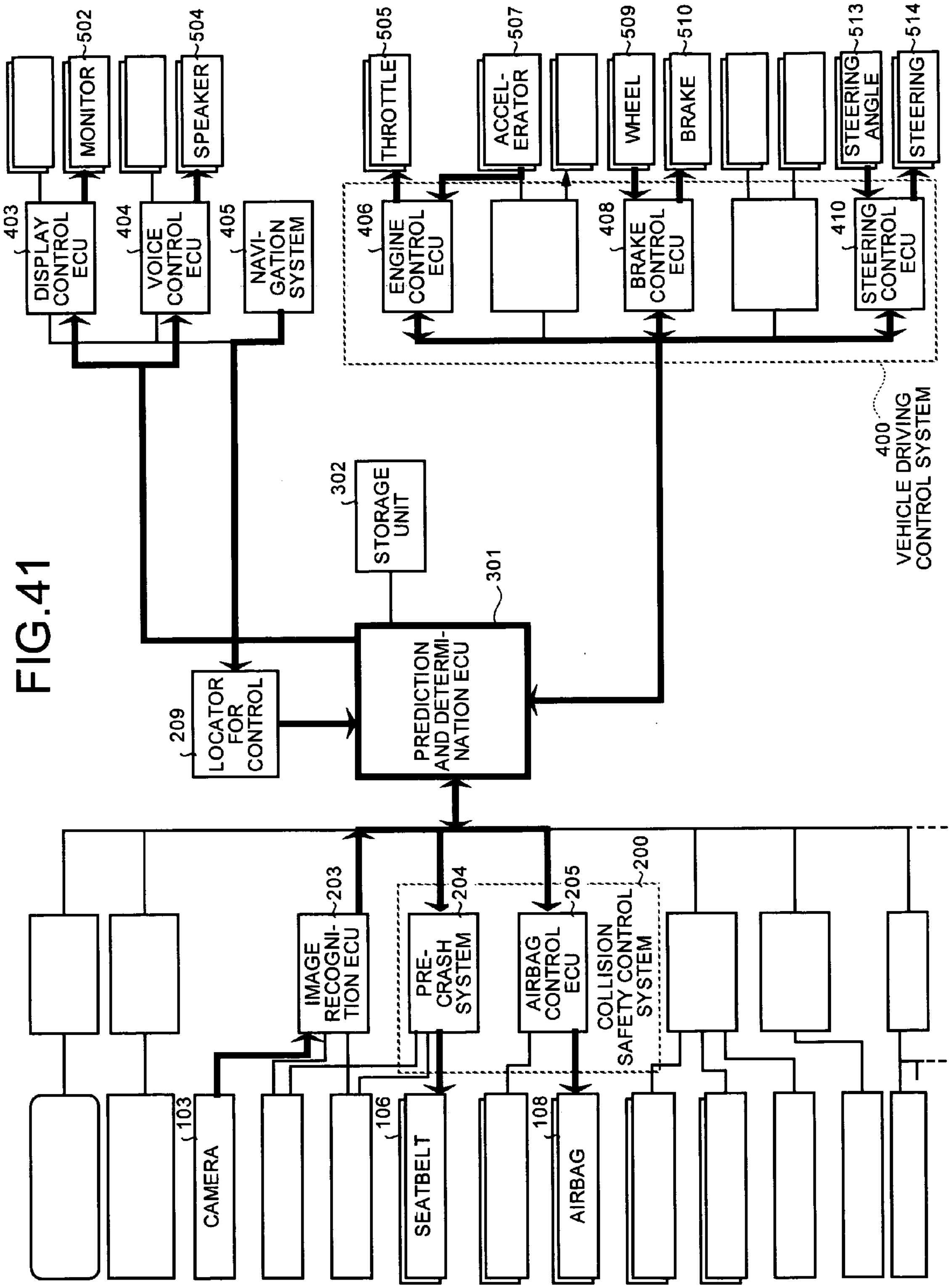
FIG. 41 is a block diagram for illustrating prevention of head-to-head collision with an obstacle (vehicle) ahead.

To prevent head-to-head collision with an obstacle ahead (a vehicle ahead), as shown in FIG. 40 and FIG. 41, information such as "the shape of the intersection and the road, the color of the traffic lights, the content of the sign, the type of the obstacle, the position of the obstacle, the traveling direction of the obstacle, and the speed of the obstacle" is stored in the storage unit 302, according to the perception and recognition processing of the image recognition ECU 203 via the camera 103 (the front camera).

Information such as "distance between the own vehicle and the intersection, the shape of the intersection and the road, the presence of traffic lights, and the content of the sign" is also stored in the storage unit 302, according to the perception and recognition processing of the locator for control 209 via the navigation system 405. Information such as "the speed of the own vehicle, the braking power, and the acceleration degree" is also stored in the storage unit 302, according to the perception and recognition processing of the brake control ECU 408 and the engine control ECU 406.

The prediction and determination ECU 301 uses the information stored in the storage unit 302, to perform processing such as danger prediction, danger determination, and vehicle control, thereby preventing head-to-head collision with an obstacle ahead (a vehicle ahead). That is, the prediction and determination ECU 301 refers to the information stored in the storage unit 302, to determine whether the situation satisfies the prediction condition of "prevention of head-to-head collision with an obstacle ahead (a vehicle ahead)" stored in the danger prediction table 301*b* shown in FIG. 37, thereby predicting the danger of "collision with an obstacle ahead (a vehicle ahead)" or "oversight or delay in detection of the driver".

When the danger is predicted, the prediction and determination ECU 301 refers to the information stored in the storage unit 302, to determine whether the situation satisfies the determination condition of "prevention of head-to-head collision with an obstacle ahead (a vehicle ahead)" stored in the danger determination table 301*c* shown in FIG. 38, thereby determining the danger level predicted for the own vehicle. Subsequently, the prediction and determination ECU 301 executes the control content of "prevention of head-to-head collision with an obstacle ahead (a vehicle ahead)" stored in the control table 301*d* shown in FIG. 39, corresponding to the danger level determined above.

That is, for example, if it is determined to be the danger level 1, the prediction and determination ECU 301 executes vehicle control such as "producing a warning sound A from the speaker 504, showing a warning display a on the monitor 502, and prohibiting acceleration by the engine control ECU 406". When it is determined to be the danger level 2, the prediction and determination ECU 301 executes vehicle control such as "producing a warning sound B from the speaker 504, showing a warning display b on the monitor 502, and decelerating (small) by the engine control ECU 406". When it is determined to be the danger level 3, the prediction and determination ECU 301 executes vehicle control such as "producing a warning sound C from the speaker 504, showing a warning display c on the monitor 502, and decelerating (medium) by the engine control ECU 406, and avoiding collision by the steering control ECU 410". When it is determined to be the danger level 4, the prediction and determination ECU 301 executes vehicle control such as "producing a warning sound D from the speaker 504, showing a warning display d on the monitor 502, and decelerating (large) by the engine control ECU 406, and operating the safety system (expansion of airbag, tightening of seatbelt) by the collision safety control system 200".

Figure 43:
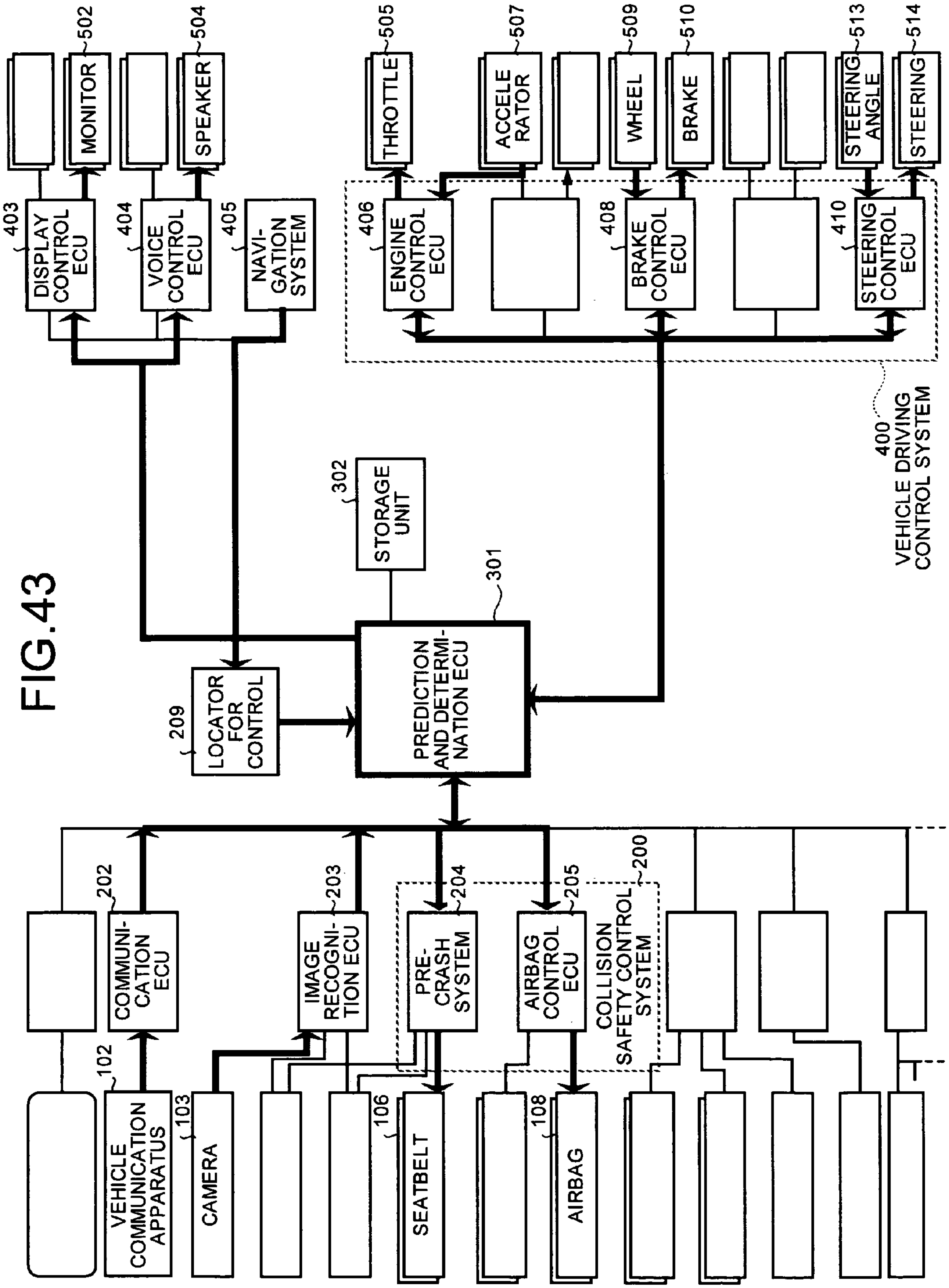
FIG. 43 is a block diagram for illustrating prevention of head-to-head collision with an invisible vehicle.

To prevent head-to-head collision with an invisible vehicle, as shown in FIG. 42 and FIG. 43, the information such as "the shape of the intersection and the road, the color of traffic lights, the content of the sign" is stored in the storage unit 302 according to the perception and recognition processing of the image recognition ECU 203 via the camera 103 (the front camera). The information such as "the type of the invisible vehicle, the position of the vehicle, the traveling direction of the vehicle, and the speed of the vehicle" is also stored in the storage unit 302 according to the perception and recognition processing of the communication ECU 202 via the vehicle communication apparatus 102.

The information such as "the distance between the own vehicle and the intersection, the shape of the intersection and the road, the presence of traffic lights, and the content of the sign" is also stored in the storage unit 302 according to the perception and recognition processing of the locator for control 209 via the navigation system 405. The information such as "the speed of the own vehicle, the braking power, and the acceleration degree" is also stored in the storage unit 302 according to the perception and recognition processing of the brake control ECU 408 and the engine control ECU 406.

The prediction and determination ECU 301 uses the information stored in the storage unit 302, to perform the processing such as danger prediction, danger determination, and vehicle control, thereby preventing head-to-head collision with an invisible vehicle. That is, the prediction and determination ECU 301 refers to the information stored in the storage unit 302, to determine whether the situation satisfies the prediction condition of "prevention of head-to-head collision with an invisible vehicle" stored in the danger prediction table 301*b* shown in FIG. 37, thereby predicting the danger of "collision with an invisible vehicle" or "oversight or delay in detection of the driver".

When the danger is predicted, the prediction and determination ECU 301 refers to the information stored in the storage unit 302, to determine whether the situation satisfies the determination condition of "prevention of head-to-head collision with an invisible vehicle" stored in the danger determination table 301*c* shown in FIG. 38, thereby determining the danger level predicted for the own vehicle. Subsequently, the prediction and determination ECU 301 executes the control content of "prevention of head-to-head collision with an invisible vehicle" stored in the control table 301*d* shown in FIG. 39, corresponding to the danger level determined above.

That is, for example, if it is determined to be the danger level 1, the prediction and determination ECU 301 executes vehicle control such as "producing a warning sound A from the speaker 504, showing a warning display a on the monitor 502, and prohibiting acceleration by the engine control ECU 406". When it is determined to be the danger level 2, the prediction and determination ECU 301 executes vehicle control such as "producing a warning sound B from the speaker 504, showing a warning display b on the monitor 502, and decelerating (small) by the engine control ECU 406". When it is determined to be the danger level 3, the prediction and determination ECU 301 executes vehicle control such as "producing a warning sound C from the speaker 504, showing a warning display c on the monitor 502, and decelerating (medium) by the engine control ECU 406, and avoiding collision by the steering control ECU 410". When it is determined to be the danger level 4, the prediction and determination ECU 301 executes vehicle control such as "producing a warning sound D from the speaker 504, showing a warning display d on the monitor 502, and decelerating (large) by the engine control ECU 406, and operating the safety system (expansion of airbag, tightening of seatbelt) by the collision safety control system 200".

Figure 45:
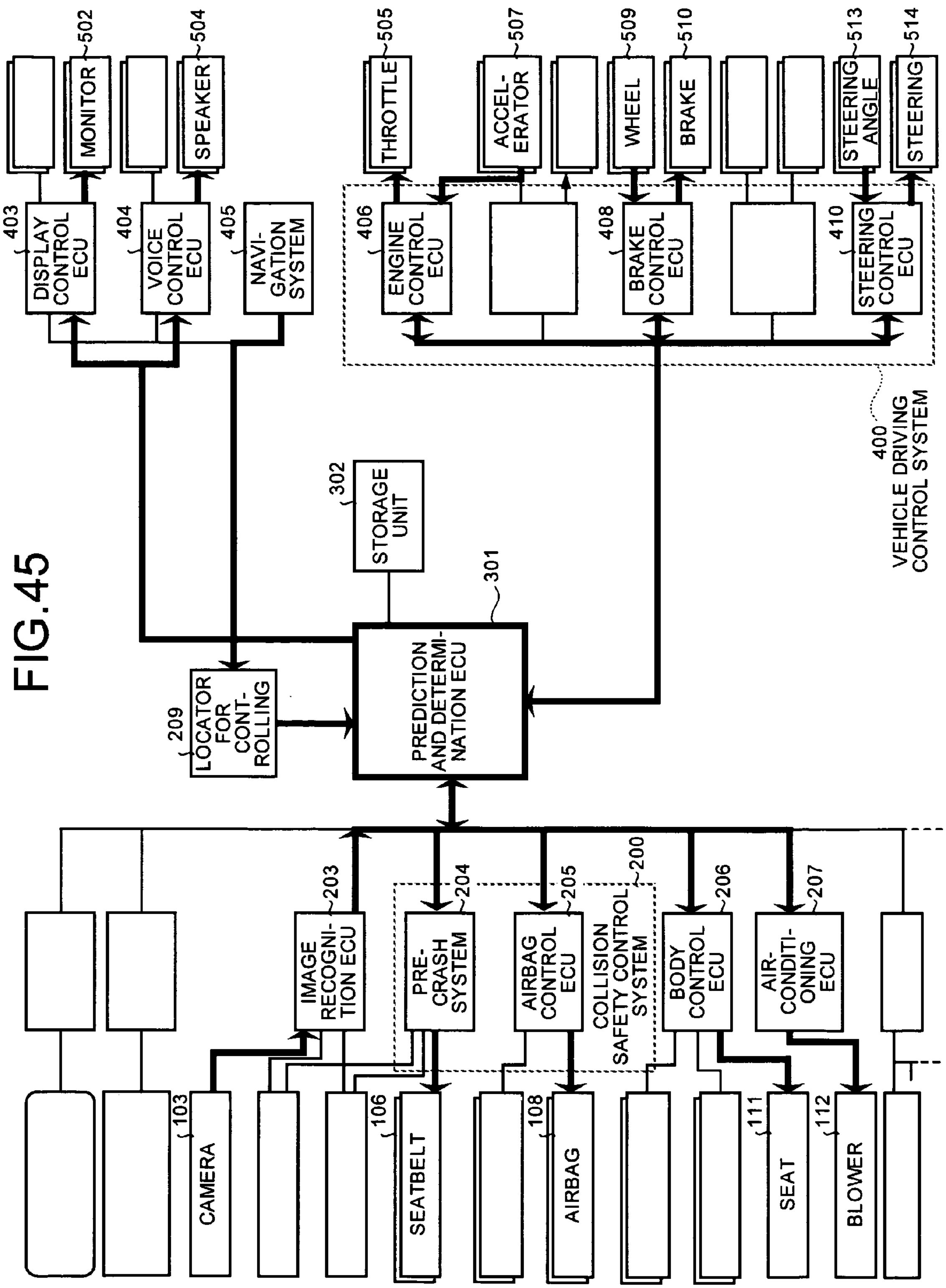
FIG. 45 is a block diagram for illustrating prevention of deviation from a lane due to doze or looking aside.

To prevent deviation from the lane due to doze or looking aside, as shown in FIG. 44 and FIG. 45, the information such as "the number of blinks, the line of sight, the direction of the face, and the head position of the driver" is stored in the storage unit 302 according to the perception and recognition processing of the image recognition ECU 203 via the camera 103 (the camera in vehicle). The information such as "the position of the own vehicle within the lane" is also stored in the storage unit 302 according to the perception and recognition processing of the image recognition ECU 203 via the camera 103 (the rear and side cameras). The information such as "the type of the obstacle, the position of the obstacle, the traveling direction of the obstacle, and the speed of the obstacle" is stored in the storage unit 302, according to the perception and recognition processing of the image recognition ECU 203 via the camera 103 (the front camera).

The information such as "the distance between the own vehicle and the obstacle, the shape of the road" is also stored in the storage unit 302 according to the perception and recognition processing of the locator for control 209 via the navigation system 405. The steering angle is stored in the storage unit 302 according to the perception and recognition processing of the steering control ECU 410, and information such as "the speed of the own vehicle, the braking power, and the acceleration degree" is also stored in the storage unit 302 according to the perception and recognition processing of the brake control ECU 408 and the engine control ECU 406.

The prediction and determination ECU 301 uses the information stored in the storage unit 302, to perform the processing such as danger prediction, danger determination, and vehicle control, thereby preventing deviation from the lane due to doze or looking aside. That is, the prediction and determination ECU 301 refers to the information stored in the storage unit 302, to determine whether the situation satisfies the prediction condition of "prevention of deviation from the lane due to doze or looking aside" stored in the danger prediction table 301*b* shown in FIG. 37, thereby predicting the danger of "doze", "looking aside", "deviation from the lane", "collision with an obstacle" or "oversight or delay in detection of the driver".

When the danger is predicted, the prediction and determination ECU 301 refers to the information stored in the storage unit 302, to determine whether the situation satisfies the determination condition of "prevention of deviation from the lane due to doze or looking aside" stored in the danger determination table 301*c* shown in FIG. 38, thereby determining the danger level predicted for the own vehicle. Subsequently, the prediction and determination ECU 301 executes the control content of "prevention of deviation from the lane due to doze or looking aside" stored in the control table 301*d* shown in FIG. 39, corresponding to the danger level determined above.

That is, for example, if it is determined to be the "danger level 1" of doze, the prediction and determination ECU 301 executes vehicle control such as "producing a warning sound A from the speaker 504, vibrating the seat 111 by the body control ECU 206, applying the blower 112 to the face by the air-conditioning ECU 207, and prohibiting acceleration by the engine control ECU 406". If it is determined to be the "danger level 1" of looking aside, the prediction and determination ECU 301 executes vehicle control such as "producing a warning sound A from the speaker 504, showing a warning display a on the monitor 502, vibrating the seat 111 by the body control ECU 206, and prohibiting acceleration by the engine control ECU 406".

When it is determined to be the danger level 2 of collision, the prediction and determination ECU 301 executes vehicle control such as "producing a warning sound B from the speaker 504, showing a warning display b on the monitor 502, and decelerating (small) by the engine control ECU 406". When it is determined to be the danger level 3, the prediction and determination ECU 301 executes vehicle control such as "producing a warning sound C from the speaker 504, showing a warning display c on the monitor 502, and decelerating (medium) by the engine control ECU 406, and avoiding collision by the steering control ECU 410". When it is determined to be the danger level 4, the prediction and determination ECU 301 executes vehicle control such as the prediction and determination ECU 301 executes vehicle control such as "producing a warning sound D from the speaker 504, showing a warning display d on the monitor 502, and decelerating (large) by the engine control ECU 406, and operating the safety system (expansion of airbag, tightening of seatbelt) by the collision safety control system 200".

In the vehicle control apparatus according to the first specific example, since predictive determination is performed by using various tables, prevention of traffic accident and safety of vehicles can be realized with a simple configuration and processing, and at a low cost. In the first specific example, an example in which determination of situation, danger prediction, danger determination, and vehicle control are executed in order has been explained, however, the present invention is not limited thereto. For example, the vehicle control may be executed immediately according to the danger prediction, or the vehicle control may be executed immediately only by the danger determination, by including the conditions for determination of situation and danger prediction in the determination conditions in the danger determination table 301*c*.

In the first specific example, an example in which various tables are used to perform predictive determination (danger prediction, danger determination, and vehicle control) has been explained. However, the vehicle control apparatus according to the embodiment is not limited thereto, and is applicable to an instance in which predictive determination is performed by performing various kinds of simulation. Therefore, as a second specific example of the vehicle control apparatus according to the embodiment, a specific example in which various kinds of simulation are performed will be explained.

Figure 46:
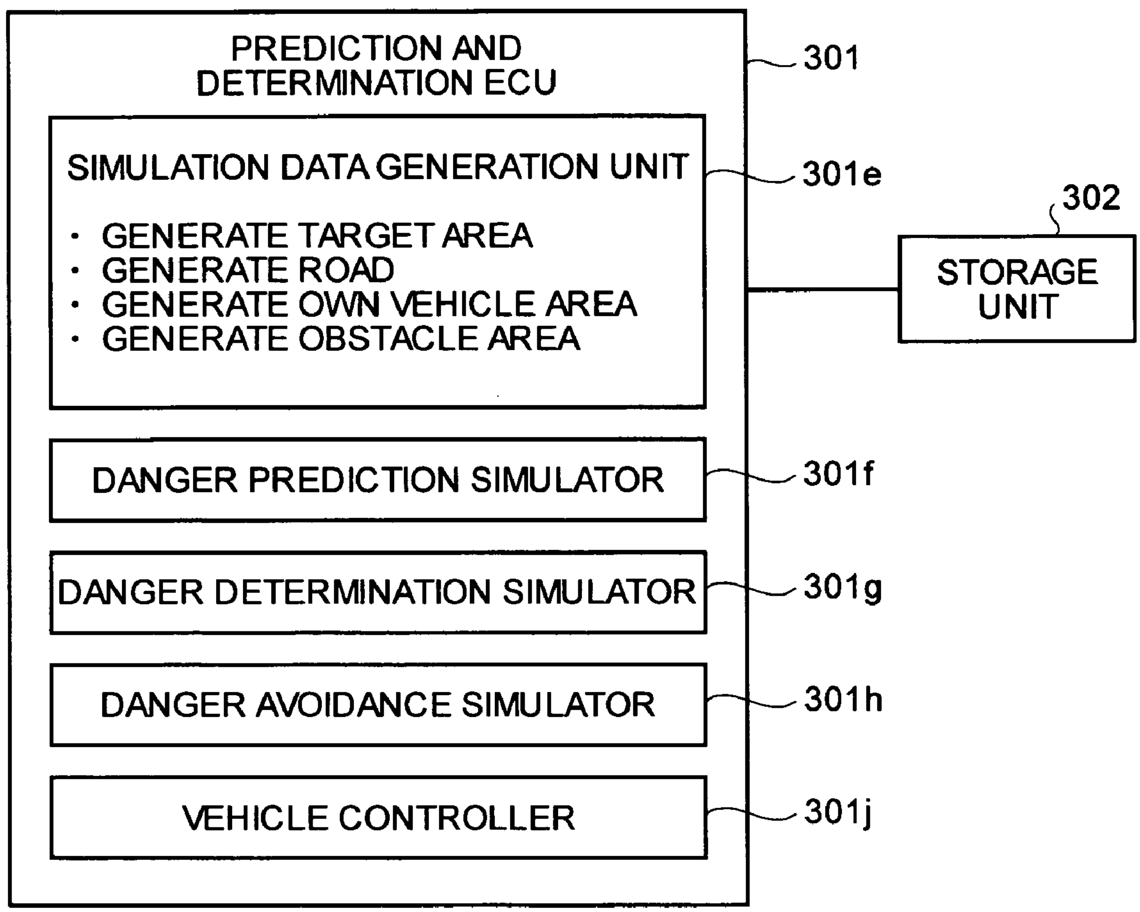
FIG. 46 is a block diagram of a vehicle control apparatus (particularly, prediction and determination ECU) according to a second example of the embodiment.

FIG. 46 is a block diagram of a vehicle control apparatus (particularly, prediction and determination ECU) according to a second example of the embodiment. The other processors other than the prediction and determination ECU 301 are for realizing the same functions as those in the vehicle control apparatus according to the first specific example, and hence illustration thereof is omitted.

That is, the storage unit 302 shown in FIG. 46 stores various kinds of information utilizable for various kinds of simulation, as in the second specific example, for each object such as the own vehicle, the driver, the road, obstacles (a vehicle ahead, a vehicle on side, a following vehicle, an oncoming vehicle, a motorbike, a bicycle, a pedestrian, and a fallen object), for example, the position, speed, acceleration degree, traveling direction, type, and size of the own vehicle, as shown in FIG. 35.

The prediction and determination ECU 301 shown in FIG. 46 uses various kinds of information stored in the storage unit 302, to create simulation data, and performs various kinds of simulation by using the data. As shown in this figure, the prediction and determination ECU 301 has a simulation data generation unit 301*e*, a danger prediction simulator 301*f*, a danger determination simulator 301*g*, a danger avoidance simulator 301*h*, and a vehicle controller 301*j*.

Figure 47:
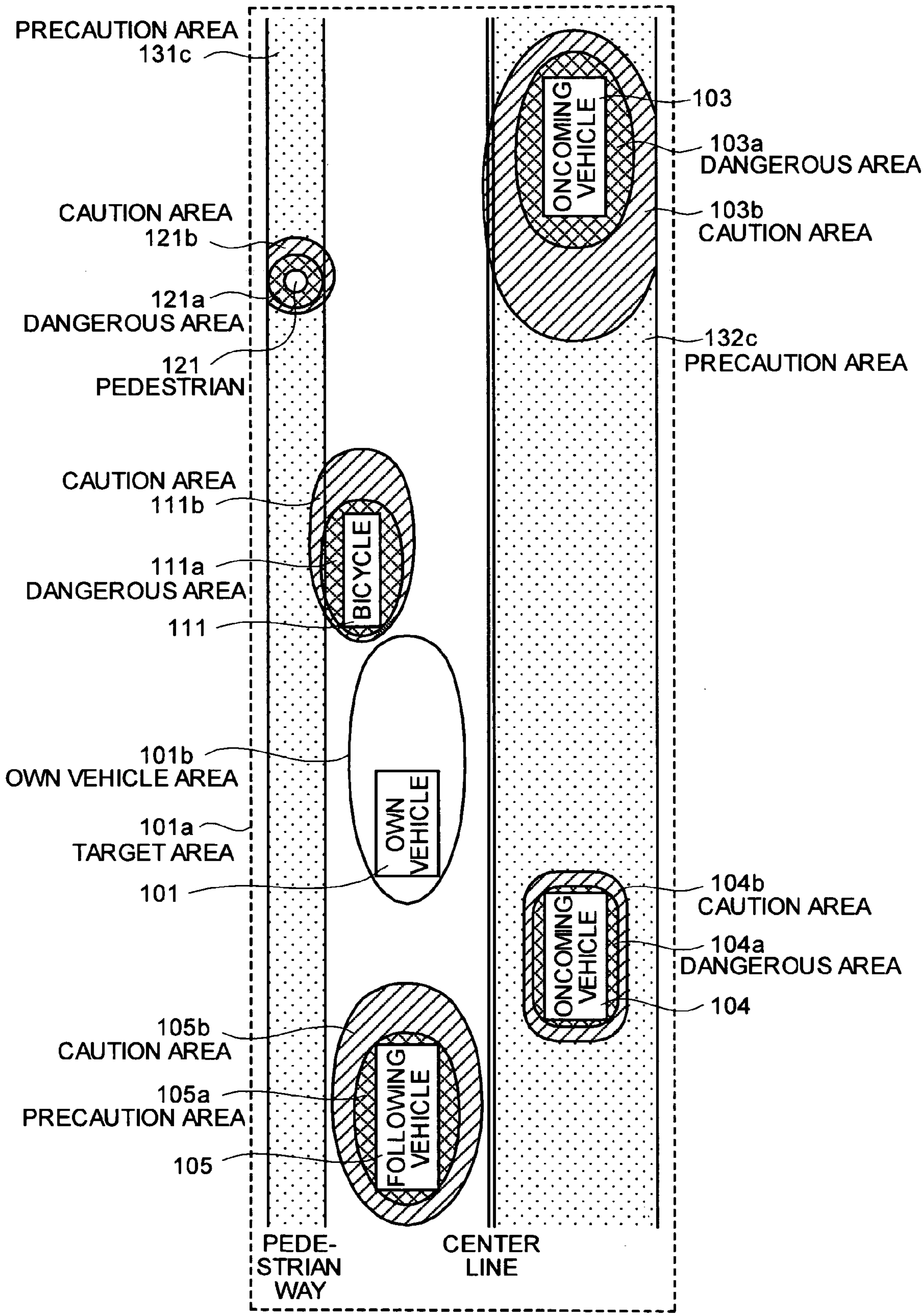
FIG. 47 is a schematic for illustrating a concept of a simulation.

Of these, the simulation data generation unit 301*e* uses various kinds of information stored in the storage unit 302, to continuously generate simulation data as shown in FIG. 47. As shown in this figure, the simulation data is for virtually expressing the surrounding situation (present and future) around the own vehicle. Further, the danger area to which approach should be avoided, the caution area to which avoidance of approach is preferred, and the precaution area to which avoidance of approach is preferred, though not so much as the caution area, are expressed and generated, for each of the road, the own vehicle, and obstacles (a vehicle ahead, a vehicle on side, a following vehicle, an oncoming vehicle, a motorbike, a bicycle, a pedestrian, and a fallen object).

Figure 48A:
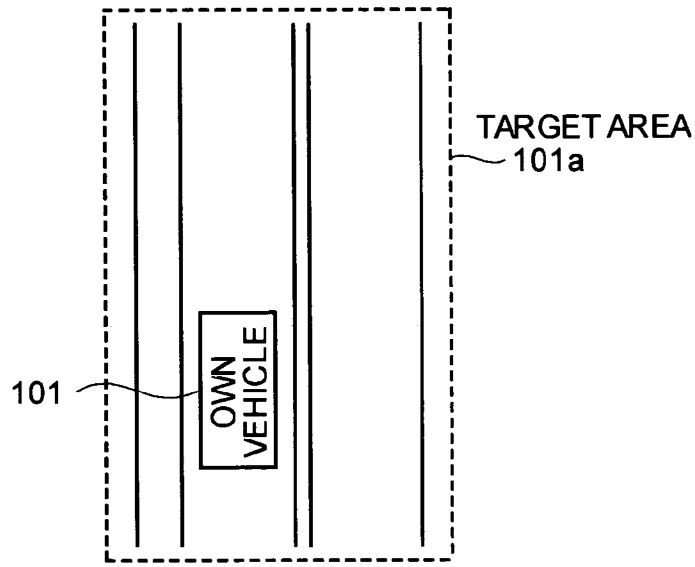
FIG. 48A and FIG. 48B are schematics for illustrating generation of target area.
Figure 48B:
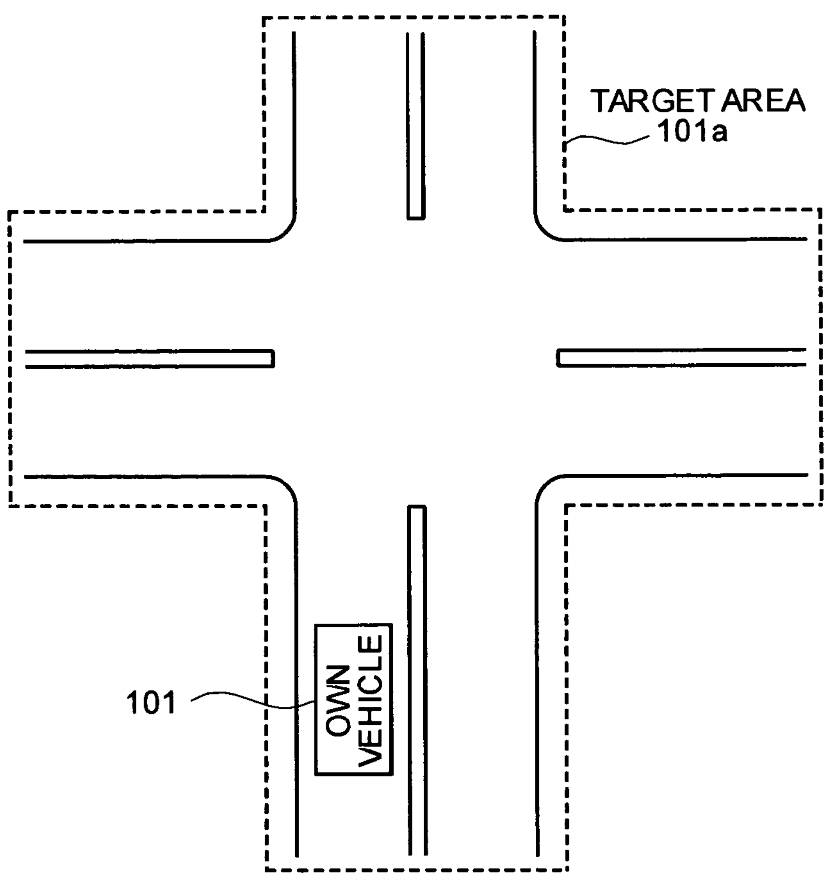

More specifically, the simulation data generation unit 301*e* uses various kinds of information stored in the storage unit 302, to generate a target area 101*a* for which the simulation data is created, as the target area generation processing. Specifically, the target area 101*a* is set in a range necessary for accident prevention and safety of the own vehicle, as shown in FIG. 47, to reduce the processing load on the simulation. That is, for example, when recognizing "deceleration of the own vehicle" from the information of "own vehicle" stored in the storage unit 302, the simulation data generation unit 301*e* sets the target area 101*a* to be narrow, as shown in FIG. 48A, and when recognizing "approaching the intersection" from the information of "own vehicle" and "road" stored in the storage unit 302, the simulation data generation unit 301*e* sets the target area 101*a* to be wide, as shown in FIG. 48B.

The simulation data generation unit 301*e* uses the information stored in the storage unit 302, to generate the data of the road in the target area 101*a*, as the road generation processing. Specifically, as shown in FIG. 47, the simulation data generation unit 301*e* expresses the shape of the road (intersection, curve, two-lane road, . . . ), the road situation (furrow, undulations, frozen, . . . ), the traffic lights, and the sign in the target area 101*a*, based on the information of "road" stored in the storage unit 302, and sets the danger area, the caution area, and the precaution area therein.

Figure 49A:
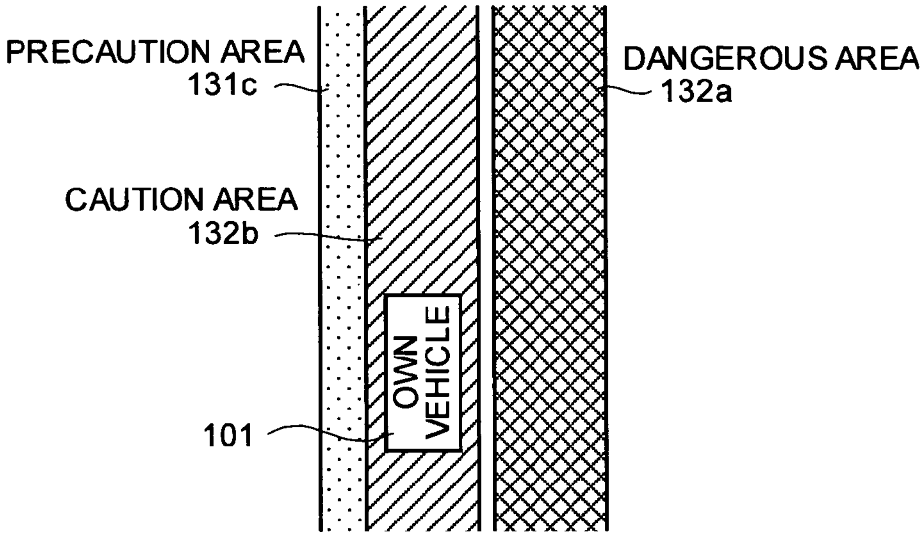
FIG. 49A and FIG. 49B are schematics for illustrating generation of a road.
Figure 49B:
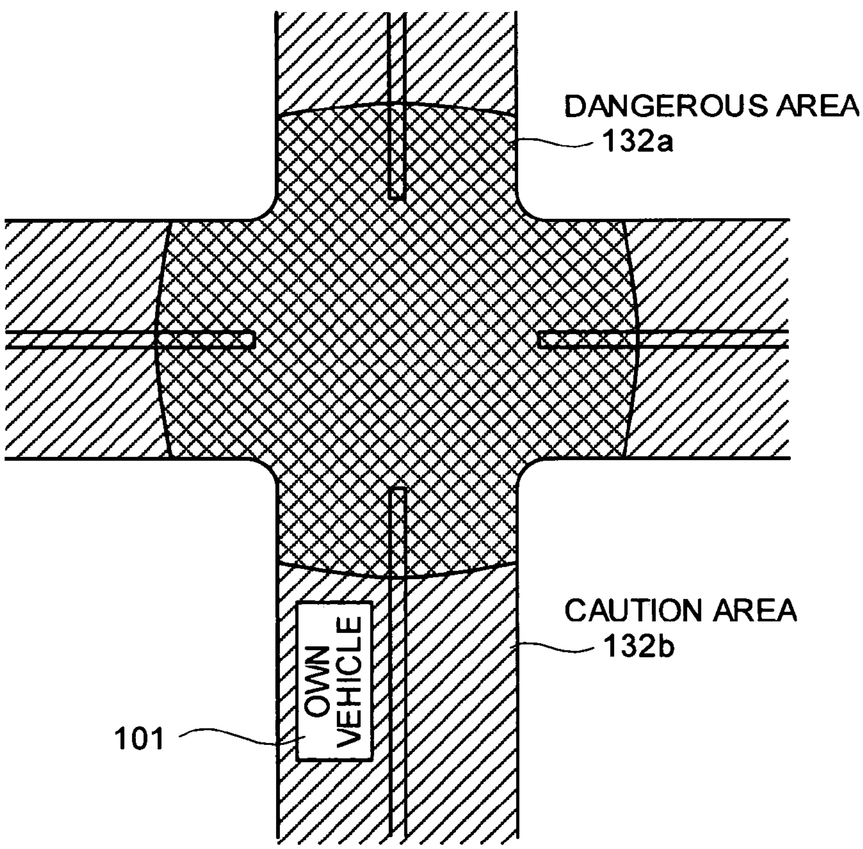

The "danger area, caution area, and precaution area" in the road are set, reflecting potential danger, based on the information of "road" and information of "others (weather, time, brightness, . . . )". That is, when recognizing that "higher speed limit is set in the road" from the information of "road" stored in the storage unit 302, the simulation data generation unit 301*e* sets the opposite lane as the danger area 132*a*, as shown in FIG. 49A, and when recognizing that "the intersection is an accident prone intersection" from the information of "road" stored in the storage unit 302, the simulation data generation unit 301*e* sets the intersection as the danger area 132*a*, as shown in FIG. 49B.

The simulation data generation unit 301*e* uses the information stored in the storage unit 302, to generate data of the own vehicle in the target area 101*a*, as the own vehicle area generation processing. Specifically, the simulation data generation unit 301*e* expresses the current position and the size of the own vehicle in the target area 101*a*, as shown in FIG. 47, based on the information of "own vehicle" stored in the storage unit 302, and sets the own vehicle area 101*b* around the own vehicle 101.

Figure 50A:
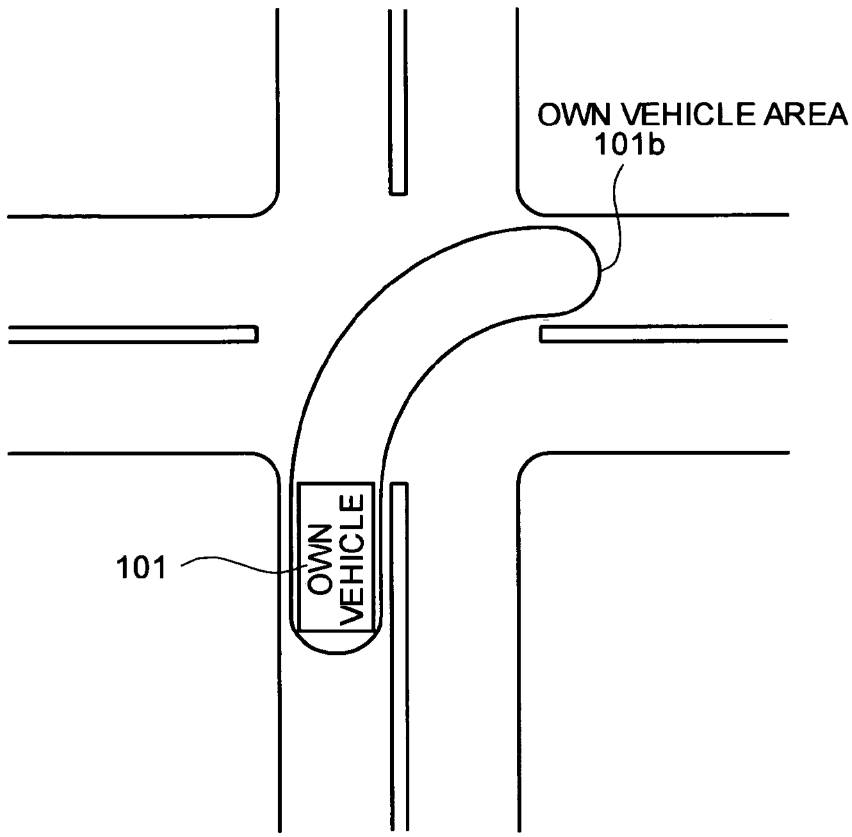
FIG. 50A and FIG. 50B are schematics for illustrating generation of an own area.
Figure 50B:
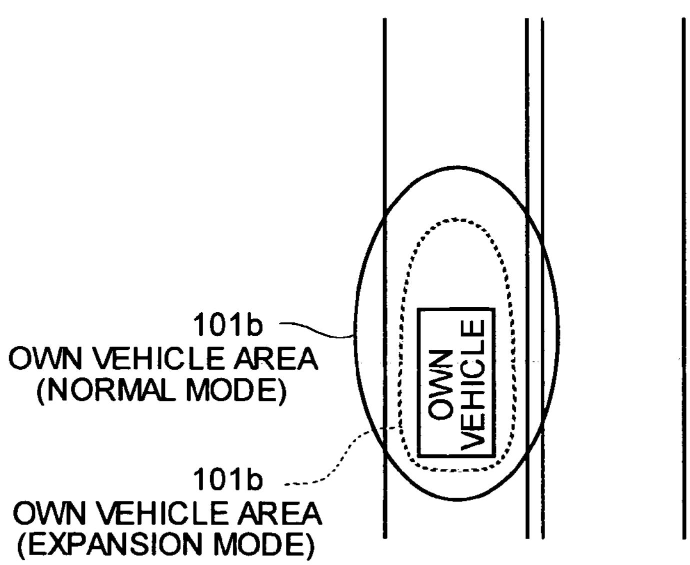

The own vehicle area 101*b* is data used for the danger prediction simulation (collision prediction), and is set by presuming the moving range of the own vehicle 101. That is, when recognizing "acceleration of the own vehicle" from the information of "own vehicle" stored in the storage unit 302, the simulation data generation unit 301*e* sets the own vehicle area 101*b* sufficiently wide with respect to the traveling direction, and when recognizing "turning to the right at the intersection" from the information of "own vehicle" stored in the storage unit 302, the simulation data generation unit 301*e* sets the own vehicle area 101*b* with respect to the right-turn direction, as shown in FIG. 50A. Further, when recognizing "a beginner driver, or a driver having caused many accidents" from the information of "driver" stored in the storage unit 302, or recognizing "it is raining, which deteriorates the visibility" from the information of "others" stored in the storage unit 302, the simulation data generation unit 301*e* sets the own vehicle area 101*a* wider than usual.

The simulation data generation unit 301*e* uses the information stored in the storage unit 302 to generate data of obstacles (a vehicle ahead, a vehicle on side, a following vehicle, an oncoming vehicle, a motorbike, a bicycle, a pedestrian, and a fallen object) in the target area 101*a*, as the obstacle area generation processing. Specifically, the simulation data generation unit 301*e* expresses the current position and the size of the obstacles (an oncoming vehicle 103, an oncoming vehicle 104, a following vehicle 105, a bicycle 111, and a pedestrian 121) in the target area 101*a*, as shown in FIG. 47, based on the information of "obstacles" stored in the storage unit 302, and sets the danger area, the caution area, and the precaution area around the respective obstacles.

The "danger area, caution area, and precaution area" of each obstacle are data used for the danger prediction simulation (collision prediction), and are set by presuming the moving range of each obstacle, while reflecting the potential danger of each obstacle, based on the information of respective obstacles stored in the storage unit 302. That is, when recognizing "acceleration of the obstacle" from the information of "obstacles" stored in the storage unit 302, the simulation data generation unit 301*e* sets the "danger area, caution area, and precaution area" sufficiently wide with respect to the traveling direction of the obstacle, and when recognizing that "the driver of the obstacle has caused many accidents" from the information of "obstacles" stored in the storage unit 302, the simulation data generation unit 301*e* sets the "danger area, caution area, and precaution area" wider than usual.

Figure 51A:
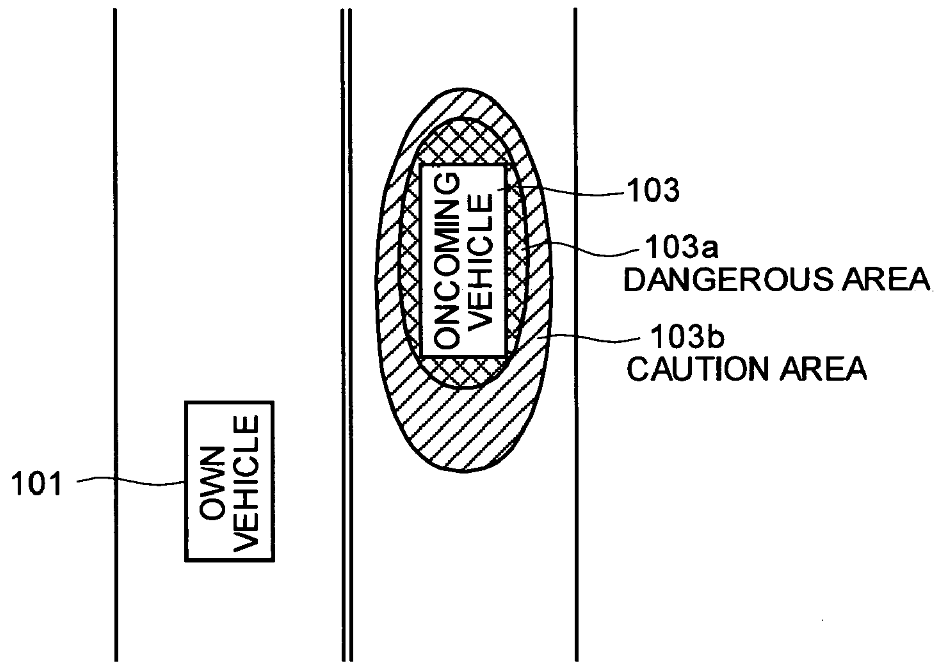
FIG. 51A and FIG. 51B are schematics for illustrating generation of an obstacle area.
Figure 51B:
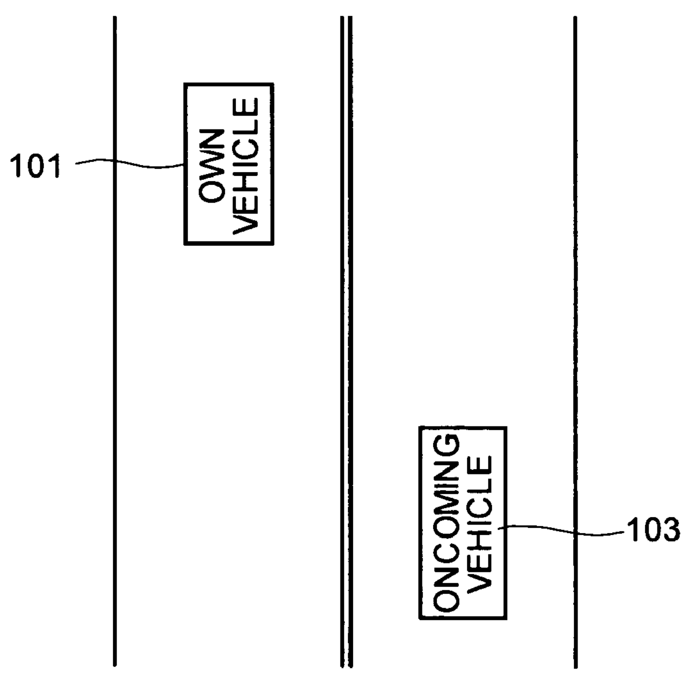

When recognizing that "the distance to the own vehicle is becoming short" from the information of "obstacles (oncoming vehicle)" stored in the storage unit 302, since the presumed moving range becomes narrow, the simulation data generation unit 301*e* sets the "danger area, caution area, and precaution area" narrow with respect to the traveling direction, as shown in FIG. 51A. When recognizing that "the oncoming vehicle has passed sufficiently" from the information of "obstacles (oncoming vehicle)" stored in the storage unit 302, since there is no possibility of collision, the simulation data generation unit 301*e* removes the "danger area, caution area, and precaution area", as shown in FIG. 51B.

The simulation data generation unit 301*e* continuously generates the simulation data as shown in FIG. 47. The danger prediction simulator 301*f*, the danger determination simulator 301*g*, the danger avoidance simulator 301*h*, and the vehicle controller 301*j* use the simulation data and various kinds of information stored in the storage unit 302, to perform various kinds of simulation, thereby realizing accident prevention and safety of the own vehicle.

The danger prediction simulator 301*f* is a processor that simulates whether the own vehicle 101 approaches any of the danger area, the caution area, and the precaution area, if the own vehicle advances as it is, based on the simulation data as shown in FIG. 47. Specifically, in the simulation data as shown in FIG. 47, when the own vehicle area 101*b* overlaps on any of the danger area, the caution area, and the precaution area, it is predicted as "dangerous".

Figure 52A:
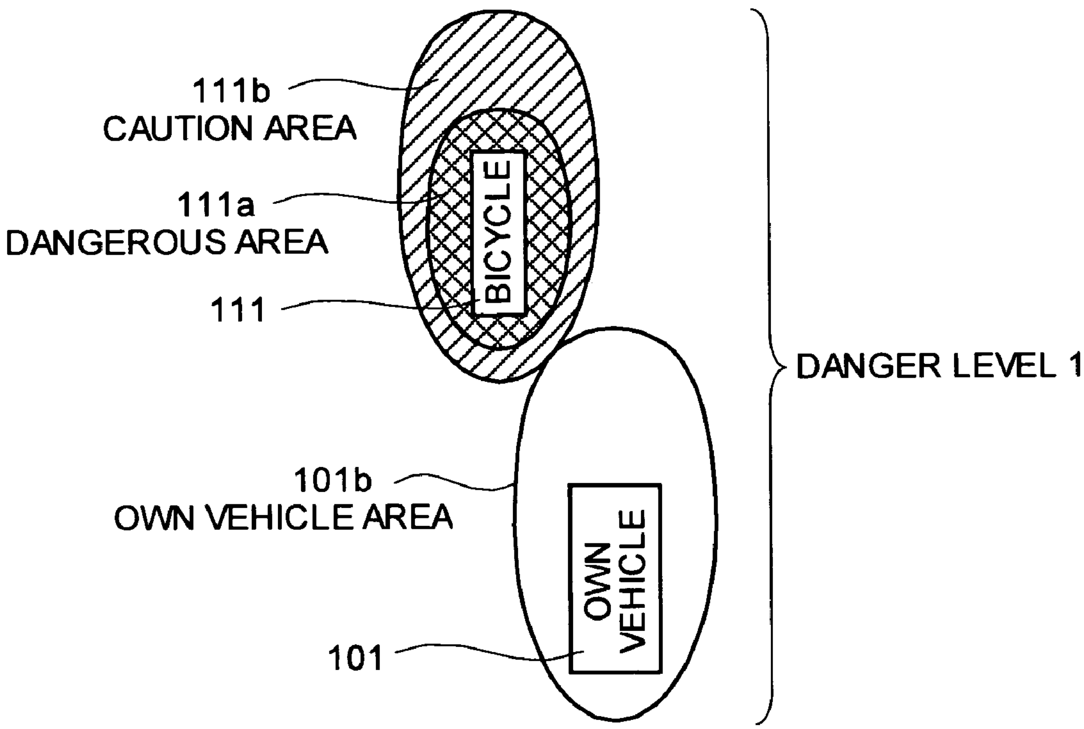
FIG. 52A and FIG. 52B are schematics for illustrating danger prediction simulation and danger determination simulation.
Figure 52B:
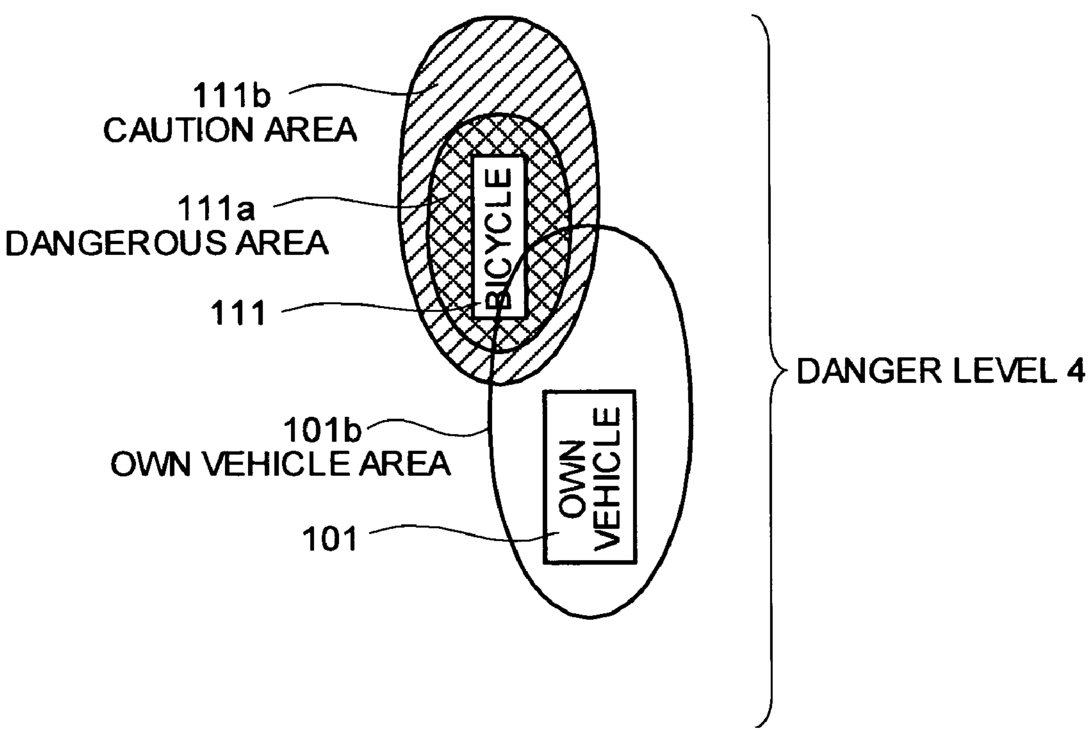

The danger determination simulator 301*g* is a processor that simulates the danger (danger level) based on the simulation data as shown in FIG. 47, when the danger prediction simulator 301*f* predicts as "dangerous". Specifically, as shown in FIG. 52A and FIG. 52B, when the own vehicle area 101*b* overlaps on the caution area 111*b* of the bicycle 111, danger determination simulator 301*g* determines it as "danger level 1", and when the own vehicle area 101*b* overlaps on the danger area 111*a*, determines it as "danger level 4". More appropriate determination can be performed, by making the own vehicle area 101*b* variable corresponding to the speed of the own vehicle, and the environmental conditions such as the weather and night or day.

The vehicle controller 301*j* is a processor that controls the vehicle, corresponding to the simulation result by the danger determination simulator 301*g*. Specifically, the vehicle controller 301*j* executes the control contents stored in the control table 301*d* as shown in FIG. 39, corresponding to the danger level in the simulation result. That is, when it is determined to be "danger level 1", vehicle control such as "producing a warning sound A from the speaker 504, showing a warning display a on the monitor 502, and prohibiting acceleration by the engine control ECU 406". When it is determined to be the danger level 2, the vehicle controller 301*j* executes vehicle control such as "producing a warning sound B from the speaker 504, showing a warning display b on the monitor 502, and decelerating (small) by the engine control ECU 406".

The danger avoidance simulator 301*h* is a processor that simulates which avoiding operation and avoiding action are most suitable, when the danger level in the simulation result by the danger determination simulator 301*g* is high, and it is determined that the operation of the driver and the action of the vehicle are required to avoid the danger of the vehicle. For example, as shown in FIG. 52B, when the danger determination simulation result due to collision between the own vehicle 101 and the bicycle 111 indicates danger level 4, as shown in FIG. 53, the danger avoidance simulator 301*h* simulates the situations when the steering wheel of the own vehicle 101 is made to rotate to the right (avoidance simulation (1)), and when the brake of the own vehicle 101 is pedaled (avoidance simulation (2)).

Figure 53:
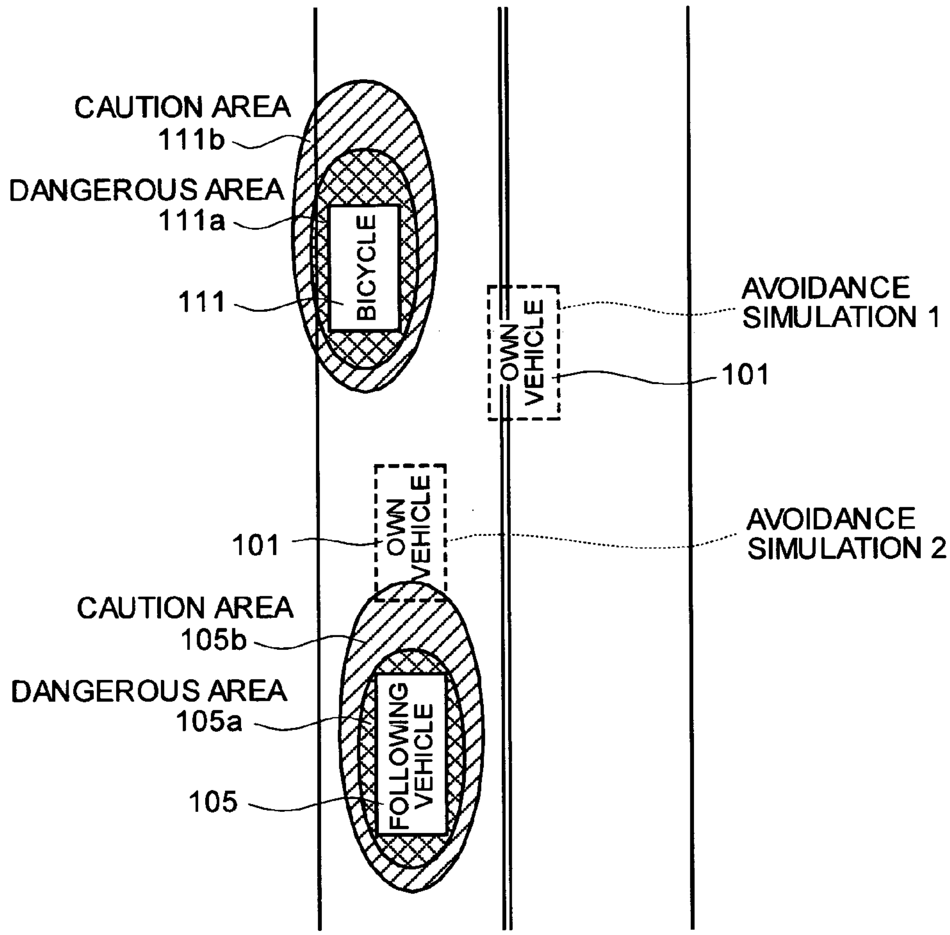
FIG. 53 is a schematic for illustrating danger avoidance simulation with a bicycle ahead.

As a result, in the example shown in FIG. 53, if the avoidance simulation (2) is selected, the own vehicle enters into the caution area 105*b* of the following vehicle. Therefore, a simulation result indicating that the avoidance simulation (1) is better is obtained. In this case, the vehicle controller 301*j* controls the steering wheel of the own vehicle so that the vehicle turns to the right.

The danger avoidance simulator 301*h* basically determines that the simulation result avoiding the danger area, the caution area, and the precaution area is most suitable. However, avoidance of approach to the danger area is given priority to avoidance of approach to the caution and precaution areas, and avoidance of approach to the caution area is given priority to avoidance of approach to the precaution area. That is, it is determined that approach to an area having a lower danger level is appropriate, to avoid approach to an area having a higher danger level.

Figure 54:
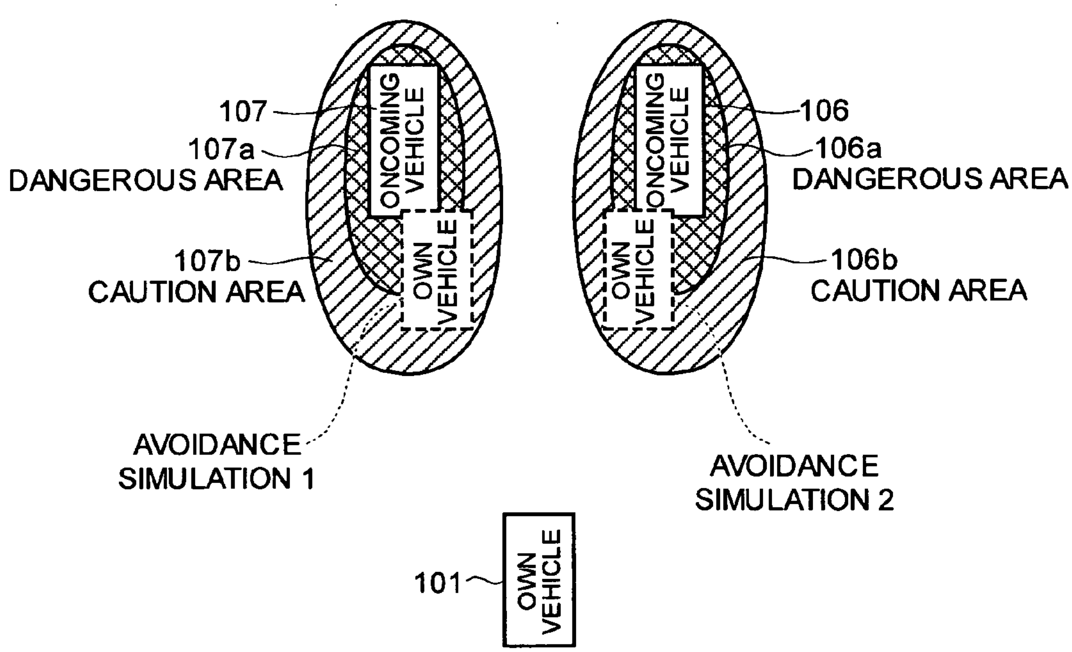
FIG. 54 is a schematic for illustrating danger avoidance simulation with an oncoming vehicle.

When it is determined that approach to the danger area is most suitable, the danger avoidance simulator 301*h* simulates the most suitable approach to the danger area. Specifically, as shown in FIG. 54, as a result of simulation when the own vehicle 101 is made to approach the direction of the oncoming vehicle 107 (avoidance simulation (1)), and when the own vehicle 101 is made to approach the direction of the oncoming vehicle 106 (avoidance simulation (2)), either case may cause an approach to the danger area. In such a case, the danger avoidance simulator 301*h* simulates which damage is larger, the damage when the avoidance simulation (1) is selected, or the damage when the avoidance simulation (2) is selected.

As a result, for example, when it is recognized that the "oncoming vehicle 106" is a standard-sized car, and the "oncoming vehicle 107" is a large trailer, from the information of the "oncoming vehicle 106" and the "oncoming vehicle 107" stored in the storage unit 302, a simulation result indicating that the damage of the avoidance simulation (1) in which the own vehicle 101 approaches the direction of the "oncoming vehicle 107" is larger can be obtained. In this case, the vehicle controller 301*j* controls the vehicle so that the own vehicle 101 is made to approach the direction of the oncoming vehicle 106.

Further, more highly developed determination can be performed by setting the caution area and the danger area, based on the driving histories of the driver of the own vehicle and the drivers around the own vehicle. Specifically, the caution area indicates a range in which the vehicle is operable, that is, the vehicle can move from the performance of the vehicle and the peripheral conditions, and the danger area indicates a range in which the vehicle is predicted to move (operation prediction area).

For example, it is uncommon to accelerate up to the limit of the vehicle during traveling of the vehicle, without any cause. Likewise, it is uncommon to turn the steering wheel suddenly without operating the indicator. Therefore, when the danger area (operation prediction area) is set, a range having a possibility that the vehicle may reach within the normal driving range is set, assuming that these operations are not performed. However, as the performance of the vehicle, acceleration is possible up to the limit in any circumstance, and the steering wheel can be turned suddenly without operating the indicator. In other words, these actions caused by some reasons, which are not recognized by the own vehicle side. Therefore, the range that the vehicle can reach when deviating from the normal driving range is set as the caution area.

The "normal driving range" is predicted from average or ideal driver's behavior, but actual drivers have own driving habit (driving tendency), respectively. Therefore, the driving tendency is determined from the driving history of the driver, and used at the time of setting the danger area (operation prediction area), thereby enabling high degree prediction and determination.

The driving history of the own vehicle is obtained by determining the situation that the own vehicle is confronting, monitoring how the driver operates the vehicle in this situation, and storing it in the storage unit 302. More specifically, the frequency of behavior exhibited in the situation is calculated, and the calculated frequency is used as the driving history. The driving history of the own vehicle is transmitted via the communication device, thereby enabling the use thereof for determination for other vehicles. Likewise, histories of drivers of other vehicles are obtained, and can be used for setting of the danger area and the caution area of the own vehicle.

It is preferred to store the driving history of the own vehicle for each driver. Therefore, an identifying unit that performs identification such as detection of fingerprints or password input may be provided, and the identified driver is stored in association with the driving history. The identification means can use any optional technique. A portable medium such as a card for identifying the driver may be used, or a plurality of ignition keys are allocated to the vehicle, and the driving history may be controlled for each ignition key. Further, at the time of startup of the vehicle, the driver may be input.

At the time of transfer of the driving history, the driving history may be directly transferred between surrounding vehicles, or may be transferred via the history managing center that controls the driving histories. In the direct communication, there is an advantage in that real-time communications are possible. In the transfer via the history managing center, there is an advantage in that the driver's tendency can be obtained by performing high degree processing, without increasing the load on the vehicles, since the history managing center performs information processing. It is a matter of course that the direct communication with the surrounding vehicles and the communication via the history managing center may be used together.

FIG. 55 is a table for explaining specific examples of driving history and its use examples. When the driver of the target vehicle and the driver of the own vehicle have a tendency of approaching the intersection from a non-preferential road without stopping, there is the danger of head-to-head collision.

When the driver of the target vehicle has a tendency of traveling, exceeding the speed limit by a predetermined value, there are the danger of head-to-head collision, the danger such that when the own vehicle turns to the right, the other party's vehicles advances straight ahead, to cause collision, and the danger such that the own vehicle may exceed the speed by following the vehicle. Likewise, when the driver of the own vehicle has a tendency of traveling, exceeding the speed limit by a predetermined speed, there is danger such that when the target vehicle is turning to the right, the own vehicle advances straight ahead, to cause collision.

When the target vehicle has a tendency of decelerating suddenly, there is the danger that the own vehicle bumps against the vehicle from behind, at the time of deceleration or stopping of the target vehicle. When the driver of the own vehicle has a tendency of decelerating suddenly, there is the danger of being bumped from behind by the following vehicle, at the time of deceleration or stopping of the own vehicle.

When the target vehicle has a tendency of sudden acceleration, there is the danger of bumping against a vehicle ahead from behind, and when the driver of the own vehicle has a tendency of sudden acceleration, there is the danger of bumping against a vehicle ahead from behind.

When the drivers of the target vehicle and the own vehicle have such a tendency that they do not perform the operation of the indicator appropriately, for example, the timing of operating the indicator is too late, or turning to the right or left or starting without operating the indicator, there is the danger of collision at the time of right turn or left turn, or starting of the vehicle.

When the drivers of the target vehicle and the own vehicle have a tendency of driving while looking aside, there is the danger of collision with a vehicle ahead. When the drivers of the target vehicle and the own vehicle have a tendency of not stopping appropriately, that is, stopping beyond the stop line or ignoring the stop sign, there is the danger of head-to-head collision. Likewise, when the drivers of the target vehicle and the own vehicle have a tendency of ignoring the red light or accelerating at the yellow light, there is the danger of collision at the intersection.

When the driver of the target vehicle has a tendency of careless driving with respect to surroundings, there is the danger of collision of the vehicle with a vehicle turning to the right, and when the driver of the own vehicle has a tendency of careless driving with respect to surroundings, there is the danger of collision with a vehicle in the opposite lane, which is turning to the right. Further, when the drivers of the target vehicle and the own vehicle have a tendency of egocentric and reckless driving, there is the danger of contacting accident at the time of passing each other in a narrow road.

When the driver of the target vehicle has a tendency of accelerating, because of hating to be overtaken, there is the danger that overtaking by the own vehicle may fail. When the driver of the own vehicle has a tendency of accelerating, because of hating to be overtaken, there is the danger that an accident may be caused due to obstruction to overtaking of another vehicle.

Similarly, when the driver of the target vehicle has a tendency of interfering a vehicle cutting into the line by cutting down the distance between vehicles, there is the danger of failing in cutting-in or lane change of the own vehicle. When the driver of the own vehicle has a tendency of interfering another vehicle cutting into the line of, there is the danger of accident due to obstruction to cutting-in or lane change.

When the drivers of the target vehicle and the own vehicle have a tendency of ignoring warning of the system (vehicle control apparatus), since warning by the system for the safety is not useful, care should be taken in all situations.

Figure 56:
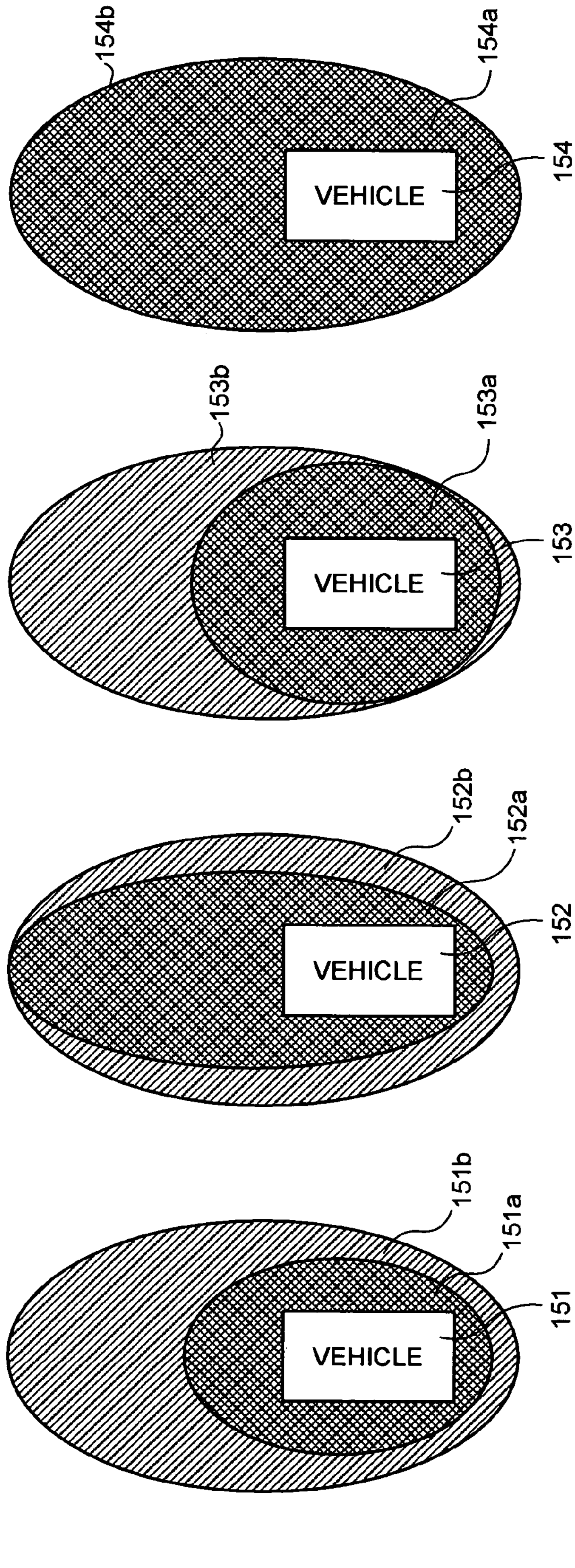
FIG. 56 is a schematic for illustrating an example of danger area and caution area set based on driving history.

FIG. 56 is a schematic for illustrating an example of danger area and caution area set based on driving history. Vehicles 151 to 154 are the same type. Therefore, the shapes of the caution areas 151*b* to 154*b* of the vehicles 151 to 154 are the same.

The vehicle 151 here is driven by a driver who performs ideal driving. On the other hand, the vehicle 152 is driven by a driver who has a tendency of an excessive speed or sudden acceleration. Therefore, the danger area 152*a* of the vehicle 152 increases in the traveling direction, as compared with the danger area 151*a* of the vehicle 151.

Likewise, the driver of the vehicle 153 has a tendency of operating the steering wheel suddenly without operating the indicator. Therefore, the danger area 153*a* of the vehicle 153 increases in the right and left direction, as compared with the danger area 151*a* of the vehicle 151.

The driver of the vehicle 154 has a tendency of ignoring the warning of the system, and hence it is difficult to predict how the vehicle is driven. Therefore, the danger area 154*a* of the vehicle 154 becomes the same shape as the caution area 154*b*, that is, all the range in which vehicle can operate is watched.

It is preferred to set the danger area in the same shape as that of the caution area, as in the vehicle 154, with regard to the vehicles, on which the system that supports the safe driving is not mounted.

Specific examples of danger determination, using the driving histories, will be explained with reference to FIG. 57 and FIG. 58. The own vehicle 161 and the oncoming vehicle 162 are close to each other at the intersection, but the driver of the own vehicle 161 and the driver of the oncoming vehicle 162 drive the vehicle ideally. In this state, the caution area 161*b* of the own vehicle 161 and the caution area 162*b* of the oncoming vehicle 162 overlap on each other, but the danger area 161*a* of the own vehicle 161 and the danger area 162*a* of the oncoming vehicle 162 do not overlap on each other.

Figure 57:
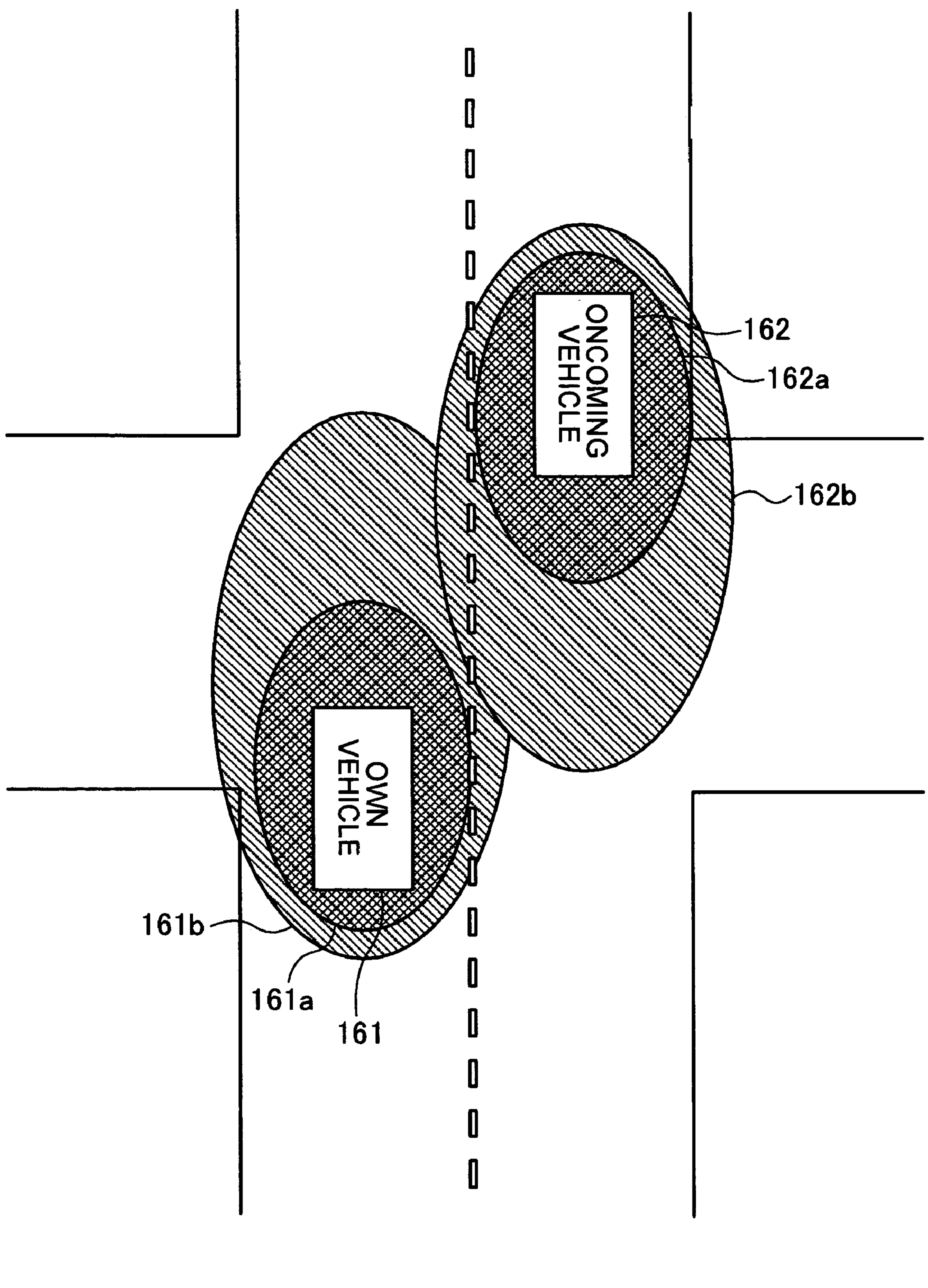
FIG. 57 is a schematic for illustrating an example of danger determination by using driving history.
Figure 58:
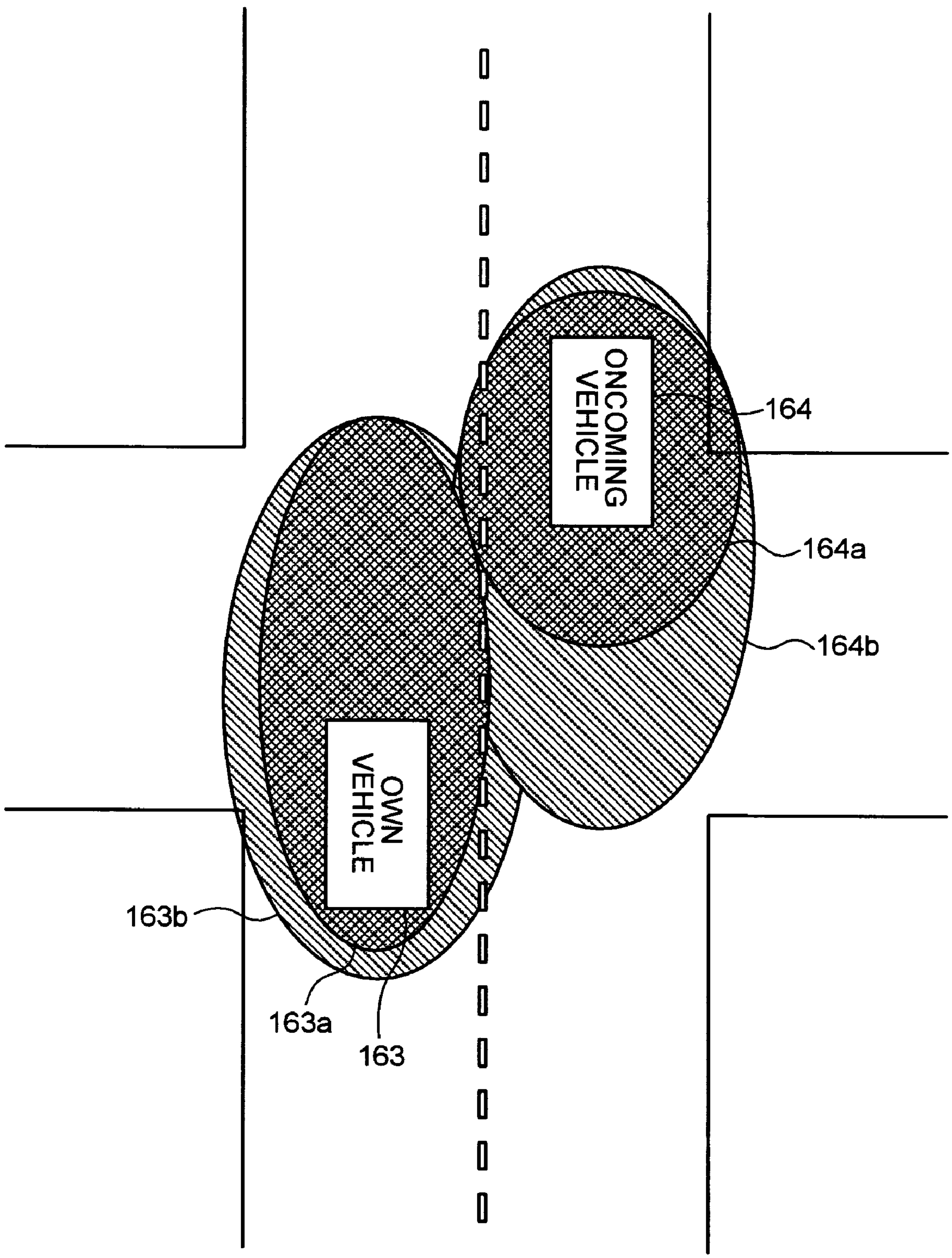
FIG. 58 is a schematic for illustrating another example of danger determination by using driving history.

On the other hand, the position relation between the own vehicle 163 and the oncoming vehicle 164 is the same as that of the own vehicle 161 and the oncoming vehicle 162 shown in FIG. 57. However, since the driver of the own vehicle 163 has a tendency of an excessive speed and sudden acceleration, the danger area 163*a* increases in the traveling direction. The driver of the oncoming vehicle 164 has a tendency of turning to the right or left without operating the indicator, and hence the danger area 164*a* becomes wide in the right and left direction.

As a result, the danger area 163*a* overlaps on the danger area 164*a*, and in the own vehicle 163, collision with the oncoming vehicle 164 is warned strongly. That is, in this situation, the danger of collision at the time of right turn of the oncoming vehicle 164 is suggested, assuming sudden right turn of the oncoming vehicle 164.

More specifically, if it is assumed that the driving history of the driver is not referred to, the own vehicle side cannot predict sudden right turn of the oncoming vehicle, and determines that the oncoming vehicle travels straight ahead. Further, the oncoming vehicle side cannot predict sudden acceleration of the own vehicle, or estimates the speed of the own vehicle to be low, and determines that right turn is possible. Therefore, there is the danger such that the oncoming vehicle turns to the right, and the own vehicle travels straight ahead, thereby causing collision.

By predicting the action of the vehicle based on the driving histories of drivers, the danger to be caused can be predicted highly accurately.

In the vehicle control apparatus according to the second specific example, since various kinds of simulation are performed to make predictive determination, prevention of traffic accident and safety of vehicles can be realized accurately and more appropriately. The contents of simulation data (see FIG. 47) may be displayed on the monitor 502, or may be displayed on the front or side window glass, overlapped on the actual image, thereby enabling further prevention of traffic accident and safety of vehicles.

Examples of the present invention have been explained above, but the present invention is also applicable to various and different embodiments within the range of technical spirits described in the scope of appended claims. Therefore, different examples will be explained, by dividing the features into six categories of (1) information acquisition, (2) determination of the situation, (3) danger determination, (4) vehicle control, (5) avoidance simulation, and (6) others.

For example, in the embodiment, an example in which the camera 21, the microphone 22, and the communication device 40 are used to acquire various kinds of information utilizable for control of the vehicle from inside and outside of the vehicle has been explained, but the present invention is not limited thereto. For example, the present invention is applicable to an instance in which information is acquired from inside and outside of the vehicle by using all possible means, such that a recording medium storing information relating to drivers and roads is read into the storage unit 11 beforehand, and the information is acquired from the storage unit 11.

In the embodiment, an example in which the type of sign, the shape of the intersection, the color of traffic lights, the positions, speeds, and acceleration/deceleration speeds of other vehicles having the possibility of direct collision are acquired has been explained as an example, but the present invention is not limited thereto. For example, various kinds of information utilizable for control of the vehicle other than the above information may be similarly acquired.

In the present embodiment, an example in which various situations at the intersection with or without traffic lights, and various situations relating to deviation from the lane are determined has been explained, but the present invention is not limited thereto. For example, the situation may be determined based on other information useful for dividing the situations, such as the number of lanes at the intersection. That is, the situations relating to the intersection and deviation from the lane may be determined more finely and appropriately.

In the present embodiment, an example in which various situations at the intersection, and various situations relating to deviation from the lane are determined has been explained, but the present invention is not limited thereto. For example, the present invention is also applicable to an instance in which various situations other than at the intersection or at the time of deviation from the lane, such as joining of the lanes and putting the vehicle into a garage, are determined.

In the present embodiment, an example in which the danger level is determined in five stages has been explained, but the present invention is not limited thereto, and for example, the danger level may be determined in two or three stages. In this case, the contents of vehicle control are classified in two or three stages, corresponding to the danger level.

In the embodiment, an example in which the danger is determined in view of the possibility of collision with a predetermined object has been explained, but the present invention is not limited thereto. For example, the "danger" may be determined from multilateral aspects, taking into consideration whether the vehicle violates the traffic rule.

In the present embodiment, an example in which any of prediction, warning, operation assistance, and compulsive action is executed corresponding to the danger level has been explained, but the present invention is not limited thereto. For example, the present invention is also applicable to an instance when either prediction or warning is to be executed, or when either operation assistance or compulsive action is to be executed. That is, vehicles may be classified to vehicles that execute either prediction or warning according to the danger level, vehicles that execute either operation assistance or compulsive action according to the danger level, and vehicles that execute any of prediction, warning, operation assistance, and compulsive action according to the danger level.

When such classification is to be performed, first electronic device (microcomputer) that executes either prediction or warning according to the danger level, and second electronic device (microcomputer) that is additionally connected to the first electronic device and executes either operation assistance or compulsive action according to the danger level may be manufactured. In other words, if the second electronic device is additionally connected to the first electronic device, not only appropriate prediction or warning is performed according to the danger level, to prompt the driver to perform appropriate operation and action, but also appropriate vehicle control (operation assistance or compulsive action) can be performed thereby enabling easy class shift (level upgrade).

In the present embodiment, an example in which any of prediction, warning, operation assistance, and compulsive action is determinately executed corresponding to the danger level has been explained, but the present invention is not limited thereto. For example, the present invention is also applicable to an instance in which a plurality of contents of vehicle control is executed at the same time, such that at danger level 4, warning and operation assistance are executed simultaneously, and at danger level 5, warning and compulsive action are executed simultaneously.

Further, the contents (classification) of vehicle control explained in the embodiment are one example only, and the present invention is not limited thereto. For example, other control (other control different from prediction, warning, operation assistance, and compulsive action) may be executed corresponding to the danger level.

In the present embodiment, an example in which avoidance simulation is performed so that the damage in the simulation becomes the minimum has been explained, but the present invention is not limited thereto. For example, simulation can be performed so as to be close to all kinds of preferred state, for example, so that the amount of payment for the non-life insurance premium due to the accident becomes the minimum, or the injury of the driver becomes the lightest, or the injury of passengers (for example, children) becomes the lightest.

The respective components of the respective apparatus are functionally conceptual, and are not necessarily constructed physically as shown in the figure. In other words, the specific forms of dispersion and integration of the respective apparatus are not limited as shown in the figure, and all or a part thereof may be dispersed or integrated functionally or physically in an optional unit, corresponding to the various kinds of load and use situation. Further, with regard to respective processing functions performed by the respective apparatus, all or a part thereof may be realized by a central processing unit (CPU) and a program analyzed and executed by the CPU, or realized as hardware by the wired logic.

Of the respective processing explained in the embodiment, all or a part thereof explained as been executed automatically may be executed manually, or all or a part thereof explained as been executed manually may be executed automatically by a known method. The processing procedure, the control procedure, specific names, and information including various kinds of data and parameters shown in the specification and in the drawings may be optionally changed, unless otherwise specified.

The vehicle control method explained in the embodiment can be realized by executing the program prepared in advance by a computer mounted on the vehicle (for example, a computer built in other ECUs other than the vehicle control apparatus). The program can be distributed via a network such as the Internet. The program is recorded on a computer readable recording medium such as hard disk, flexible disk (FD), CD-ROM, magneto optical (MO), or digital versatile disk (DVD), and can be executed by reading the program from the recording medium by the computer.

When various kinds of information are acquired, it is not necessary to acquire the information uniformly under all kinds of situations, and by changing the content of information to be acquired based on the specified situation, the information can be acquired more effectively. As a result, the accuracy in perception, recognition, judgment, action, and operation can be improved.

Specifically, when the vehicle approaches an intersection, it is preferred to mainly acquire information of the front, the right forward, and the left forward. When the vehicle changes the lane to the right lane for passing or the like, it is preferred to mainly acquire information of the right forward, the right side, and the right rear side.

Since the information to be acquired can be changed, for example, when an image is acquired by a camera, the shooting direction of the camera may be changed, or the acquisition interval of images may be changed.

Further, as an aid for determining the situation, the operation system of the vehicle may be used. For example, when the driver operates the right indicator, it is determined that the vehicle is going to turn to the right or change the lane, to acquire information mainly from the right forward, the right side, and the right rear side.

In other words, in the embodiment, perception, recognition, judgment, action, and operation to be performed on the system side are not always independent of the driver's operation, and are performed in association with the driver's operation, such as operating the indicator, and lighting the brake lamp, thereby reliably realizing prevention of traffic accident and safety of vehicles.

According to the present invention, information effective for vehicle control can be obtained and controlled, the situation under which the vehicle is placed can be appropriately determined, appropriate information corresponding to the determined situation can be selected to determine the danger appropriately, and appropriate vehicle control can be performed for avoiding the danger. In other words, appropriate perception, recognition, judgment, action, and operation can be performed instead of the driver, thereby realizing prevention of traffic accident and safety of vehicles.

Furthermore, according to the present invention, for example, in a section where there is no interchange in a motorway, a sensor and processing for detecting an oncoming vehicle are stopped, thereby enabling reduction of power consumption and load on a microcomputer.

Moreover, according to the present invention, information effective for vehicle control can be obtained in a wide range from inside and outside of the vehicle.

Furthermore, according to the present invention, accident prevention and safety processing corresponding to the driving action of the driver can be performed.

Moreover, according to the present invention, various situations in the intersection can be appropriately specified.

Furthermore, according to the present invention, the situation in the intersection can be appropriately determined in detail.

Moreover, according to the present invention, various situations in which a vehicle deviates from the lane can be appropriately specified.

Furthermore, according to the present invention, the situation relating to deviation from the lane can be appropriately determined in detail.

Moreover, according to the present invention, the situation relating to deviation from the lane at a curve can be appropriately determined in detail.

Furthermore, according to the present invention, an object having the possibility of direct collision with the own vehicle is appropriately perceived and recognized corresponding to the situation, and the danger of the vehicle as seen from a viewpoint of collision possibility with the object can be appropriately determined in detail.

Moreover, according to the present invention, not only an object having the possibility of direct collision with the own vehicle, but also an object having the possibility of indirect collision with the own vehicle are perceived and recognized according to the situation, and the danger of the vehicle as seen from a viewpoint of collision possibility with the object can be appropriately determined in detail.

Furthermore, according to the present invention, the danger of the vehicle can be determined easily and accurately.

Moreover, according to the present invention, not only the current situation of the object and the own vehicle, but also the past tendency are perceived and recognized, and the danger of the vehicle can be determined more appropriately, from various viewpoints.

Furthermore, according to the present invention, not only the situation of the object and the own vehicle, but also the past tendency depending on the situation are perceived and recognized, and the danger of the vehicle can be determined more appropriately, from various viewpoints.

Moreover, according to the present invention, since an operable range of the vehicle is set as a caution area, a range in which it is predicted that a driver of the vehicle operates is set as an operation prediction area, and the danger of the vehicle is determined based on the caution area and the operation prediction area, the danger to the own vehicle can be determined in more detail.

Furthermore, according to the present invention, since the caution area is set based on the vehicle performance, the operation prediction area is set based on the driving history of the driver, and the danger of the vehicle is determined based on the caution area and the operation prediction area, the danger determination can be performed by adding the habit of the driver.

Moreover, according to the present invention, since the driving tendency is determined from the driving history of the driver, and the operation prediction area is set by the driving tendency, to determine the danger of the vehicle, the danger determination can be performed by adding the habit of the driver in more detail.

Furthermore, according to the present invention, since the driving history of the driver of the own vehicle is obtained, and the danger of the vehicle is determined by using the driving history, the habit of the driver of the own vehicle can be used for danger determination.

Moreover, according to the present invention, since the driving history can be controlled for each driver, of a plurality of drivers who drive the same vehicle, detailed habits of driving are obtained for the drivers, to improve the accuracy in danger determination.

Furthermore, according to the present invention, the driving history of the driver of the own vehicle is transmitted to a history managing center and other vehicles, to be used for danger determination in other vehicles. As a result, the accuracy in danger determination by other vehicles can be improved, thereby ensuring the safety of the own vehicle.

Moreover, according to the present invention, since the driving histories of drivers of other vehicles are obtained and used for danger determination of the own vehicle, danger determination is performed by adding the habits of drivers of surrounding vehicles, thereby improving the determination accuracy.

Furthermore, according to the present invention, the danger of the vehicle is determined stepwise at a plurality of danger levels, and appropriate vehicle control (operation and action) can be performed according to each danger level.

Moreover, according to the present invention, appropriate prediction or warning is provided according to the danger level, to prompt the driver to perform appropriate operation and action.

Furthermore, according to the present invention, appropriate vehicle control (operation assistance or compulsive action) can be performed according to each danger level.

Moreover, according to the present invention, appropriate prediction or warning is provided according to the danger level, to prompt the driver to perform appropriate operation and action, or appropriate vehicle control (operation assistance or compulsive action) can be performed.

Furthermore, according to the present invention, if the second electronic device is additionally connected to the first electronic device, not only appropriate prediction or warning is provided according to the danger level, to prompt the driver to perform appropriate operation and action, but also appropriate vehicle control (operation assistance or compulsive action) can be performed.

Moreover, according to the present invention, at the danger level at which operation assistance or compulsive action is required, more appropriate vehicle control (operation assistance or compulsive action) can be performed.

Furthermore, according to the present invention, an increase in damage due to reckless operation assistance or compulsive action can be avoided.

Moreover, according to the present invention, for example, when a collision cannot be avoided completely, collision is guided so that the damage becomes the smallest by appropriate operation assistance or compulsive action.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle control apparatus comprising:

an information acquiring/managing unit that acquires information for controlling various units in a vehicle instead of a driver of the vehicle, and manages the acquired information, the acquired information including real-time-acquired information and past-acquired information;

a storage unit that stores information regarding a plurality of situations for the vehicle;

a situation determining unit that determines a situation under which the vehicle placed from among the plurality of situations, based on the stored information and the acquired information;

a danger determining unit that selects predetermined information corresponding to the determined situation from among the stored information and the acquired information, and determines degree of danger of the situation based on the predetermined information; and a vehicle controller that controls predetermined units in the vehicle in such a manner that the degree of danger is reduced.

2. The vehicle control apparatus according to claim 1, wherein the information acquiring/managing unit selectively manages the information in accordance with the situation.

3. The vehicle control apparatus according to claim 1, wherein the information acquiring/managing unit acquires the information from inside and outside of the vehicle, via at least one of an image input unit, a voice input unit, and a communication unit.

4. The vehicle control apparatus according to claim 1, wherein the information acquiring/managing unit further acquires a content of driving operation of the vehicle by the driver.

5. The vehicle control apparatus according to claim 1, wherein the situation determining unit determines at least one of situations in which the vehicle approaches an intersection, in which the vehicle makes a right turn at the intersection, and in which the vehicle makes a left turn at the intersection.

6. The vehicle control apparatus according to claim 5, wherein the situation determining unit determines the situation under which the vehicle is placed, while keeping on determining at least one of presence of traffic lights in the intersection and number of lanes.

7. The vehicle control apparatus according to claim 1, wherein the situation determining unit determines a situation in which the vehicle deviates from a current driving lane.

8. The vehicle control apparatus according to claim 7, wherein the situation determining unit determines the situation in which the vehicle deviates from the current driving lane based on at least one of external conditions of the vehicle, condition of the driver, and the content driving operation.

9. The vehicle control apparatus according to claim 7, wherein the situation determining unit determines the situation in which the vehicle deviates from the current driving lane based on a speed of the vehicle and a condition of the road on which the vehicle is traveling when approaching a curve.

10. The vehicle control apparatus according to claim 1, wherein the danger determining unit selects an object having a possibility of direct collision with the vehicle based on the situation, and estimates the possibility of direct collision based on information on the object and the vehicle, when determining the degree of danger.

11. The vehicle control apparatus according to claim 10, wherein the danger determining unit determines the degree of danger based on both information on a previous condition of at least one of the object and the vehicle and information on a current condition of at least one of the object and the vehicle.

12. The vehicle control apparatus according to claim 11, wherein the storage unit stores an accident history database which includes information of an accident that previously occurred in a respective situation, the danger determining unit determines the degree of danger based on information of the accident that previously occurred in the situation determined by the situation determining unit.

13. The vehicle control apparatus according to claim 1, wherein the danger determining unit selects an object having a possibility of direct and indirect collision with the vehicle based on the situation, and estimates the possibility of direct and indirect collision based on information on the object and the vehicle, when determining the degree of danger.

14. The vehicle control apparatus according to claim 13, wherein the danger determining unit determines the degree of danger based on both information on a previous condition of at least one of the object and the vehicle and information on a current condition of at least one of the object and the vehicle.

15. The vehicle control apparatus according to claim 14, wherein the storage unit stores an accident history database which includes information of an accident that previously occurred in a respective situation, the danger determining unit determines the degree of danger based on information of the accident that previously occurred in the situation determined by the situation determining unit.

16. The vehicle control apparatus according to claim 1, wherein the danger determining unit sets a danger area around an object based on type and condition of the object having a possibility of at least one of direct collision and indirect collision, and determine the degree of danger based on the danger area.

17. The vehicle control apparatus according to claim 16, wherein the danger determining unit determines the degree of danger based on both information on a previous condition of at least one of the object and the vehicle and information on a current condition of at least one of the object and the vehicle.

18. The vehicle control apparatus according to claim 17, wherein the storage unit stores an accident history database which includes information of an accident that previously occurred in a respective situation, the danger determining unit determines the degree of danger based on information of the accident that previously occurred in the situation determined by the situation determining unit.

19. The vehicle control apparatus according to claim 16, wherein the object is another vehicle, the information aquiring/managing unit receives a driving history of a driver of the another vehicle, and the danger area includes an operation prediction area determined based on the driving history.

20. The vehicle control apparatus according to claim 19, wherein the danger area further includes a caution area determined based on performance of the another vehicle.

21. The vehicle control apparatus according to claim 20, wherein the operation prediction area is determined based on driving tendency of the driver of the another vehicle from the driving history.

22. The vehicle control apparatus according to claim 1, further comprising a driving history acquiring unit that acquires driving history of the driver.

23. The vehicle control apparatus according to claim 22, further comprising a driver identifying unit that identifies the driver of the vehicle, wherein the driving history acquiring unit associates the driver identified to the driving history acquired.

24. The vehicle control apparatus according to claim 22, further comprising a history transmitting unit that transmits the driving history to at least one of a history managing center that manages the driving history and other vehicle.

25. The vehicle control apparatus according to claim 24, further comprising a history receiving unit that receives the driving history of a driver of the other vehicle from at least one of the history managing center and the other vehicle.

26. The vehicle control apparatus according to claim 1, wherein the danger determining unit determines a level of danger from among a predetermined plurality of danger levels, and the vehicle controller controls the predetermined unit based on the level of danger.

27. The vehicle control apparatus according to claim 26, wherein the danger determining unit determines whether the degree of danger is a level to issue a forecast to the driver or a level to issue a warning to the driver, and the vehicle controller controls the predetermined unit based on the level of danger to issue a forecast to the driver or to issue a warning to the driver.

28. The vehicle control apparatus according to claim 27, wherein the danger determining unit determines whether the degree of danger is a level avoidable by an operation of the driver or a level difficult to avoid by the operation of the driver, and the vehicle controller controls the predetermined unit based on the level of danger to avoid the danger by assisting the operation of the driver or forcing the operation of the vehicle.

29. The vehicle control apparatus according to claim 26, wherein the danger determining unit determines whether the degree of danger is a level to issue a forecast to the driver, a level to issue a warning to the driver, a level avoidable by an operation of the driver, or a level difficult to avoid by the operation of the driver, and the vehicle controller controls the predetermined unit based on the level of danger to issue a forecast to the driver, to issue a warning to the driver, to assist the operation of the driver, or to force the operation of the vehicle.

30. The vehicle control apparatus according to claim 29, wherein the danger determining unit and the vehicle controller include a first electronic device that determines whether the degree of danger is a level to issue a forecast to the driver or a level to issue a warning to the driver, and controls the predetermined unit to issue a forecast to the driver or to issue a warning to the driver, and a second electronic device connected to the first electronic device to determine whether the degree of danger is a level avoidable by an operation of the driver or a level difficult to avoid by the operation of the driver, and controls the predetermined unit to avoid the danger by assisting the operation of the driver or forcing the operation of the vehicle.

31. The vehicle control apparatus according to claim 28, further comprising a operation predicting unit that predicts an operation of the driver or an operation of the vehicle required to avoid the danger based on the information acquired and managed by the information acquiring/managing unit, and when assisting the operation of the driver or forcing the operation of the vehicle, the vehicle controller controls the predetermined unit based on the operation of the driver or the operation of the vehicle predicted by the operation predicting unit to avoid the danger.

32. The vehicle control apparatus according to claim 31, wherein when it is difficult to completely avoid the danger, the operation predicting unit predicts the operation of the driver or the operation of the vehicle in such a manner that a damage in the situation becomes minimum.

33. The vehicle control apparatus according to claim 32, wherein the operation predicting unit predicts the operation of the driver or the operation of the vehicle in such a manner that the damage caused in the vehicle and an object having a possibility of at least one of direct collision and indirect collision with the vehicle becomes minimum.

34. A vehicle control method comprising:

acquiring information for controlling various units in a vehicle instead of a driver of the vehicle and managing the acquired information, the acquired information includes real-time-acquired information and past-acquired information;

storing information regarding a plurality of situations for the vehicle;

determining a situation under which the vehicle is placed from among the plurality of situations, based on the stored information and the acquired information;

selecting predetermined information corresponding to the determined situation from among the stored information and the acquired information;

determining degree of danger of the situation based on the predetermined information; and controlling predetermined units in the vehicle in such a manner that the degree of danger is reduced.

35. A computer program for controlling a vehicle, making a computer to execute:

acquiring information for controlling various units in a vehicle instead of a driver of the vehicle and managing the acquired information, the acquired information includes real-time-acquired information and past-acquired information;

storing information regarding a plurality of situations for the vehicle;

determining situation under which the vehicle is placed from among the plurality of situations, based on the stored information and the acquired information;

selecting predetermined information corresponding to the determined situation from among the stored information and the acquired information;

determining degree of danger of the situation based on the predetermined information; and controlling predetermined units in the vehicle in such a manner that the degree of danger is reduced.

* * * * *